(12) United States Patent
Parker et al.

(10) Patent No.: US 7,002,143 B2
(45) Date of Patent: Feb. 21, 2006

(54) METHOD AND APPARATUS FOR COMPENSATING WAVEFORMS, SPECTRA, AND PROFILES DERIVED THEREFROM FOR EFFECTS OF DRIFT

(75) Inventors: Michael Andrew Parker, Fremont, CA (US); Daryl J. Pocker, San Jose, CA (US)

(73) Assignee: Internaional BusinessMachines Corporation, Armonk, NY (US)

( * ) Notice: Subject to any disclaimer, the term of this patent is extended or adjusted under 35 U.S.C. 154(b) by 0 days.

(21) Appl. No.: 10/077,036

(22) Filed: Feb. 15, 2002

(65) Prior Publication Data

US 2003/0155501 A1 Aug. 21, 2003

(51) Int. Cl.
*H01J 49/00* (2006.01)

(52) U.S. Cl. ............................ 250/282; 702/22; 702/30
(58) Field of Classification Search ................ 250/282; 428/64.1; 703/2; 702/27
See application file for complete search history.

(56) References Cited

U.S. PATENT DOCUMENTS

| 5,319,586 | A | * | 6/1994 | Gupta et al. ................. 364/735 |
| 5,498,875 | A | * | 3/1996 | Obremski et al. ........ 250/458.1 |
| 5,872,629 | A | | 2/1999 | Colvard |
| 6,393,368 | B1 | * | 5/2002 | Ito et al. ........................ 702/22 |
| 2002/0059047 | A1 | * | 5/2002 | Haaland ......................... 703/2 |

OTHER PUBLICATIONS

Malinowski et al., "Factor Analysis in Chemistry", A Wiley-Interscience Publication, 1980.
N. Wiener, "Extrapolation, Interpolation, and Smoothing, of Stationary Time Series," The M.I.T. Press, 1966, pp. 1-25.
Wiener, N., "Operator's MultiPak Software Manual," Physical Electronics, Version 6, pp. 3-57 through 3-59 and A10.
Wiener, N., "Operator's MultiPak Software Manual," Physical Electronics, Version 6, pp. 3-98 through 3-103 and A19-A22.
Watson, D., "Improved Dynamic Range and Automated Lineshape Differentiation in AES/XPS Composition versus Depth Profiles," Surface Interface Analysis, vol. 15, 1990, pp. 516-524.

(Continued)

*Primary Examiner*—John R. Lee
*Assistant Examiner*—Phillip A. Johnston
(74) *Attorney, Agent, or Firm*—Chambliss, Bahner & Stophel, P.C.; David W. Lynch

(57) ABSTRACT

A method and apparatus for compensating waveforms, spectra, and profiles derived therefrom for effects of drift is disclosed. The present invention removes the effects of drift from a sequential series of waveforms obtained from a waveform-source device, or spectra, from a spectrometer, to produce for output a sequential series of drift-compensated waveforms, or spectra, respectively. In addition, the present invention performs a factor analysis, or alternatively a linear-least-squares analysis, on an array of the drift-compensated waveforms, or spectra to provide a set of drift-compensated principal factors; and, generates drift-compensated scaled target-factor profiles from a profile trajectory lying within a space of the set of drift-compensated principal factors. In addition, in the case of spectra, the invention provides for conversion of the drift-compensated scaled target-factor profiles to drift-compensated compositional profiles. The invention finds particular utility in the field of electron spectroscopy when the invention is applied to correcting sputter-depth-profile analyzes for the effects of spectral drift caused by charging in insulating samples. The invention, by extension, also, finds utility in waveform processing in situations where a sequential series of waveforms having similar features are offset by arbitrary phase shifts, and, even more generally, in time-series analysis, where a time-series is affected by leading or lagging data.

76 Claims, 26 Drawing Sheets

OTHER PUBLICATIONS

"Mathematics Dictionary", James & James, Third Edition, Van Nostrand Reinhold Co., 1968, pp. 123 and 370.

Bracewell, R., "The Fourier Transform and Its Applications,", McGraw-Hill Book Co., Second Ed., Revised, 1986.

Bevington, P., "Data Reduction and Error Analysis for the Physical Sciences," McGraw-Hill Book Co., 1969, pp. 164-255.

Schamber, F., "A Modification of the Linear Least-Squares Fitting Method which Provides Continuum Suppression," Tracor Northern, Inc.

Brouwer, G., "Deconvolution Method for Identification of Peaks in Digitized Spectra," Analytical Chemistry, vol. 45, No. 13, 1973, pp. 2239-2247.

Eisele et al., "Applied Matrix and Tensor Analysis," Wiley-Interscience, 1970, pp. 16-22.

Pocker et al., "Trajectory Projection Factor Analysis," Abstracts of the 45th International Symposium of the American Vacuum Society: Vacuum Thin Films, Surfaces/Interfaces, and Processing, Nov. 2-6, 1998, p. 131.

Pocker et al., "Fourier Modulus Brings Charging Samples, Auger Depth Profiles, Linear Least Squares and Factor Analysis," Paper AS-WeA3, http://www.avsSymposium.org/paper.asp?abstratID=1917.

Briggs et al., "Practical Surface Analysis," Auger and X-ray Photoelectron Spectroscopy, 1983.

Lupis, C., Chemical Thermodynamics of Materials, Chapter 10, 1983, pp. 264-276.

* cited by examiner

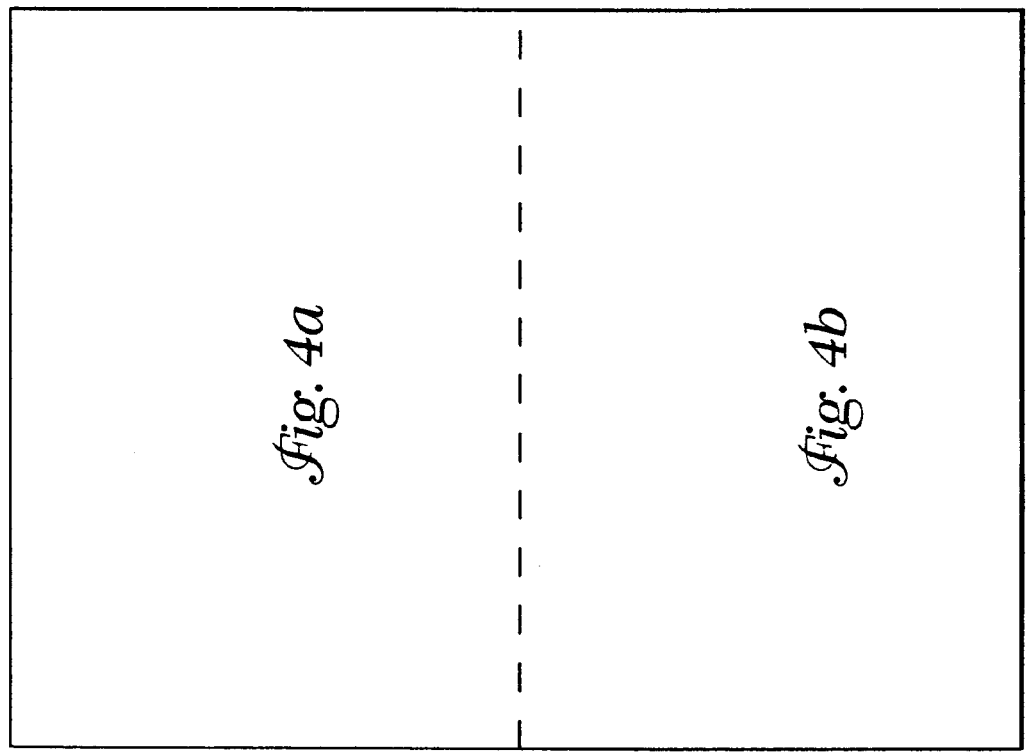

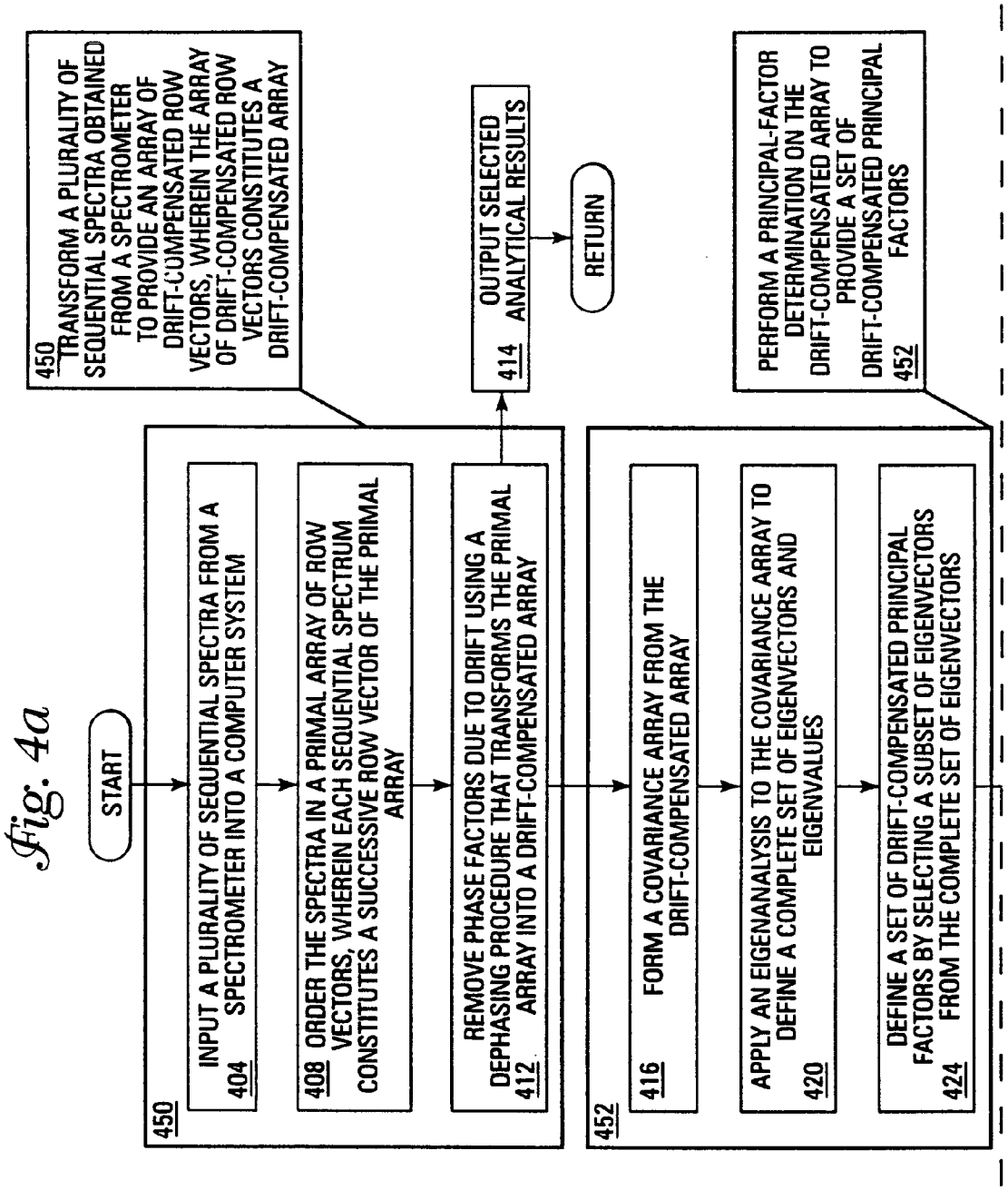

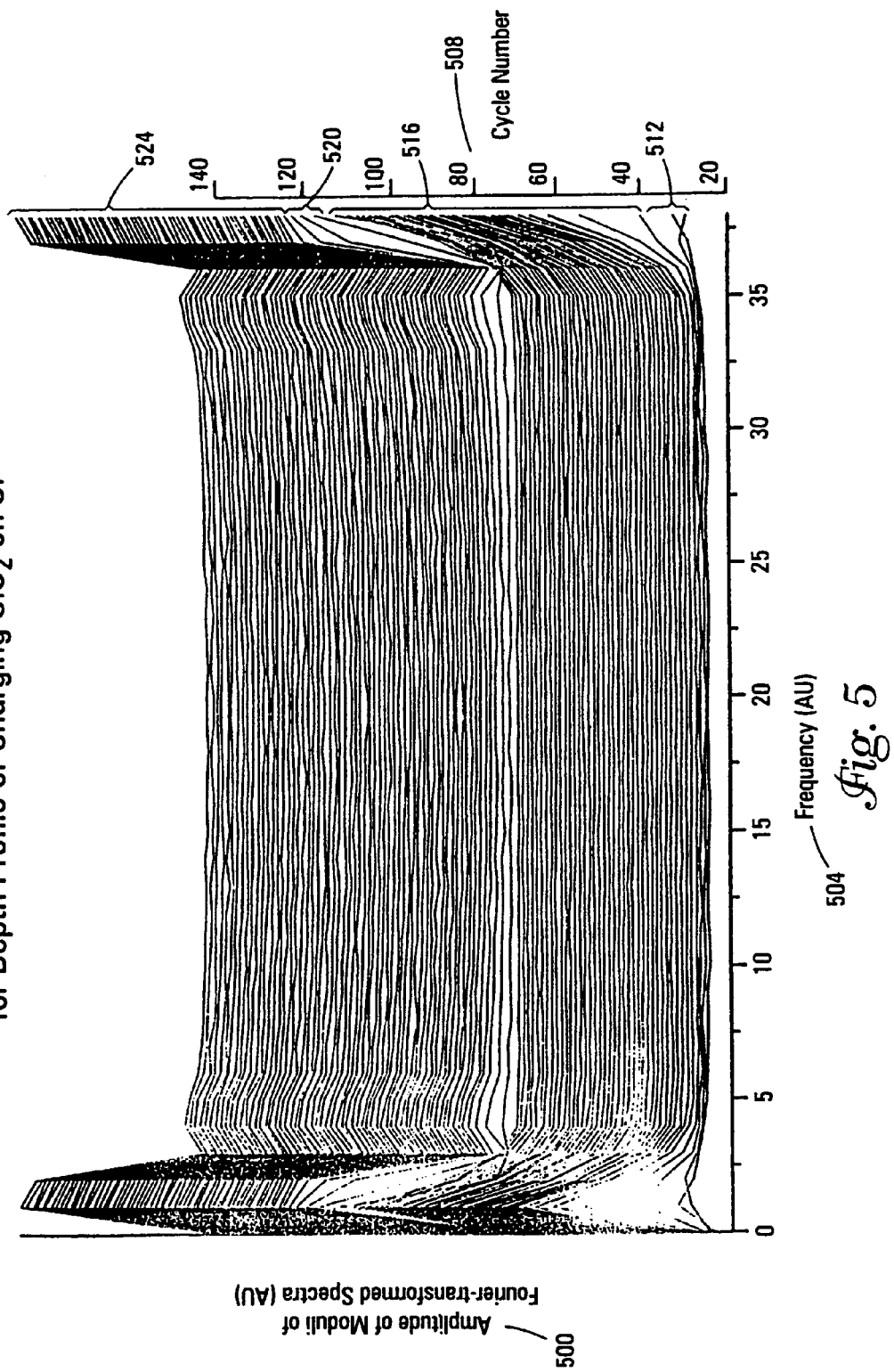

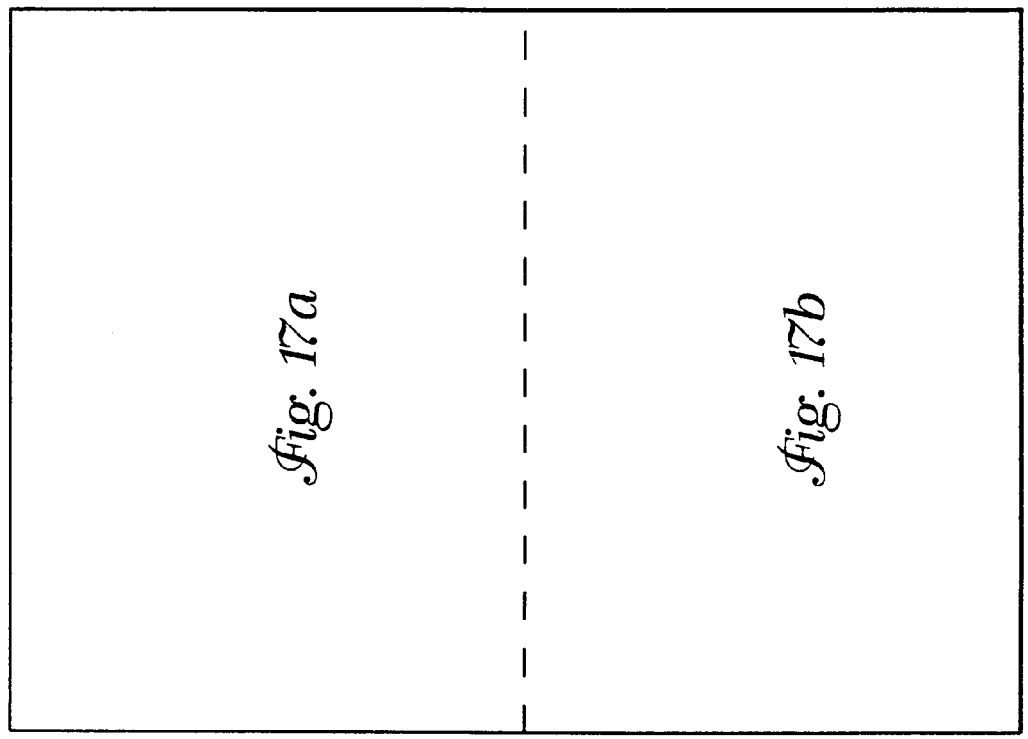

METHOD AND APPARATUS FOR COMPENSATING WAVEFORMS, SPECTRA, AND PROFILES DERIVED THEREFROM FOR EFFECTS OF DRIFT

BACKGROUND OF THE INVENTION

1. Field of the Invention

This invention relates in general to waveform analysis systems, and more particularly to a method and apparatus for compensating spectra and profiles derived therefrom for effects of drift.

2. Description of Related Art

The compositional analysis of thin films found in electronic devices is a challenging area for modern electronic miniaturization technology. As the dimensions of devices have become ever smaller, it has become increasingly more difficult to characterize them with sufficient detail to enable, not only good quality control in manufacturing, but also timely introduction to the marketplace through shortened product-development cycles. Spectroscopic analysis has been widely used to provide the critical compositional information required for accurate characterization of such devices. In particular, the application of electron spectroscopy to the analysis of thin films found in electronic devices is widely used for the characterization of these devices. In addition, these devices are frequently composed of alternating layers of insulating and conductive materials, such as oxides and metals, respectively, which can cause difficulties in the analysis.

Although analysis of conductors is usually not a problem for electron spectroscopy, insulators often charge and this causes shifts in electron spectra. Since the accurate location of peak position within a spectrum is crucial for identification of the constituents generating such peaks in order to obtain an accurate spectroscopic analysis, spectral shifts are highly undesirable and have deleterious effects on quantification, especially compositional profiles, when it is based on spectra exhibiting such shifts. Such shifts become most troublesome, when linear-least-squares (LLS) or factor analysis (FA) methods are required to profile differing chemical species falling in the same spectral range.

When structures consisting of layered conductors and insulators are analyzed using physical delayering techniques, such as sputter-depth profiling analysis, the charging problem can be so severe as to preclude analysis. This is particularly true of sputter-depth profiling analysis with Auger electron spectroscopy. Compositional depth profiles display the relative contribution from various constituents with depth below the initial surface of a sample based on a sequential series of spectra obtained from strata exposed by removal of overlayers through sputtering of the sample with a rastered ion beam. In the case of Auger depth profiling, embedded insulating layers often charge negatively so that conventional techniques of charge neutralization by electron flood guns are unusable, which results in corrupted depth profiles of the distribution of constituents with depth below the surface of the sample.

A dramatic example of this problem arises in the analysis of certain oxide structures in metal oxide semiconductor field effect transistor (MOSFET) devices, which employ layered structures of insulating $SiO_2$ on a semiconducting silicon substrate. MOSFET devices are the transistorized switches that comprise the principal circuit components of integrated circuits employed in modern digital computers. Depth profiles through such structures can demonstrate severe shifts in the spectra from strata in the $SiO_2$ layer exposed during sputter-depth profiling analysis; and these shifts confound accurate analysis of such structures, their compositional depth profiles and especially compositional depth profiles requiring the use of LLS or FA analysis procedures.

Problems similar to those that arise in Auger electron spectroscopy can also arise with other electron spectroscopic techniques, such as x-ray photoelectron spectroscopy, and electron energy loss spectroscopy. Not only can charging of the sample cause spectral shifts, but also a variety of other things can cause spectral shifts, ranging from mechanical instabilities of the sample to thermal fluctuations within the spectrometer. More generally, the term spectral drift refers to spectral shifts due to these various sources. It would be useful to have a universally applicable method for removing the effects of such varied sources of drift from influencing the analyses based on sequential series of such drifted spectra, particularly compositional depth profiles. In some cases, for example, in the analysis of unique one-of a-kind samples, as often arises in the failure analysis of localized defects within a microelectronic circuit, it is absolutely essential to have some means for compensating for the effects of drift even when all that are available are inferior spectra that have been corrupted by the effects of drift. In such cases, the defect is often sacrificed, i.e. destroyed, in the course of a sputter-depth-profile analysis, leaving no second chance to obtain drift-free spectra. As a result, critical manufacturing problems that might potentially result in significant yield losses and increased costs of manufacturing can go unresolved, unless such drifted spectra can somehow be compensated for the effects of drift to provide a useful analysis.

It can easily be seen that, just as spectral drift can influence the quality of spectra obtained by other electron spectroscopic techniques, spectral drift can also deleteriously influence spectra acquired with other non-electron spectroscopic techniques. More generally, spectral drift is a bad thing for any form of spectroscopy. Even more generally, a spectrum can be viewed as an electronic signal or waveform, and spectral drift, as a phase shift of the signal or waveform that produces a lead or a lag along the time axis. Hence, a universally applicable technique for removing the effects of such drift from a sequential series of spectra obtained in spectroscopy has benefits in a wide variety of other applications, especially in signal processing and waveform analysis.

It can be seen then that there is a need for a method for compensating a sequence of spectra, or waveforms, for the effects of spectral drift or phase shift, respectively.

It can also be seen that there is a need for a method compensating compositional profiles for the effects of drift because compositional profiles are derived from sequences of such spectra.

It can also be seen that there is a need for an apparatus for compensating a sequence of spectra, or waveforms, and for compensating profiles derived therefrom for the effects of drift, specifically, a spectroscopic analysis system, or more generally, a waveform analysis system.

SUMMARY OF THE INVENTION

To overcome the limitations in the prior art described above, and to overcome other limitations that will become apparent upon reading and understanding the present specification, the present invention discloses a method and apparatus for compensating waveforms, spectra, and profiles derived therefrom for effects of drift.

The present invention solves the above-described problems by removing the effects of drift from a sequential series of waveforms obtained in signal processing, and a sequential series of spectra, in spectroscopy.

A method in accordance with the principles of the present invention includes transforming a plurality of sequential spectra obtained from a spectrometer to provide an array of drift-compensated row vectors, wherein the array of drift-compensated row vectors constitutes a drift-compensated array, performing a principal-factor determination on the drift-compensated array to provide a set of drift-compensated principal factors and generating drift-compensated scaled target-factor profiles from a profile trajectory of the drift-compensated row vectors lying within a space of drift-compensated principal factors.

Other embodiments of a method in accordance with the principles of the invention may include alternative or optional additional aspects. One such aspect of the present invention is that the method further includes generating drift-compensated compositional profiles from the drift-compensated scaled target-factor profiles.

Another aspect of the present invention is that the transforming a plurality of sequential spectra further includes inputting a plurality of sequential spectra from a spectrometer into a computer system, ordering the spectra in a primal array of row vectors, wherein each sequential spectrum constitutes a successive row vector of the primal array, and removing phase factors due to drift using a dephasing procedure that transforms the primal array into a drift-compensated array.

Another aspect of the present invention is that the dephasing procedure for transforming the primal array into the drift-compensated array further comprises applying a Fourier transform to the spectra in the primal array of row vectors forming an array of Fourier-transformed row vectors, multiplying each Fourier-transformed row vector by a complex conjugate of each Fourier-transformed row vector to form a squared moduli vector thereby removing phase factors due to drift, taking the square root of each element of the squared moduli vector to create a corresponding moduli vector, and forming a drift-compensated array of moduli vectors by successively sequencing the moduli vectors as successive drift-compensated row vectors in a drift-compensated array, wherein the moduli vectors constitute moduli of Fourier-transformed spectra.

Another aspect of the present invention is that the method further includes outputting the drift-compensated row vectors of the drift-compensated array as a sequential series of moduli of Fourier-transformed spectra.

Another aspect of the present invention is wherein the dephasing procedure for transforming the primal array into the drift-compensated array further comprises applying a fitting procedure to each spectrum in the primal array using selected reference spectra, calculating through the fitting procedure a corresponding reference weighting factor for each reference spectrum corresponding to each spectrum in the primal array, removing the phase factor due to drift from each spectrum in the primal array by synthesizing a corresponding drift-compensated spectrum given by the sum of each selected reference spectrum multiplied by the corresponding reference weighting factor, and forming a drift-compensated array by successively sequencing the drift-compensated spectra as successive drift-compensated row vectors in the drift-compensated array.

Another aspect of the present invention is that the method further includes outputting analytical results selected from the group consisting of the selected reference spectra used in the fitting procedure, the drift-compensated row vectors of the drift-compensated array as a sequential series of drift-compensated spectra, reference weighting factors for each reference spectrum corresponding to each spectrum in the primal array as a set of drift-compensated reference-spectrum profiles, and phase factors due to drift for each reference spectrum corresponding to each spectrum in the primal array as a set of phase-factor profiles.

Another aspect of the present invention is that the performing the principal-factor determination comprises performing a factor analysis.

Another aspect of the present invention is that the performing the factor analysis further includes forming a covariance array from the drift-compensated array, applying an eigenanalysis to the covariance array to define a complete set of eigenvectors and eigenvalues, and defining a set of drift-compensated principal factors by selecting a subset of eigenvectors from the complete set of eigenvectors.

Another aspect of the present invention is that the defining the set of drift-compensated principal factors further comprises selecting the drift-compensated principal factors as a first few eigenvectors corresponding to eigenvalues above a certain limiting value.

Another aspect of the present invention is that the performing the principal-factor determination comprises performing a linear-least-squares analysis.

Another aspect of the present invention is that the performing a linear-least-squares analysis further includes selecting a set of initial factors from the set of drift-compensated row vectors of the drift-compensated array, performing a linear-least-squares decomposition with the set of initial factors on the drift-compensated row vectors in the drift-compensated array to provide a set of residue factors, and performing a Gram-Schmidt orthonormalization on the combined set of initial factors and residue factors to provide drift-compensated principal factors.

Another aspect of the present invention is that the generating drift-compensated scaled target-factor profiles further includes constructing a set of drift-compensated target factors on a space of the drift-compensated principal factors, applying the set of drift-compensated target factors to a profile trajectory lying within a space of the drift-compensated principal factors to obtain a sequential set of target-factor weighting factors corresponding to the drift-compensated target factors for the profile trajectory, and outputting analytical results selected from the group consisting of a set of drift-compensated scaled target-factor profiles derived from the set of target-factor weighting factors, and the set of drift-compensated target factors.

Another aspect of the present invention is that the constructing the set of drift-compensated target factors further includes generating a profile trajectory on a 3-dimensional projection of a 4-dimensional space of a set of first-four, drift-compensated principal factors along with a reference tetrahedron the vertices of which represent each of the first-four, drift-compensated principal factors, enclosing the profile trajectory within an enclosing tetrahedron with vertices centered on end-points and in proximity to turning points of the profile trajectory, and with faces lying essentially tangent to portions of the profile trajectory, and calculating the drift-compensated target factors from the normed coordinates of the vertices of the enclosing tetrahedron in terms of the drift-compensated principal factors.

Another aspect of the present invention is that the generating the profile trajectory further includes calculating 4-space coordinates of a profile trajectory of drift-compensated target-factor profiles on a 4-dimensional space to produce four coordinates for each point in the profile trajectory, one coordinate for each of the first-four, drift-compensated principal factors; reducing the dimensionality of the coordinates of the profile trajectory by dividing each coordinate by a sum of all four 4-space coordinates to produce normed coordinates for the profile trajectory; and plotting the normed coordinates for the profile trajectory in a 3-dimensional space, the coordinates axes of which are edges of a reference tetrahedron, the vertices of which correspond to unit values for each of the first-four, drift-compensated principal factors in a manner analogous to plotting of coordinates on a quaternary phase diagram.

Another aspect of the present invention is that the generating drift-compensated compositional profiles further includes defining a set of drift-compensated scaled target-factor profile values as the set of scaled target-factor weighting factors, dividing each drift-compensated scaled target-factor profile value by a profile sensitivity factor for each constituent corresponding to the target factor to provide a sensitivity-scaled target-factor profile value, normalizing the sensitivity-scaled target-factor profile value by dividing each sensitivity-scaled target-factor profile value for a given cycle number by the sum of all the sensitivity-scaled target-factor profile values for the given cycle number to provide drift-compensated compositional profile values at the given cycle number, and outputting the drift-compensated compositional profile values as a set of drift-compensated compositional profiles.

In another embodiment of the present invention a waveform processing method for compensating a plurality of sequential waveforms and target-factor profiles derived therefrom for effects of drift is disclosed. The waveform processing method includes transforming a plurality of sequential waveforms obtained from a waveform-source device to provide an array of drift-compensated row vectors, wherein the array of drift-compensated row vectors constitutes a drift-compensated array, performing a principal-factor determination on the drift-compensated array to provide a set of drift-compensated principal factors, and generating drift-compensated scaled target-factor profiles from a profile trajectory of the drift-compensated row vectors lying within a space of drift-compensated principal factors.

Another aspect of the waveform processing method of the present invention is that the transforming the plurality of sequential waveforms further includes inputting a plurality of sequential waveforms from a waveform-source device into the computer system, ordering the waveforms in a primal array of row vectors, wherein each sequential waveform constitutes a successive row vector of the primal array, and removing phase factors due to drift using a dephasing procedure that transforms the primal array into a drift-compensated array.

Another aspect of the waveform processing method of the present invention is that the dephasing procedure for transforming the primal array into the drift-compensated array further comprises applying a Fourier transform to the waveforms in the primal array of row vectors forming an array of Fourier-transformed row vectors, multiplying each Fourier-transformed row vector by a complex conjugate of each Fourier-transformed row vector to form a squared moduli vector thereby removing phase factors due to drift, taking the square root of each element of the squared moduli vector to create a corresponding moduli vector, and forming a drift-compensated array of moduli vectors by successively sequencing the moduli vectors as successive drift-compensated row vectors in a drift-compensated array, wherein the moduli vectors constitute moduli of Fourier-transformed waveforms.

Another aspect of the waveform processing method of the present invention is that the waveform processing method further includes outputting the drift-compensated row vectors of the drift-compensated array as a sequential series of moduli of Fourier-transformed waveforms.

Another aspect of the waveform processing method of the present invention is that wherein the dephasing procedure for transforming the primal array into the drift-compensated array further comprises applying a fitting procedure to each sequential waveform in the primal array using selected reference waveforms, calculating through the fitting procedure a corresponding reference weighting factor for each reference waveform corresponding to each waveform in the primal array, removing the phase factor due to drift from each waveform in the primal array by synthesizing a corresponding drift-compensated waveform given by the sum of each selected reference waveform multiplied by the corresponding reference weighting factor, and forming a drift-compensated array by successively sequencing the drift-compensated waveforms as successive drift-compensated row vectors in the drift-compensated array.

Another aspect of the waveform processing method of the present invention is that the waveform processing method further includes outputting analytical results selected from the group consisting of the selected reference waveforms used in the fitting procedure, the drift-compensated row vectors of the drift-compensated array as a sequential series of drift-compensated waveforms, reference weighting factors for each reference waveform corresponding to each waveform in the primal array as a set of drift-compensated reference-waveform profiles, and phase factors due to drift for each reference waveform corresponding to each waveform in the primal array as a set of phase-factor profiles.

Another aspect of the waveform processing method of the present invention is that the performing the principal-factor determination comprises performing a factor analysis.

Another aspect of the waveform processing method of the present invention is that the performing the factor analysis further includes forming a covariance array from the drift-compensated array, applying an eigenanalysis to the covariance array to define a complete set of eigenvectors and eigenvalues, and defining a set of drift-compensated principal factors by selecting a subset of eigenvectors from the complete set of eigenvectors.

Another aspect of the waveform processing method of the present invention is that the defining the set of drift-compensated principal factors further comprises selecting the drift-compensated principal factors as a first few eigenvectors corresponding to eigenvalues above a certain limiting value.

Another aspect of the waveform processing method of the present invention is that the performing the principal-factor determination comprises performing a linear-least-squares analysis.

Another aspect of the waveform processing method of the present invention is that the performing a linear-least-squares analysis further includes selecting a set of initial factors from the set of drift-compensated row vectors of the drift-compensated array, performing a linear-least-squares decomposition with the set of initial factors on the drift-compensated row vectors in the drift-compensated array to provide a set of residue factors, and performing a Gram- Schmidt orthonormalization on the combined set of initial factors and residue factors to provide drift-compensated principal factors.

Another aspect of the waveform processing method of the present invention is that the generating drift-compensated scaled target-factor profiles further includes constructing a set of drift-compensated target factors on a space of the drift-compensated principal factors, applying the set of drift-compensated target factors to a profile trajectory lying within a space of drift-compensated principal factors to obtain a sequential set of target-factor weighting factors corresponding to the drift-compensated target factors for the profile trajectory, and outputting analytical results selected from the group consisting of a set of drift-compensated scaled target-factor profiles derived from the set of target-factor weighting factors, and the set of drift-compensated target factors.

Another aspect of the waveform processing method of the present invention is that the constructing the set of drift-compensated target factors further includes generating a profile trajectory on a 3-dimensional projection of a 4-dimensional space of a set of first-four, drift-compensated principal factors along with a reference tetrahedron the vertices of which represent each of the first-four, drift-compensated principal factors, enclosing the profile trajectory within an enclosing tetrahedron with vertices centered on end-points and in proximity to turning points of the profile trajectory, and with faces lying essentially tangent to portions of the profile trajectory, and calculating the drift-compensated target factors from the normed coordinates of the vertices of the enclosing tetrahedron in terms of the drift-compensated principal factors.

Another aspect of the waveform processing method of the present invention is that the generating the profile trajectory further includes calculating 4-space coordinates of a profile trajectory of drift-compensated target-factor profiles on a 4-dimensional space to produce four coordinates for each point in the profile trajectory, one coordinate for each of the first-four, drift-compensated principal factors; reducing the dimensionality of the coordinates of the profile trajectory by dividing each coordinate by a sum of all four 4-space coordinates to produce normed coordinates for the profile trajectory; and plotting the normed coordinates for the profile trajectory in a 3-dimensional space the coordinate axes of which are edges of a reference tetrahedron, the vertices of which correspond to unit values for each of the first-four, drift-compensated principal factors in a manner analogous to plotting of coordinates on a quaternary phase diagram.

In another embodiment of the present invention an apparatus for compensating a plurality of sequential spectra and profiles derived therefrom for effects of drift is disclosed. The apparatus for compensating a plurality of sequential spectra and profiles derived therefrom for effects of drift includes a spectroscopic analysis system, wherein the spectroscopic analysis system includes a spectrometer and a computer system, coupled to the spectrometer, for analyzing spectra input from the spectrometer, the computer system further comprising a spectral processor for compensating a plurality of sequential spectra and profiles derived therefrom for effects of drift.

Another aspect of the apparatus for compensating a plurality of sequential spectra and profiles derived therefrom for effects of drift of the present invention is that the spectrometer comprises an electron spectrometer.

Another aspect of the apparatus for compensating a plurality of sequential spectra and profiles derived therefrom for effects of drift of the present invention is that the electron spectrometer comprises an Auger spectrometer.

Another aspect of the apparatus for compensating a plurality of sequential spectra and profiles derived therefrom for effects of drift of the present invention is that the electron spectrometer comprises an x-ray photoelectron spectrometer.

Another aspect of the apparatus for compensating a plurality of sequential spectra and profiles derived therefrom for effects of drift of the present invention is that the electron spectrometer comprises an electron energy loss spectrometer.

Another aspect of the apparatus for compensating a plurality of sequential spectra and profiles derived therefrom for effects of drift of the present invention is that the spectral processor further includes a spectral transformer operating on a plurality of sequential spectra obtained from the spectrometer to provide an array of drift-compensated row vectors, wherein the array of drift-compensated row vectors constitutes a drift-compensated array, a principal-factor determinator operating on the drift-compensated array to provide a set of drift-compensated principal factors, and a profile generator operating on a profile trajectory of the drift-compensated row vectors lying within a space of drift-compensated principal factors to provide a set of drift-compensated scaled target-factor profiles.

Another aspect of the apparatus for compensating a plurality of sequential spectra and profiles derived therefrom for effects of drift of the present invention is that the profile generator operating on the set drift-compensated scaled target-factor profiles generates a set of drift-compensated compositional profiles.

Another aspect of the apparatus for compensating a plurality of sequential spectra and profiles derived therefrom for effects of drift of the present invention is that the spectral transformer accepts as input the plurality of sequential spectra obtained from the spectrometer into the computer system, orders the spectra in a primal array, wherein each sequential spectrum constitutes a successive row vector of the primal array, and removes phase factors due to drift using a dephasor that transforms the primal array into a drift-compensated array.

Another aspect of the apparatus for compensating a plurality of sequential spectra and profiles derived therefrom for effects of drift of the present invention is that the dephasor that transforms the primal array into the drift-compensated array applies a Fourier transform to the spectra in the primal array of row vectors to form an array of Fourier-transformed row vectors, multiplies each Fourier-transformed row vector by a complex conjugate of each Fourier-transformed row vector to form a squared moduli vector thereby removing phase factors due to drift, takes the square root of each element of the squared moduli vector to create a corresponding moduli vector, and forms a drift-compensated array of moduli vectors by successively sequencing the moduli vectors as successive drift-compensated row vectors in a drift-compensated array, wherein the moduli vectors constitute moduli of Fourier-transformed spectra.

Another aspect of the apparatus for compensating a plurality of sequential spectra and profiles derived therefrom for effects of drift of the present invention is that the spectral transformer outputs the drift-compensated row vectors of the drift-compensated array as a sequential series of moduli of Fourier-transformed spectra.

Another aspect of the apparatus for compensating a plurality of sequential spectra and profiles derived therefrom for effects of drift of the present invention is that the dephasor that transforms the primal array into the drift-compensated array fits each spectrum in the primal array using selected reference spectra, calculates a corresponding reference weighting factor for each reference spectrum corresponding to each spectrum in the primal array, synthesizes a corresponding drift-compensated spectrum given by the sum of each selected reference spectrum multiplied by the corresponding reference weighting factor thereby removing phase factors due to drift, and forms a drift-compensated array by successively sequencing the drift-compensated spectra as successive drift-compensated row vectors in the drift-compensated array.

Another aspect of the apparatus for compensating a plurality of sequential spectra and profiles derived therefrom for effects of drift of the present invention is that the spectral transformer outputs to an output device analytical results selected from the group consisting of the selected reference spectra used in the fitting procedure, the drift-compensated row vectors of the drift-compensated array as a sequential series of drift-compensated spectra, reference weighting factors for each reference spectrum corresponding to each spectrum in the primal array as a set of drift-compensated reference-spectrum profiles, and phase factors due to drift for each reference spectrum corresponding to each spectrum in the primal array as a set of phase-factor profiles.

Another aspect of the apparatus for compensating a plurality of sequential spectra and profiles derived therefrom for effects of drift of the present invention is that the principal-factor determinator comprises a factor analyzer.

Another aspect of the apparatus for compensating a plurality of sequential spectra and profiles derived therefrom for effects of drift of the present invention is that the factor analyzer forms a covariance array from the drift-compensated array, applies an eigenanalysis to the covariance array to define a complete set of eigenvectors and eigenvalues, and defines a set of drift-compensated principal factors as a subset of eigenvectors determined by a selector operating on the complete set of eigenvectors.

Another aspect of the apparatus for compensating a plurality of sequential spectra and profiles derived therefrom for effects of drift of the present invention is that the selector operates on the complete set of eigenvectors to define the set of drift-compensated principal factors as a first few eigenvectors corresponding to eigenvalues above a certain limiting value.

Another aspect of the apparatus for compensating a plurality of sequential spectra and profiles derived therefrom for effects of drift of the present invention is that the principal-factor determinator comprises a linear-least-squares analyzer.

Another aspect of the apparatus for compensating a plurality of sequential spectra and profiles derived therefrom for effects of drift of the present invention is that the linear-least-squares analyzer selects a set of initial factors from the set of drift-compensated row vectors of the drift-compensated array, performs a linear-least-squares decomposition with the set of initial factors on the drift-compensated row vectors in the drift-compensated array to provide a set of residue factors, and performs a Gram-Schmidt orthonormalization on the combined set of initial factors and residue factors to provide drift-compensated principal factors.

Another aspect of the apparatus for compensating a plurality of sequential spectra and profiles derived therefrom for effects of drift of the present invention is that the profile generator defines a set of drift-compensated target factors on a space of the drift-compensated principal factors determined by a target-factor constructor operating on the drift-compensated principal factors, applies the set of drift-compensated target factors to a profile trajectory lying within a space of drift-compensated principal factors to obtain a sequential set of target-factor weighting factors corresponding to the drift-compensated target factors for the profile trajectory, and outputs to an output device analytical results selected from the group consisting of a set of drift-compensated scaled target-factor profiles derived from the set of target-factor weighting factors, and the set of drift-compensated target factors.

Another aspect of the apparatus for compensating a plurality of sequential spectra and profiles derived therefrom for effects of drift of the present invention is that the target-factor constructor generates a profile trajectory on a 3-dimensional projection of a 4-dimensional space of a set of first-four, drift-compensated principal factors along with a reference tetrahedron the vertices of which represent each of the first-four, drift-compensated principal factors; encloses the profile trajectory within an enclosing tetrahedron with vertices centered on end-points and in proximity to turning points of the profile trajectory, and with faces lying essentially tangent to portions of the profile trajectory, and calculates the drift-compensated target factors from the normed coordinates of the vertices of the enclosing tetrahedron in terms of the drift-compensated principal factors.

Another aspect of the apparatus for compensating a plurality of sequential spectra and profiles derived therefrom for effects of drift of the present invention is that the target-factor constructor in generating the profile trajectory further calculates 4-space coordinates of a profile trajectory of drift-compensated target-factor profiles on a 4-dimensional space to produce four coordinates for each point in the profile trajectory, one coordinate for each of the first-four, drift-compensated principal factors; reduces the dimensionality of the coordinates of the profile trajectory by dividing each coordinate by a sum of all four 4-space coordinates to produce normed coordinates for the profile trajectory; and, plots the normed coordinates for the profile trajectory in a 3-dimensional space the coordinate axes of which are edges of a reference tetrahedron the vertices of which correspond to unit values for each of the first-four, drift-compensated principal factors in a manner analogous to plotting of coordinates on a quaternary phase diagram.

Another aspect of the apparatus for compensating a plurality of sequential spectra and profiles derived therefrom for effects of drift of the present invention is that the profile generator further defines a set of drift-compensated scaled target-factor profile values as the set of scaled target-factor weighting factors, divides each drift-compensated scaled target-factor profile value by a profile sensitivity factor for each constituent corresponding to the target factor to provide a sensitivity-scaled target-factor profile value, divides each sensitivity-scaled target-factor profile value for a given cycle number by the sum of all the sensitivity-scaled target-factor profile values for the given cycle number to provide drift-compensated compositional profile values at the given cycle number, and outputs the drift-compensated compositional profile values as a set of drift-compensated compositional profiles.

In another embodiment of the present invention, an apparatus for compensating a plurality of sequential waveforms and profiles derived therefrom for effects of drift is disclosed. The apparatus for compensating a plurality of sequential waveforms and profiles derived therefrom for effects of drift includes a waveform analysis system, wherein the waveform analysis system includes a waveform-source device and a computer system, coupled to the waveform-source device, for analyzing waveforms input from the waveform-source device, the computer system further comprising a waveform processor for compensating a plurality of sequential waveforms and profiles derived therefrom for effects of drift.

Another aspect of the apparatus for compensating a plurality of sequential waveforms and profiles derived therefrom for effects of drift is that the waveform processor further includes a waveform transformer operating on a plurality of sequential waveforms obtained from a waveform-source device to provide an array of drift-compensated row vectors, wherein the array of drift-compensated row vectors constitutes a drift-compensated array, a principal-factor determinator operating on the drift-compensated array to provide a set of drift-compensated principal factors, and a profile generator operating on a profile trajectory of the drift-compensated row vectors lying within a space of drift-compensated principal factors to provide a set of drift-compensated scaled target-factor profiles.

Another aspect of the apparatus for compensating a plurality of sequential waveforms and profiles derived therefrom for effects of drift is that the waveform transformer accepts as input the plurality of sequential waveforms obtained from a waveform-source device into the computer system, orders the waveforms in a primal array, wherein each sequential waveform constitutes a successive row vector of the primal array, and removes phase factors due to drift using a dephasor that transforms the primal array into a drift-compensated array.

Another aspect of the apparatus for compensating a plurality of sequential waveforms and profiles derived therefrom for effects of drift is that the dephasor that transforms the primal array into the drift-compensated array applies a Fourier transform to the primal array of row vectors to form an array of Fourier-transformed row vectors, multiplies each Fourier-transformed row vector by a complex conjugate of each Fourier-transformed row vector to form a squared moduli vector thereby removing phase factors due to drift, takes the square root of each element of the squared moduli vector to create a corresponding moduli vector, and forms a drift-compensated array of moduli vectors by successively sequencing the moduli vectors as successive drift-compensated row vectors in a drift-compensated array, wherein the moduli vectors constitute moduli of Fourier-transformed waveforms.

Another aspect of the apparatus for compensating a plurality of sequential waveforms and profiles derived therefrom for effects of drift is that the waveform transformer outputs the drift-compensated row vectors of the drift-compensated array as a sequential series of moduli of Fourier-transformed waveforms.

Another aspect of the apparatus for compensating a plurality of sequential waveforms and profiles derived therefrom for effects of drift is that the dephasor that transforms the primal array into the drift-compensated array fits each waveform in the primal array using selected reference waveforms, calculates a corresponding reference weighting factor for each reference waveform corresponding to each waveform in the primal array, synthesizes a corresponding drift-compensated waveform given by the sum of each selected reference waveform multiplied by the corresponding reference weighting factor thereby removing phase factors due to drift, and forms a drift-compensated array by successively sequencing the drift-compensated waveforms as successive drift-compensated row vectors in the drift-compensated array.

Another aspect of the apparatus for compensating a plurality of sequential waveforms and profiles derived therefrom for effects of drift is that the waveform transformer outputs to an output device analytical results selected from the group consisting of the selected reference waveforms used in the fitting procedure, the drift-compensated row vectors of the drift-compensated array as a sequential series of drift-compensated waveforms, reference weighting factors for each reference waveform corresponding to each waveform in the primal array as a set of drift-compensated reference-waveform profiles, and phase factors due to drift for each reference waveform corresponding to each waveform in the primal array as a set of phase-factor profiles.

Another aspect of the apparatus for compensating a plurality of sequential waveforms and profiles derived therefrom for effects of drift is that the principal-factor determinator includes a factor analyzer.

Another aspect of the apparatus for compensating a plurality of sequential waveforms and profiles derived therefrom for effects of drift is that the factor analyzer forms a covariance array from the drift-compensated array, applies an eigenanalysis to the covariance array to define a complete set of eigenvectors and eigenvalues, and defines a set of drift-compensated principal factors as a subset of eigenvectors determined by a selector operating on the complete set of eigenvectors.

Another aspect of the apparatus for compensating a plurality of sequential waveforms and profiles derived therefrom for effects of drift is that the selector operates on the complete set of eigenvectors to define the set of drift-compensated principal factors as a first few eigenvectors corresponding to eigenvalues above a certain limiting value.

Another aspect of the apparatus for compensating a plurality of sequential waveforms and profiles derived therefrom for effects of drift is that the principal-factor determinator includes a linear-least-squares analyzer.

Another aspect of the apparatus for compensating a plurality of sequential waveforms and profiles derived therefrom for effects of drift is that the linear-least-squares analyzer selects a set of initial factors from the set of drift-compensated row vectors of the drift-compensated array, performs a linear-least-squares decomposition with the set of initial factors on the drift-compensated row vectors in the drift-compensated array to provide a set of residue factors, and performs a Gram-Schmidt orthonormalization on the combined set of initial factors and residue factors to provide drift-compensated principal factors.

Another aspect of the apparatus for compensating a plurality of sequential waveforms and profiles derived therefrom for effects of drift is that the profile generator defines a set of drift-compensated target factors on a space of the drift-compensated principal factors determined by a target-factor constructor operating on the drift-compensated principal factors, applies the set of drift-compensated target factors to a profile trajectory lying within a space of drift-compensated principal factors to obtain a sequential set of target-factor weighting factors corresponding to the drift-compensated target factors for the profile trajectory, and outputs to an output device analytical results selected from the group consisting of a set of drift-compensated scaled target-factor profiles derived from the set of target-factor weighting factors, and the set of drift-compensated target factors.

Another aspect of the apparatus for compensating a plurality of sequential waveforms and profiles derived therefrom for effects of drift is that the target-factor constructor generates a profile trajectory on a 3-dimensional projection of a 4-dimensional space of a set of first-four, drift-compensated principal factors along with a reference tetrahedron the vertices of which represent each of the first-four, drift-compensated principal factors; encloses the profile trajectory within an enclosing tetrahedron with vertices centered on end-points and in proximity to turning points of the profile trajectory, and with faces lying essentially tangent to portions of the profile trajectory, and calculates the drift-compensated target factors from the normed coordinates of the vertices of the enclosing tetrahedron in terms of the drift-compensated principal factors.

Another aspect of the apparatus for compensating a plurality of sequential waveforms and profiles derived therefrom for effects of drift is that the target-factor constructor in generating the profile trajectory further calculates 4-space coordinates of a profile trajectory of drift-compensated target-factor profiles on a 4-dimensional space to produce four coordinates for each point in the profile trajectory, one coordinate for each of the first-four, drift-compensated principal factors; reduces the dimensionality of the coordinates of the profile trajectory by dividing each coordinate by a sum of all four 4-space coordinates to produce normed coordinates for the profile trajectory; and, plots the normed coordinates for the profile trajectory in a 3-dimensional space the coordinate axes of which are edges of a reference tetrahedron the vertices of which correspond to unit values for each of the first-four, drift-compensated principal factors in a manner analogous to plotting of coordinates on a quaternary phase diagram.

In another embodiment of the present invention, an article of manufacture comprising a program storage medium readable by a computer is disclosed. The medium tangibly embodies one or more programs of instructions executable by the computer to perform a method for compensating a plurality of sequential spectra and profiles derived therefrom for effects of drift wherein the method includes transforming a plurality of sequential spectra obtained from a spectrometer to provide an array of drift-compensated row vectors, wherein the array of drift-compensated row vectors constitutes a drift-compensated array, performing a principal-factor determination on the drift-compensated array to provide a set of drift-compensated principal factors, and generating drift-compensated scaled target-factor profiles from a profile trajectory of the drift-compensated row vectors lying within a space of drift-compensated principal factors.

In another embodiment of the present invention, an article of manufacture comprising a program storage medium readable by a computer, having a medium tangibly embodying one or more programs of instructions executable by the computer to perform a method for compensating a plurality of sequential spectra and profiles derived therefrom for effects of drift, the method further includes generating drift-compensated compositional profiles from the set of drift-compensated scaled target-factor profiles.

In a further embodiment of the present invention, an article of manufacture comprising a program storage medium readable by a computer, having a medium tangibly embodying one or more programs of instructions executable by the computer to perform a method for compensating a plurality of sequential waveforms and profiles derived therefrom for effects of drift, the method includes transforming a plurality of sequential waveforms obtained from a waveform-source device to provide an array of drift-compensated row vectors, wherein the array of drift-compensated row vectors constitutes a drift-compensated array, performing a principal-factor determination on the drift-compensated array to provide a set of drift-compensated principal factors, and generating drift-compensated scaled target-factor profiles from a profile trajectory of the drift-compensated row vectors lying within a space of drift-compensated principal factors.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of a method and an apparatus in accordance with the invention.

BRIEF DESCRIPTION OF THE DRAWINGS

Referring now to the drawings in which like reference numbers represent corresponding parts throughout:

FIG. 5 is a waterfall plot exemplifying a sequential series of moduli of Fourier-transformed spectra, or waveforms, of FIG. 2 wherein the effects of drift have been compensated according to a version of the present invention;

EXAMPLE FROM THE RELATED ART

Figure 1:
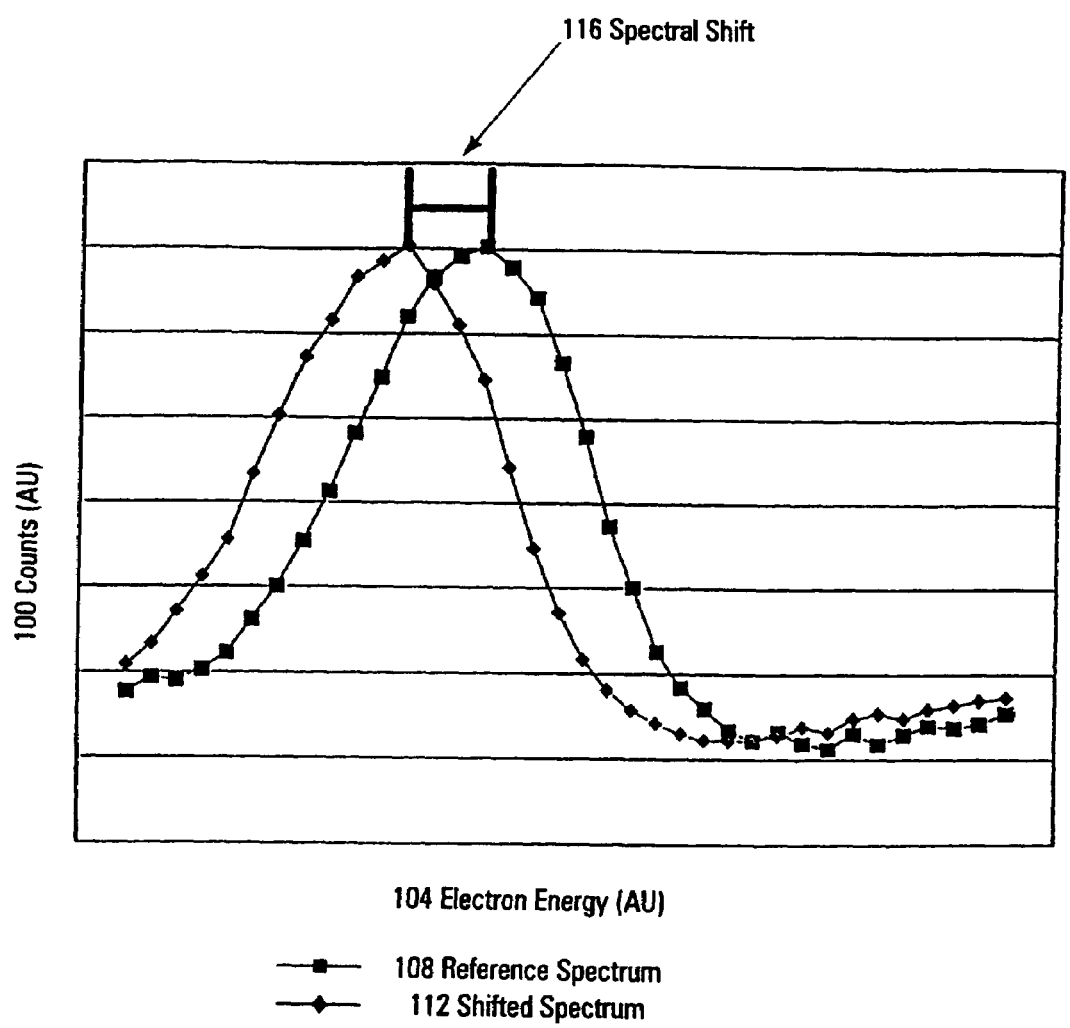
FIG. 1 is a line drawing demonstrating the effect of a shift due to drift on a spectrum, or waveform, of the prior art.

FIG. 1 illustrates how drift is manifested between two spectra that are members of a set of a sequential series of spectra. FIG. 1 shows a reference spectrum, 108, displayed as a plot of intensity measured in arbitrary units (AU) of counts, 100, along the ordinate versus electron energy in arbitrary units (AU), 104, along the abscissa. The spectrum appears as a series of points giving intensity, i.e. counts, vs. channel number, i.e. energy. Those skilled in the art will recognize that the units of intensity can also be given in counts/second; the description that follows applies without loss of generality to either set of units for intensity, as well as any others customarily used. These spectra can also be viewed as electronic waveforms, or uniform time-series segments, in which case, the points would give amplitude of current or voltage vs. time, and data value vs. time, respectively. Drift causes a spectral shift, 116, or a translation of the reference spectrum, 108, in the negative direction into the shifted spectrum, 112. Viewing the reference spectrum, 108, as a waveform, the shifted spectrum, 112, can be viewed as a phase shifted waveform, 112, that preserves the overall shape of the reference waveform, 108; the shifted waveform, 112, has been phase shifted by the amount of the spectral shift, 116, so that the shifted waveform, 112, now leads the reference waveform by a phase shift, 116.

It is easily seen that a phase shift might also occur in the opposite direction so as to produce a shifted waveform that lags the reference waveform. It is useful to view one aspect of the invention as a means of correcting arbitrary phase shifts in a sequential series of waveforms. The advantage of viewing the invention in this way is that it lends itself well to a description in terms of the Fourier transform (FT); certain properties of the Fourier transform (FT) have been utilized to the benefit of the invention as will be described subsequently in greater detail.

Figure 2:
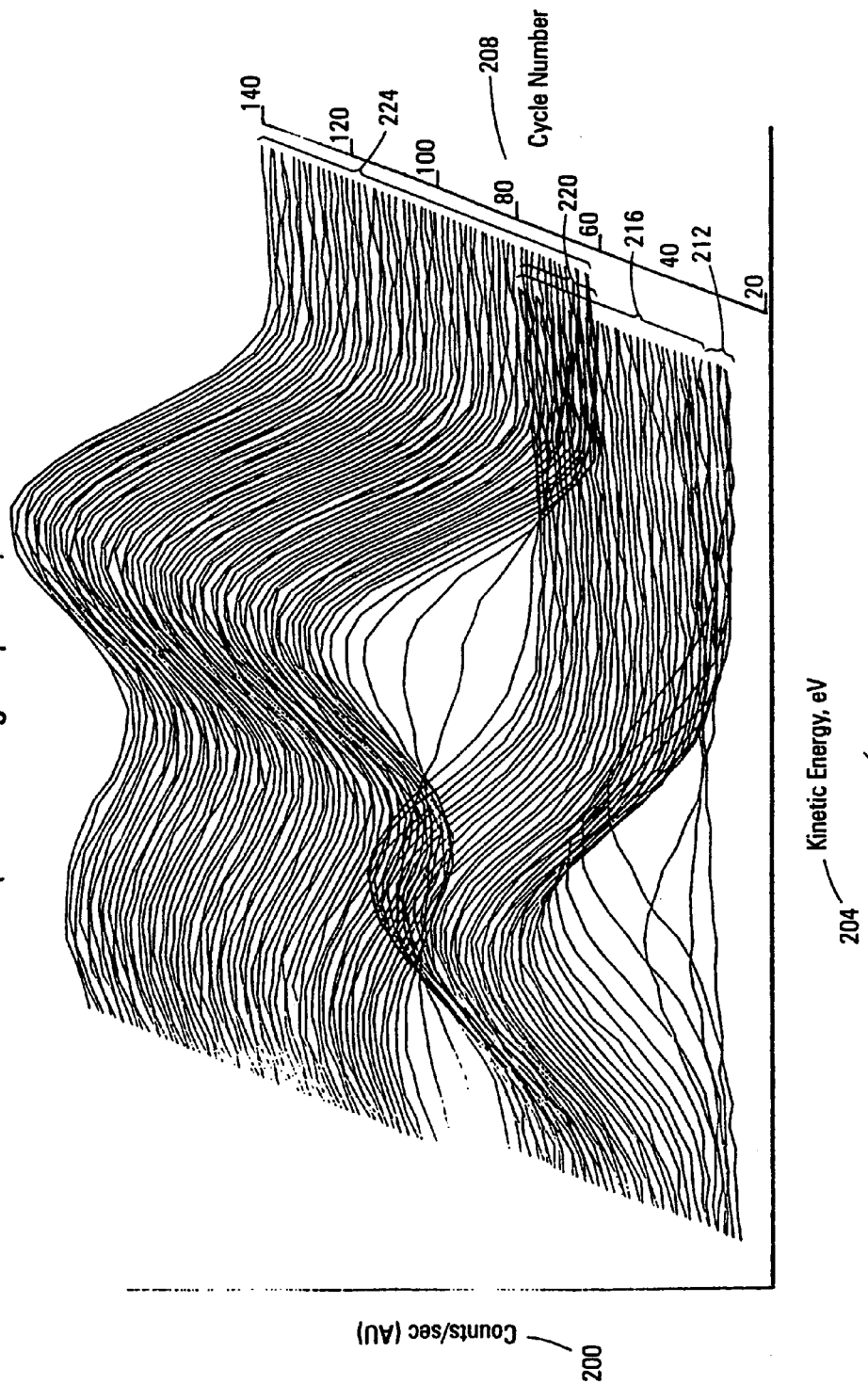
FIG. 2 is a waterfall plot exemplifying a sequential series of drifted spectra, or waveforms, of the prior art.

FIG. 2 shows a sequential series of Auger electron spectra of the prior art that exhibit the effects of drift. These spectra were obtained in a sputter-depth-profile analysis of a sample. Sputter-depth-profile analysis is a procedure in which an ion beam is used to mill away layers of the sample so that electrons escaping from the surface of the sample can reach an electron spectrometer for analysis. Each spectrum in the series was obtained after removal of a layer of material from the surface of the sample in a sputter-depth-profile analysis. Note that most electron spectroscopies are surface sensitive analytical techniques wherein only electrons coming from within a few mean free paths of the surface, on the order of a few nanometers, are able to reach a spectrometer; thus, sputter-depth-profile analysis can be used to obtain a compositional analysis of a layered structure as successive surface layers are exposed for analysis by the spectrometer.

The spectra of FIG. 2 are displayed in a waterfall style plot of intensity measured in units of counts/sec (c/s), 200, along the ordinate versus electron kinetic energy in units of electron Volts (eV), 204, along the abscissa, and offset by equal increments along a third axis, 208, which gives the cycle number, i.e. index number, or position of the spectrum in the series of spectra. For clarity, the figure starts with cycle 20. Cycles 20 through 25, 212, correspond to anomalous spectra from surface layers not relevant to the subsequent analysis. Cycles 26 through 61, 216, are spectra obtained from a $SiO_2$ layer; this $SiO_2$ layer is situated on top of a silicon substrate, the spectra of which correspond to cycles 66 through 122, 224; and the interfacial region between $SiO_2$ and Si corresponds to cycles 62 through 65, 220. The spectra from the $SiO_2$ layer, 216, show clear evidence of drift induced by charging of the $SiO_2$ that occurs during the sputter-depth-profile analysis. The drift of the Auger electron spectra obtained from strata in the $SiO_2$ is clearly manifested as a displacement of each $SiO_2$ spectrum along the kinetic energy axis, 204, and is most readily apparent from the shift in the location of the peak in intensity of individual $SiO_2$ spectra. One embodiment of the invention is directed to compensation for the effects of drift due to charging in spectra such as these $SiO_2$ spectra, 216.

It should be apparent to those skilled in the art that similar problems could arise particularly in other forms of electron spectroscopy, more generally in other forms of spectroscopy, and in the analysis of waveforms, i.e. electronic waveforms, or uniform time-series segments.

Figure 3:
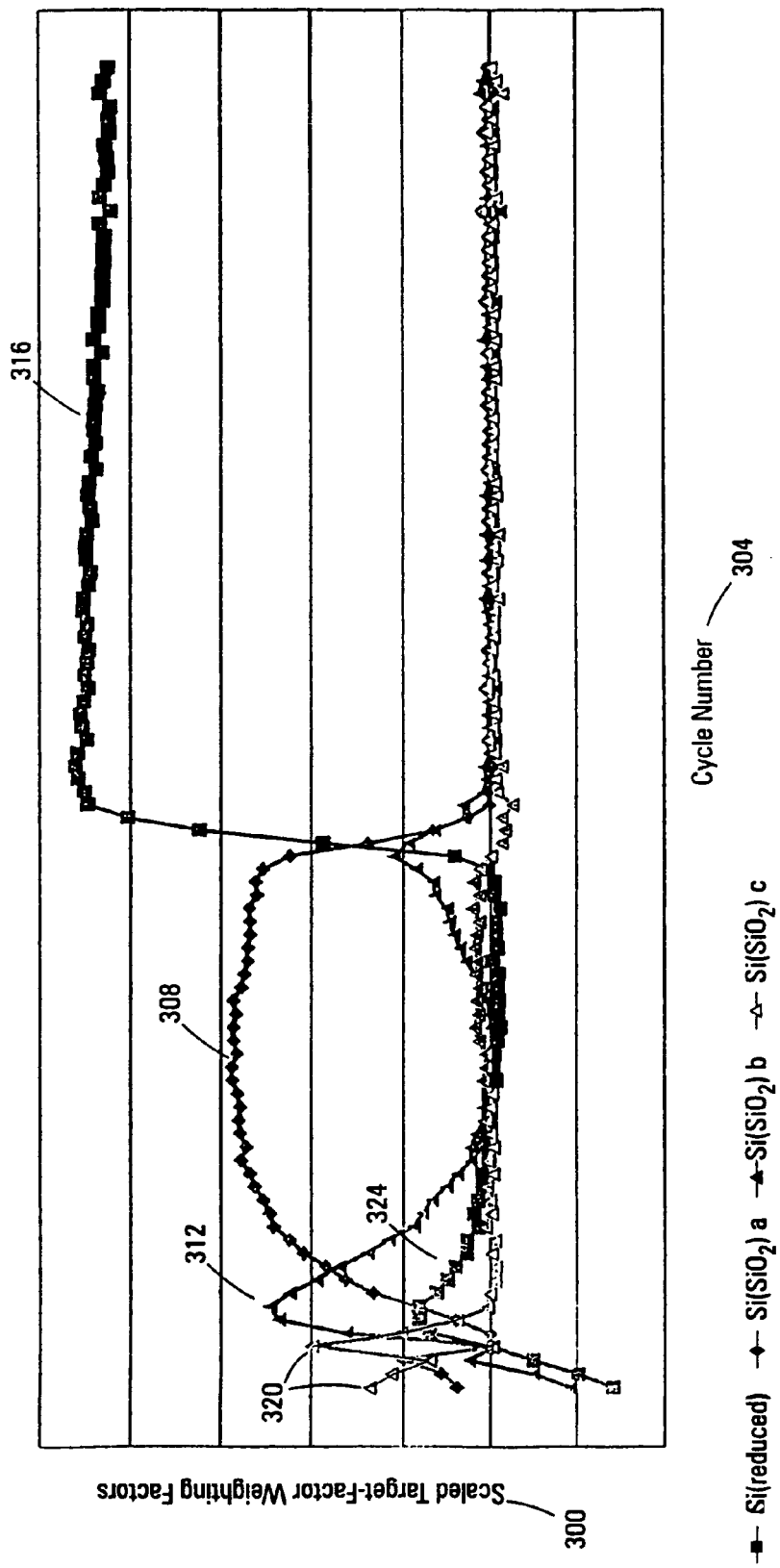
FIG. 3 is a line drawing exemplifying scaled target-factor profiles derived from a sequential series of drifted spectra, or waveforms, corresponding to FIG. 2 by the prior-art method.

The motivation for the invention will become even clearer when reference is made to FIG. 3. When prior-art methods are applied to obtain a depth profile based on the drifted spectra of FIG. 2, the results of the analysis are those shown in FIG. 3. The prior-art method for treating such sequential series of spectra is discussed in great detail in "Factor Analysis in Chemistry", Edmund R. Malinowski and Darryl G. Howery, John Wiley and Sons, 1980. FIG. 3 is a target-factor profile which shows a plot of the scaled target-factor weighting factors, 300, from a factor analysis of uncompensated Auger spectra corresponding to target factors identified with particular constituents within various layers of the sample's structure as a function of depth within the sample as measured by the cycle number, 304, in the sputter-etching sequence.

In this case, target-factor profiles provide a qualitative compositional depth profile of the distribution of constituents below the surface of the sample. The target-factor profiles are precursors to true compositional profiles that require further quantification to adjust for variations in the sensitivity of the spectrometer to spectra arising from distinct chemical constituents. Analysts often dispense with the further quantification required by compositional profiles, because the target-factor profiles qualitatively represent the relative compositional changes associated with variations in the relative amounts of distinct chemical constituents in the sample, which is more than adequate to address most questions associated with the chemical nature of the sample.

FIG. 3 clearly shows the target-factor profile, i.e. depth profile, corresponding to Si, 316, and 324. The portion of this profile associated with the substrate, 316, which as a result of its conductive properties exhibits the uniform weighting of the target factors that is a signature for the absence of drift expected from a non-charging layer. Since the $SiO_2$ layer is charging, the use of the prior-art techniques results in the identification of multiple constituents within the $SiO_2$ layer corresponding to target-factor profiles, i.e. depth profiles, from target factors for three $SiO_2$ constituent species $SiO_2$ (a), 308, $SiO_2$ (b), 312, and $SiO_2$ (c), 320, and also a spurious Si constituent species, 324, which appears at the beginning of the profile, when it is known that only one chemical species of $SiO_2$ was present within the $SiO_2$ layer. An embodiment of the invention for applications in Auger electron spectroscopy is directed to the amelioration of this troublesome identification of spurious constituents within charging layers.

DETAILED DESCRIPTION OF THE INVENTION

In the following description of the exemplary embodiment, reference is made to the accompanying drawings which form a part hereof, and in which is shown by way of illustration a specific embodiment in which the invention may be practiced. It is to be understood that other embodiments may be utilized as structural changes may be made without departing from the scope of the present invention.

The present invention applies to electron spectroscopic analysis systems such as Auger electron, x-ray photoelectron, and electron energy loss spectroscopy analysis systems. In addition, the present invention also applies to spectroscopic analysis systems in general, wherein drift might affect a sequential series of spectra and profiles derived therefrom, and even more generally to waveform analysis systems, wherein phase shifts might be manifested as leads or lags in a sequential series of electronic waveforms, or time series. Time series are defined as ". . . sequences, discrete or continuous, of quantitative data assigned to specific moments in time . . ." in "Extrapolation, Interpolation, and Smoothing, of Stationary Time Series," N. Wiener, pg. 1, MIT Press, Cambridge, Mass., 1966.

In particular, the attached description of the embodiments for spectra may be seen to apply equally well to waveforms; and even though the substitutions of the terms: waveform for spectrum, waveforms for spectra, waveform-source device for spectrometer, may at times not be explicitly made in the following description, it should be implicitly understood that embodiments addressed to spectrum, spectra, and spectrometer may be understood to apply equally well to waveform, waveforms, and waveform-source device, resp., when the aforementioned substitution of terms is made.

Furthermore, in the specification of the invention, the term waveform is defined in the more generic sense of any of the following: electronic waveform, electronic signal, uniform time-series segment, or uniform data stream segment, where the term, uniform time-series segment, is defined to mean a time-series segment of length equal to the length in time of all other time-series segments of which a time series is composed when the time series is considered as a sequential series of such uniform time-series segments concatenated to form the time series; and, where uniform data stream segments are defined relative to a data stream in an analogous fashion to uniform time-series segments relative to a time series. In particular, it should be implicitly understood that embodiments addressed to waveform, waveforms, and waveform-source device may be understood to apply equally well to uniform time-series segment, time series, and time-series source, resp., when the following substitution of terms is made: uniform time-series segment for waveform, time series for waveforms, time-series source for waveform-source device. Therefore, because of the aforementioned relationship between waveform and spectrum, and from the transitivity of the relationships amongst spectrum, waveform, and uniform time-series segment, it should also be implicitly understood that embodiments addressed to spectrum, spectra, and spectrometer may be understood to apply equally well to uniform time-series segment, time series, and time-series source, resp., when the following substitution of terms is made: uniform time-series segment for spectrum, time series for spectra, time-series source for spectrometer.

Figure 4B:
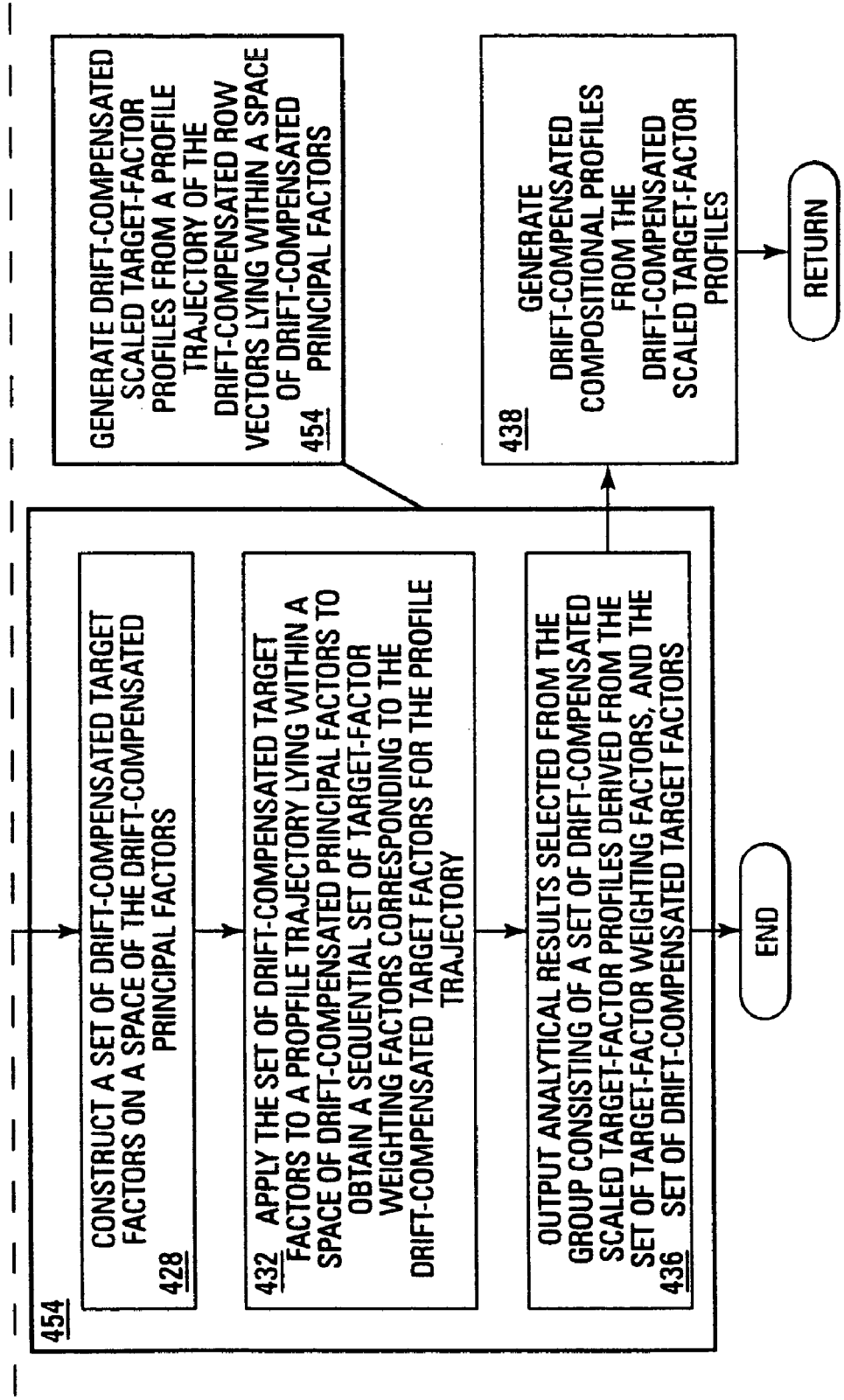
FIG. 4 is a flow chart of a method used in various embodiments of the invention, a method for compensating waveforms, spectra, and profiles derived therefrom for effects of drift.

FIG. 4 illustrates a spectral processing method for compensating a plurality of sequential spectra and profiles derived therefrom for effects of drift, 400. First, a plurality of sequential spectra obtained from a spectrometer is transformed to provide an array of drift-compensated row vectors constituting a drift-compensated array, 450. Second, a principal-factor determination is performed on the drift-compensated array to provide a set of drift-compensated principal factors, 452. Third, drift-compensated scaled target-factor profiles are generated from a profile trajectory of the drift-compensated row vectors lying within a space of drift-compensated principal factors 454.

Performing the principal-factor determination can comprise performing a factor analysis; alternatively, performing the principal-factor determination can comprise performing a linear-least-squares analysis. The selection by the analyst of either factor analysis or linear-least-squares analysis depends on the nature of the sample and the behavior of the spectra and is described subsequently in greater detail. However, the specific embodiment directed to factor analysis is detailed in block, 452, of FIG. 4. The analyst can also elect to generate drift-compensated compositional profiles from the drift-compensated scaled target-factor profiles, if further quantification is desired, which is described subsequently in greater detail.

Details of factor analysis as applied in the prior art are found in "Factor Analysis in Chemistry", Edmund R. Malinowski and Darryl G. Howery, John Wiley and Sons, 1980. Details of linear-least-squares analysis as applied in the prior art are found in "Operator's MultiPak Software Manual, Version 6," pps. 3–57 to 3–59, Physical Electronics, Inc., Eden Prairie, Minn., and in "Improved Dynamic Range and Automated Lineshape Differentiation in AES/XPS Composition versus Depth Profiles," D. G. Watson, Surface Interface Analysis, Vol. 15, pps. 516–524, 1990. Details of target-factor analysis as applied in the prior art, which is a component of factor-analysis methodology, are found in "Operator's MultiPak Software Manual, Version 6," pps. 3–98 to 3–103, and pps. A-19 to A-22, Physical Electronics, Inc., Eden Prairie, Minn.

More specifically, with reference to FIG. 4 block 450, the plurality of sequential spectra is transformed by inputting a sequential series of spectra from a spectrometer into a computer system, 404. In an embodiment of the invention directed to Auger electron spectroscopy, the sequential series of spectra can comprise those obtained in a sputter-depth-profile analysis. The sputter-depth-profile analysis may be affected by drift, caused by charging. Then, the individual spectra from the sequential series are ordered into a primal array of row vectors wherein each sequential spectrum constitutes a successive row vector of the primal array ordered so that the first spectrum is the first row vector and each subsequent spectrum is each subsequent row vector until the array is completed by the last spectrum constituting the last row vector, 408. Then, phase factors due to drift are removed from the individual row vectors of the primal array using a dephasing procedure (various embodiments of which are subsequently described) that transforms the primal array into a transformed array of row vectors that has been compensated for drift, i.e. an array of drift-compensated row vectors, a drift-compensated array, 412.

If the analyst so chooses, this drift-compensated array, can be output, 414. Depending on the choice of dephasing procedure, the drift-compensated array is either an array of moduli of Fourier-transformed spectra wherein phase factors due to drift are nullified, or an array of drift-compensated spectra. The drift-compensated row vectors of these respective drift-compensated arrays is output as either a sequential series of moduli of Fourier-transformed spectra, or as a sequential series of drift-compensated spectra. The style of output can be chosen from various forms known to those skilled in the art, but a preferred form embodied in this invention is that of a waterfall style plot of a sequential series of moduli of Fourier-transformed spectra, or drift-compensated spectra. In addition, the analyst may also find it desirable at this point to output a variety of other analytical results made available through the dephasing procedure.

With reference to FIG. 4 block 452, a principal-factor determination using factor analysis is performed by first forming a covariance array from the drift-compensated array by multiplying the array by its transpose, 416. Then, an eigenanalysis is applied to the covariance array to define a complete set of eigenvectors and eigenvalues, 420. Next, a set of drift-compensated principal factors is defined by selecting a subset of eigenvectors from the complete set of eigenvectors, 424. The selection procedure for defining the drift-compensated principal factors comprises selecting those eigenvectors that correspond to eigenvalues significantly above a baseline that is determined by eigenvalues that are so small as may be easily inferred to be associated with random statistical fluctuations in the data, which are known in the art as noise, i.e. noise eigenvalues.

An eigenvalue is defined by James and James in "Mathematics Dictionary", Van Nostrand Reinhold Co., 1968, 3rd ed., pg. 123, by the following: "For a matrix, A, the eigenvalues are the roots of the characteristic equation of the matrix . . . ; the number $\lambda$ being an eigenvalue means that there is a nonzero vector x . . . such that $Ax=\lambda x$." This equation also defines x as an eigenvector. A, the matrix, is seen to be synonymous with the term array in the sense used above by those skilled in the art. Eigenanalysis is the procedure of determining the complete set of eigenvectors and eigenvalues of an array, or matrix. In the context of chemical factor analysis of spectra, these eigenvectors constitute the set of vectors from which are chosen the drift-compensated principal factors of the factor analysis. These procedures are well known to those skilled in the art, and are given in detail in the reference, "Factor Analysis in Chemistry", Edmund R. Malinowski and Darryl G. Howery, John Wiley and Sons, 1980.

As an alternative to factor analysis, FIG. 4 block 452, the analyst can chose to perform the principal-factor determination using a linear-least-squares analysis. The linear-least-squares analysis comprises selecting a set of initial factors from the set of drift-compensated row vectors of the drift-compensated array, performing a linear-least-squares decomposition with the set of initial factors on the drift-compensated row vectors in the drift-compensated array to provide a set of residue factors, and performing a Gram-Schmidt orthonormalization on the combined set of initial factors and residue factors to provide drift-compensated principal factors. The details of this analysis are described subsequently.

Although linear-least-squares analysis is an alternative to factor analysis, depending on the nature of the spectra, one or the other technique may be preferred to facilitate the principal-factor determination. This is a judgement that is made by the analyst based upon inspection of the drift-compensated row vectors of the drift-compensated array. For example, if it appears that the drift-compensated spectra or moduli of Fourier-transformed spectra are very regular with minimal mixing of spectra from different constituents in interfacial regions, then the linear-least-squares approach is preferable to factor analysis. On the other hand, if it is difficult to discern regularly repeating drift-compensated spectra or moduli of Fourier-transformed spectra for successive cycle numbers in the drift-compensated array, then factor analysis is preferable to linear-least-squares analysis. The ease with which the judgement of which principal-factor-determination technique to choose is made depends on the experience of the analyst, and is a skill that is refined as the analyst gains greater familiarity with the two techniques.

With reference to FIG. 4 block 454, the generation of drift-compensated scaled target-factor profiles requires first that a set of drift-compensated target factors be defined by a suitable linear combination of drift-compensated principal factors. Selection procedures known to those skilled in the art for defining target factors are detailed in "Factor Analysis in Chemistry", Edmund R. Malinowski and Darryl G. Howery, John Wiley and Sons, 1980. However, a novel procedure previously developed by the inventors was applied to the drift-compensated principal factors to obtain drift-compensated target factors. An embodiment of the invention employing this procedure is based on the use of a geometric representation of the behavior of the eigenvalues as a profile trajectory within a space defined by the four most dominant, i.e. first-four, drift-compensated principal factors to determine the drift-compensated target factors. The drift-compensated scaled target-factor profiles are generated from a profile trajectory of the drift-compensated row vectors lying within a space of drift-compensated principal factors by first defining a set of drift-compensated target factors by a shear transformation on a space of the drift-compensated principal factors, 428, (the embodiment of which is subsequently described in detail.) With further reference to FIG. 4 block 454, after constructing the set of drift-compensated target factors, 428, the set of drift-compensated target factors are applied to a profile trajectory lying within the space of drift-compensated principal factors to obtain a sequential set of target-factor weighting factors corresponding to the drift-compensated target factors for the profile trajectory, 432. Then, a set of drift-compensated scaled target-factor profiles derived from the set of target-factor weighting factors are output displaying the relative contribution from each drift-compensated target factor versus each corresponding cycle number in the sequential series of spectra, 436. In addition, at this point, the analyst may find it convenient to output the drift-compensated target factors, themselves, which, in the case of spectra, may provide useful information on the nature of chemical constituents present in the sample. Thus, the procedure of generating drift-compensated scaled target-factor profiles also comprises outputting analytical results selected from the group consisting of a set of drift-compensated scaled target-factor profiles derived from the set of target-factor weighting factors, and the set of drift-compensated target factors.

For many purposes, this is sufficient reduction of the data and completes the analysis. However, as indicated earlier, when the initial data are spectra, it is sometimes desirable to further generate drift-compensated compositional profiles from the drift-compensated scaled target-factor profiles, which is subsequently described in detail. This completes a descriptive overview of the invention.

EXAMPLES DEMONSTRATING THE UTILITY OF THE INVENTION

The following describes exemplary applications of the invention based on two alternative embodiments of the dephasing procedure.

Example Employing Dephasing Procedure Based on the Fourier Transform

The utility of the invention may be seen from a discussion of the following example, an application of the method to a classic problem, viz. the characterization of a charging $SiO_2$ layer on Si, well known to those skilled in the art of the electron spectroscopic analysis of microelectronic circuit structures. This example demonstrates the general utility of the invention for eliminating the effects of drift due to charging that can occur during a sputter-depth-profile analysis providing a sequential series of Auger spectra, as well as compositional depth profiles derived therefrom.

As described earlier, FIG. 2 shows a sequential series of Auger spectra obtained during a sputter-depth-profile analysis of a layer of $SiO_2$ on Si. When these are quantified by the usual procedures of chemical factor analysis the depth profiles, i.e. target-factor profiles, shown in FIG. 3 result. As a consequence of the effects of charging, factor analysis applied to spectra uncompensated for the effects of drift, as is practiced in the prior art, results in the identification of at least four different species in the $SiO_2$ layer, which is known to consist of only a single constituent. The contributions from these charging $SiO_2$ species and spurious Si constituent are seen as profiles 308, 312, 320, and 324 at the surface of the $SiO_2$ layer, resp., in FIG. 3 and give the false impression that there are four distinctly different constituents in the $SiO_2$ layer which is one of the main problems with analysis based on the prior art.

FIG. 5 shows the result of dephasing the spectra of FIG. 2 using the method of the invention flow-charted in FIG. 4 incorporating a dephasing procedure based on the Fourier transform as described subsequently in FIG. 10. The amplitude of the moduli of Fourier-transformed spectra in arbitrary units (a.u.), each of which constitutes a row vector of one embodiment of the drift-compensated array, are plotted along the ordinate, 500, versus frequency in arbitrary units (a.u.), measured along the abscissa, 504; the moduli have been offset by equal increments along a third axis, 508, which gives the cycle number, i.e. index number, so that they are displayed in a waterfall style of plot. As illustrated in FIG. 5, the set of charging $SiO_2$ spectra, 216, seen in FIG. 2 have been transformed into a set of moduli of Fourier-transformed spectra, i.e. fast Fourier transforms of the spectra, 516, where the phase factor due to drift has been nullified. The uniform shape of these moduli over the charging strata of the $SiO_2$ layer corresponding to cycles 26 through 61 now clearly shows the stationary behavior expected for the single constituent, $SiO_2$, within this layer. Also seen in FIG. 5 are a series of moduli corresponding to the Si layer for cycles 66 through 122, 524, and a set of moduli corresponding to the interfacial region of cycles 62 through 65, 520. For completeness, the moduli corresponding to the first few spectra from the surface of the sample for cycles 20 through 25, 512, are shown. The moduli from cycles 1 through 19 were irregular and irrelevant for the purpose of this analysis; therefore, for clarity, moduli from these cycles do not appear in FIG. 5.

Figure 6:
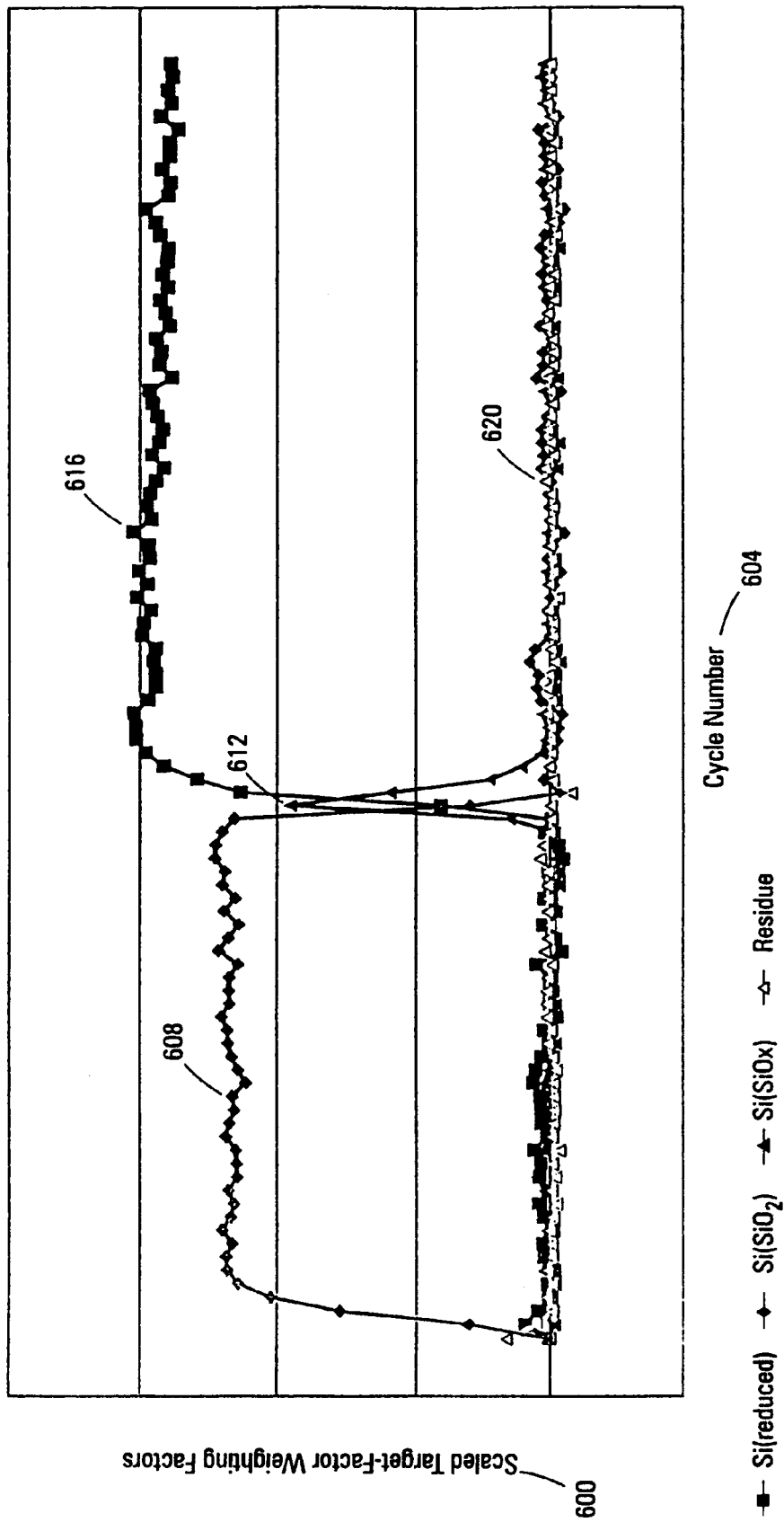
FIG. 6 is a line drawing exemplifying drift-compensated scaled target-factor profiles derived from the sequential series of moduli of Fourier-transformed spectra, or waveforms, of FIG. 2 wherein the effects of drift have been compensated according to a version of the present invention.

When a factor analysis is performed on this array of moduli using an eigenanalysis and subsequent steps in the spectral processing procedure for drift compensation are applied, as described in the method of the invention, a depth profile compensated for the effects of drift due to charging is obtained as shown in FIG. 6. In this figure, drift-compensated scaled target-factor profiles for various constituents identified with drift-compensated target factors are plotted as scaled target-factor weighting factors, 600, derived from Fourier-transformed spectra for a depth profile of charging $SiO_2$ on Si versus etch cycle number, 604. Note that now a drift-compensated target-factor profile associated with a single constituent is found for the $SiO_2$ layer, 608. FIG. 6 also shows the drift-compensated scaled target-factor profiles corresponding to the Si substrate, 616, and the interface, 612. The drift-compensated target-factor profile 612 has been identified with an interfacial phase of $SiO_x$ expected at the interface, although some contributions from mixing of terms in the moduli of Fourier-transformed spectra can not be ruled out. The low level of the drift-compensated target-factor profile corresponding to residuals of the fit indicates that the spectral intensities are well accounted for by the drift-compensated target factors associated with the major constituents in these layers, viz. $SiO_2$, Si, and possible interfacial species of $SiO_x$. The inventors have confirmed the utility of the invention in other cases, as well.

Example Employing Dephasing Procedure Based on Nonlinear-Least-Squares Fitting In the preceding description of the invention, an alternative embodiment of the dephasing procedure based on a nonlinear-least-squares fitting was briefly described. This alternative embodiment of the dephasing procedure has special utility because, in addition to providing drift-compensated scaled target-factor profiles, it provides drift-compensated spectra; these drift-compensated spectra provide to the analyst valuable additional information that is directly tied to the chemical constituents in the sample. In the following example, a hybrid procedure comprising the dephasing procedure based on a nonlinear-least-squares fitting of reference spectra to the primal spectra, and an eigenanalysis performed on the remaining residues of the primal spectra was employed to demonstrate the utility of certain aspects of the invention. In addition, this example illustrates the adaptability of various procedural embodiments through their flexible application to the object of the invention, i.e. the solution of the spectral-drift or phase-shift problem.

Figure 7:
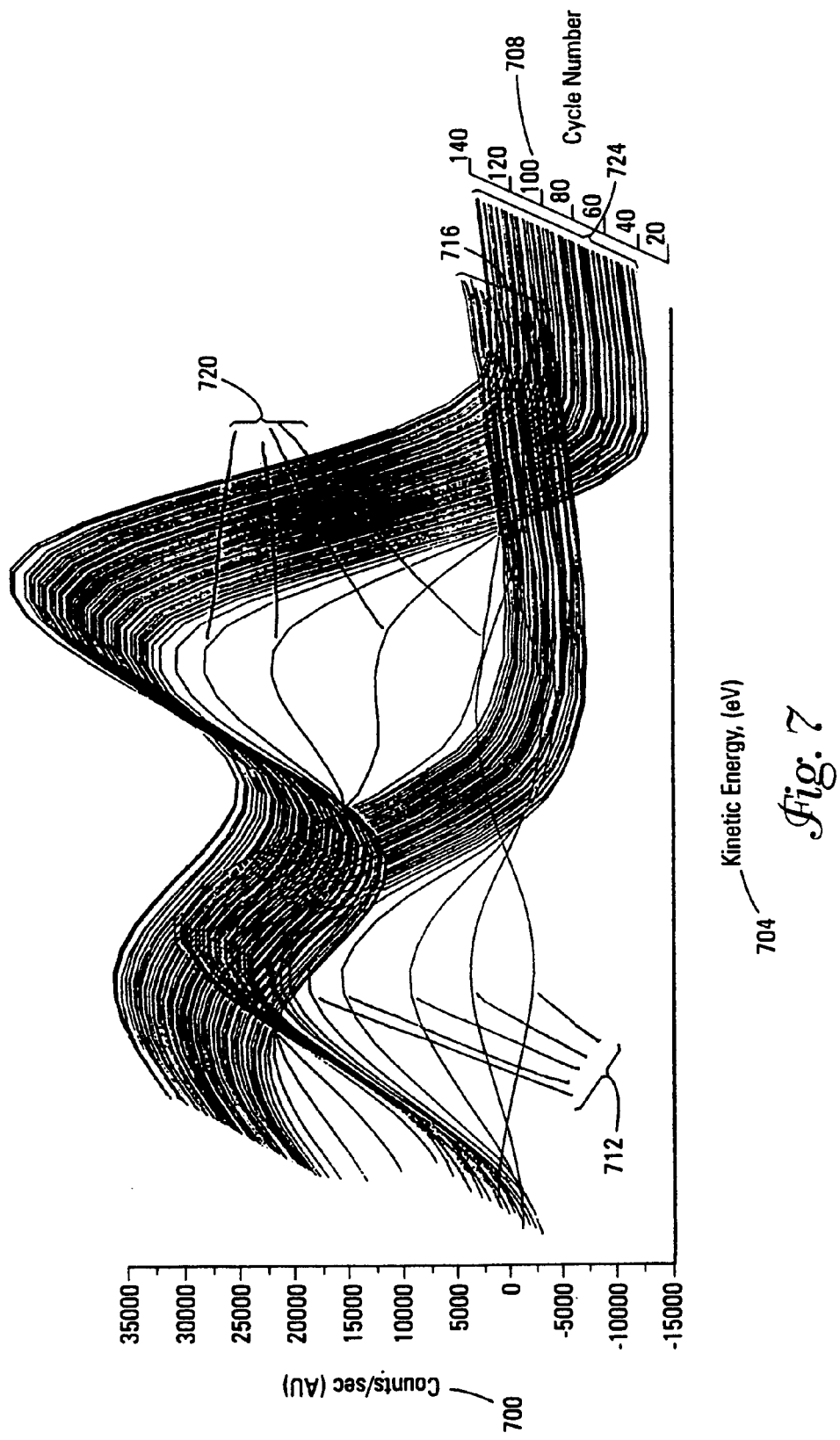
FIG. 7 is a waterfall plot exemplifying a sequential series of drift-compensated spectra, or waveforms, of FIG. 2 wherein the effects of drift have been compensated according to a version of the present invention.

Again with reference to the spectra shown in FIG. 2, FIG. 7, which is next described, shows the result of dephasing the spectra of FIG. 2 using selected procedures from the method of the invention flow-charted in FIG. 4. As is known in the art, target factors can be obtained in a variety of ways. In this example, drift-compensated target factors associated with Si and $SiO_2$ were obtained from direct inspection of the primal spectra, as suitably prepared reference spectra, by methods subsequently described in the discussion of the dephasing procedure based on nonlinear-least-squares fitting. This procedure provides an alternative embodiment for determining drift-compensated target factors, and scaled target-factor weighting factors, that makes the use of geometrical methods based on the profile trajectory unnecessary. Prior to application of the nonlinear-least-squares fitting procedure, a baseline offset value, analogous to a d.c. component of a waveform, was substracted from each spectrum in the entire data set of the primal array of spectra. The residues remaining after fitting reference spectra associated with Si and $SiO_2$ to the primal spectra were then subjected to a principal factor determination based on eigenanalysis. This provided a single principal factor associated with the interfacial constituents that remained after fitting the primal spectra with the reference spectra identified with drift-compensated target factors for Si and $SiO_2$.

Spectra obtained by fitting reference spectra for Si and $SiO_2$ to the primal spectra are displayed in FIG. 7 as a waterfall style plot of intensity measured in units of counts/sec (c/s), 700, along the ordinate versus electron kinetic energy in units of electron Volts (eV), 704, along the abscissa, and offset by equal increments along a third axis, 708, which gives the cycle number, i.e. index number, or position of the spectrum in the series of spectra. As in FIG. 2, the figure starts with cycle 20. Cycles 26 through 61, 716, are spectra obtained from a $SiO_2$ layer; this $SiO_2$ layer is situated on top of a silicon substrate, the spectra of which correspond to cycles 66 through 122, 724; and the interfacial region between $SiO_2$ and Si corresponds to cycles 62 through 65, 720. Also, the spectra corresponding to the first few spectra from the surface of the sample for cycles 20 through 25, 712, are shown. The spectra from the $SiO_2$ layer, 716, have been successfully compensated for drift and no longer show the channel offsets or phase shifts along the abscissa seen in the corresponding spectra, 216, of FIG. 2.

Although these spectra are compensated for the effects of drift due to the fitting procedure, and constitute drift-compensated spectra, they comprise synthesized spectra that show only the contributions from the target factors to the primal spectra, and do not include the contributions from the psuedo-principal factor associated with the interfacial constituent. Although these synthesized spectra give an accurate representation of the relative contributions from Si and $SiO_2$ target factors in regions where these constituents dominate, these synthesized spectra are an incomplete representation of the true behavior of the primal spectra in the interface region. This is true for two reasons: 1) these synthesized spectra lack contributions from the interfacial residues, as mentioned; 2) since the synthesized spectra are based on the adjustment of two parameters, phase shift and amplitude, i.e.

reference weighting factor, to fit the primal spectra, the optimization of both of these factors results in the loss of some contribution from the true target factor associated with the interface. In the absence of a reference spectrum for the interfacial constituent, inclusion of phase shift as a fitting parameter permits the fitting algorithm to shift a reference spectrum from its true location to minimize the error, e.g. parameters associated with goodness of fit such as Chi-square, in order to compensate for the absent intensity contributions from an interfacial constituent. Thus, the remaining residues are linear combinations of the true interfacial residue with minor, likely negative, contributions from the target factors for Si and $SiO_2$ as a result of adjustments in the phase shift parameter to minimize the error in fitting the reference spectra associated with these target factors to the primal spectra.

This situation gives rise to a difficulty similar to that encountered for application of the dephasing procedure based on the Fourier transform, in that it gives rise to uncertainties in the exact amount of interfacial constituents present. However, a heuristic method to overcome this difficulty is suggested by application of an iterative procedure similar to that described subsequently in the discussion of linear-least-squares analysis; in such an iterative procedure, residue factors extracted from an analysis of the residues are fit along with the initial reference spectra associated with Si and $SiO_2$ drift-compensated target factors to the primal spectra of the interface region until a best fit is obtained. After determining the best value for the phase shift of reference spectra in the vicinity of the interface, a linear-least-squares analysis might be performed with reference spectra that have had the phase shift parameter set to this best value. A best value for this phase shift parameter might be obtained by inspection from a plot of the phase shifts of the reference spectra versus cycle number, i.e. a phase-shift profile, which is discussed subsequently in the description of FIG. 9. Another way to obtain a best value for the phase shift is from data on the relative chemical shifts of constituent species. For example, it is well known that $SiO_2$ has a fixed chemical shift relative to Si. In the vicinity of the interface, the phase shift parameter for the $SiO_2$ target-factor reference spectrum might be set to this value relative to the Si target-factor reference spectrum; and these spectra then used in a linear-least-squares analysis of primal spectra at the interface. A complete set of drift-compensated spectra would then comprise those obtained from the nonlinear-least-squares fitting to primal spectra from non-interface regions, and those obtained from the linear-least-squares fitting to primal spectra from the interface region by the methods suggested above.

Figure 8:
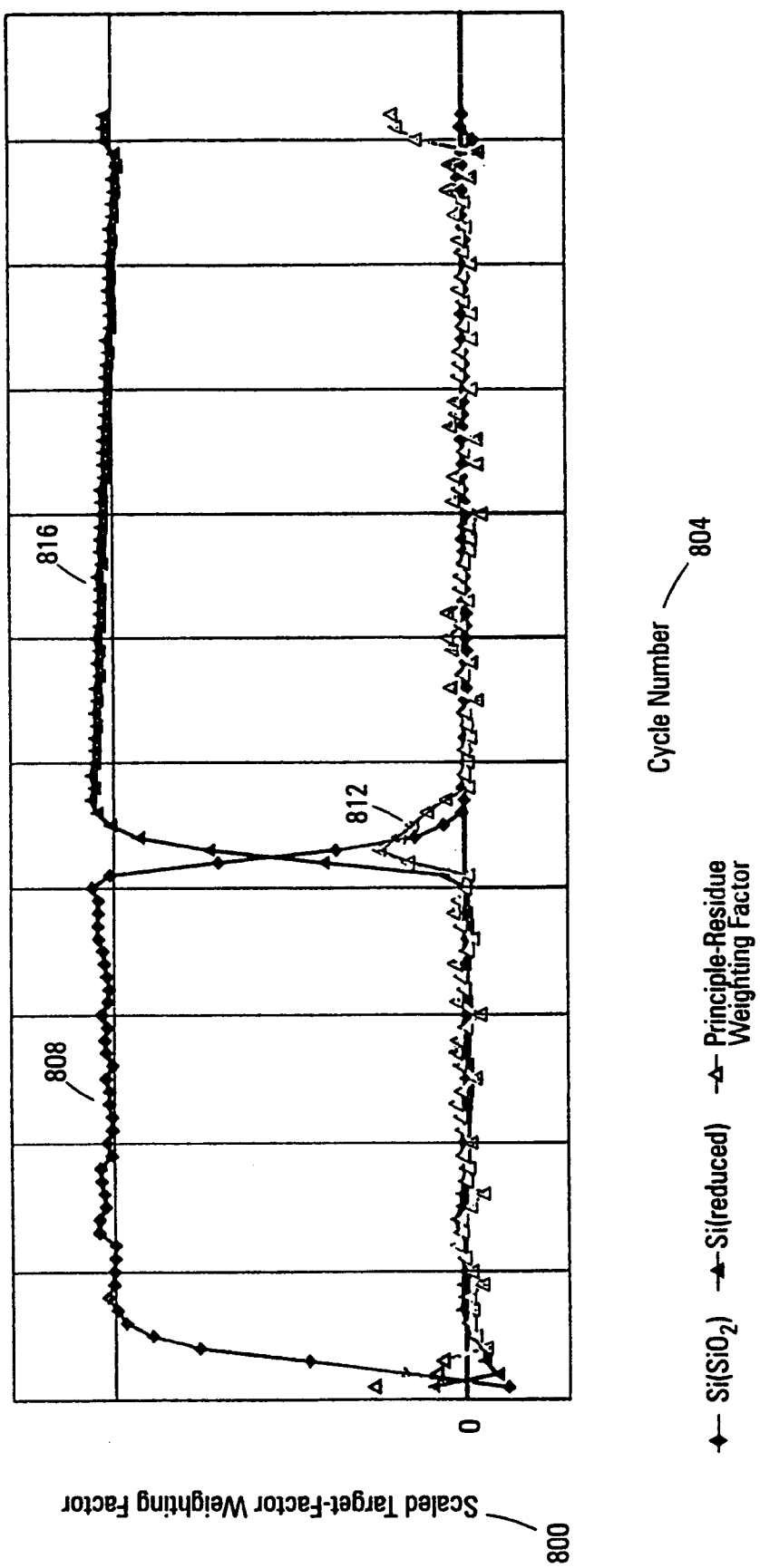
FIG. 8 is a line drawing exemplifying drift-compensated scaled target-factor profiles derived from the sequential series of spectra, or waveforms, of FIG. 2 wherein the effects of drift have been compensated according to a version of the present invention.

When scaled target-factor weighting factors constituted by the reference weighting factors of the nonlinear-least-squares analysis are plotted versus their cycle number, i.e. corresponding index number in the sequential series of spectra, a depth profile compensated for the effects of drift due to charging is obtained as shown in FIG. 8. In this figure, drift-compensated scaled target-factor profiles for various constituents identified with drift-compensated target factors are plotted as scaled target-factor weighting factors, 800, from a nonlinear-least-squares analysis of the primal spectra versus etch cycle number, 804. Note that now a drift-compensated target-factor profile associated with a single constituent is found for the $SiO_2$ layer, 808. FIG. 8 also shows the drift-compensated scaled target-factor profiles corresponding to the Si substrate, 816, and an interfacial eigenprofile, 812. The eigenprofile from an eigenanalysis of the residues, 812, has been identified with an interfacial phase of $SiO_x$ expected at the interface; therefore, the eigenprofile of the residues is more descriptively referred to as a principal-residue weighting-factor profile, 812.

Figure 9:
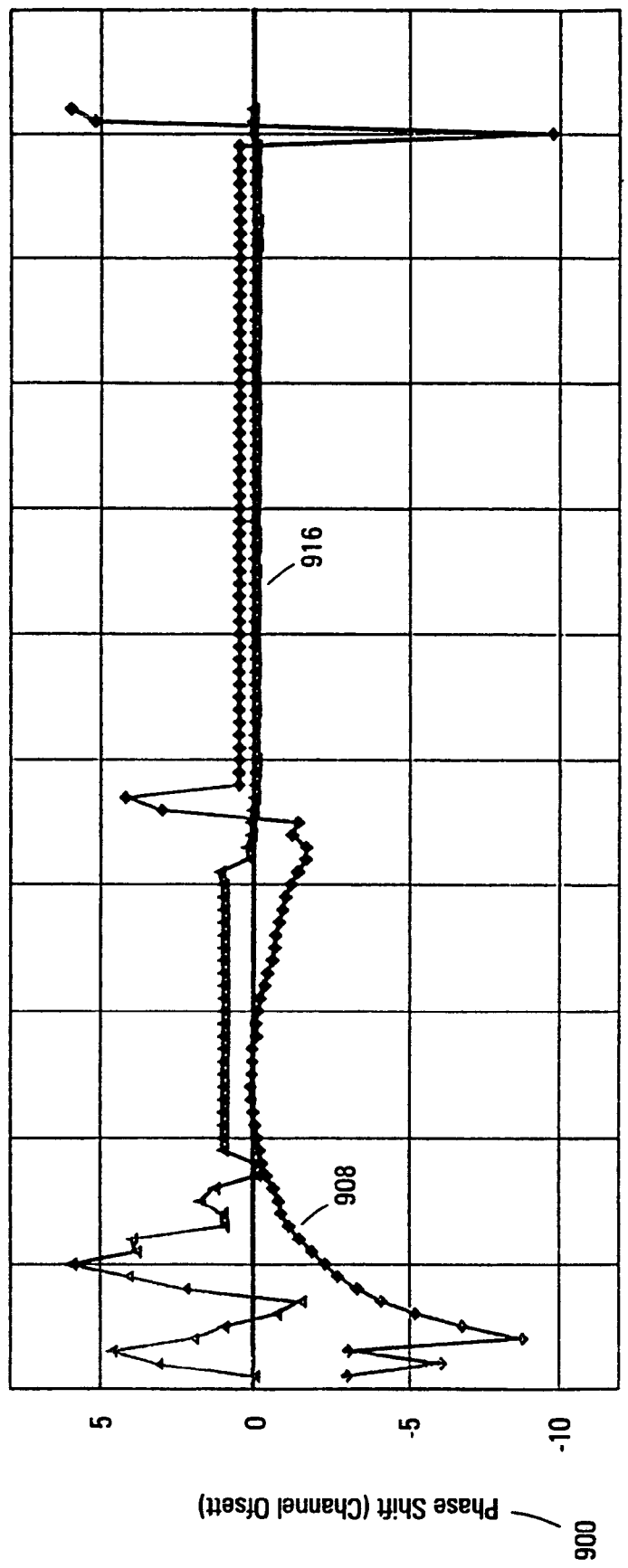
FIG. 9 is a line drawing exemplifying phase-shift profiles derived from the sequential series of spectra, or waveforms, of FIG. 2 wherein the magnitude of drift has been calculated for various reference spectra, or waveforms, to obtain drift-compensated spectra, or waveforms, according to a version of the present invention.

In addition to obtaining profiles of scaled target-factor weighting factors, the nonlinear-least-squares fitting technique also allows for construction of profiles of the phase shifts of the reference spectra relative to individual spectra in the sequential series to which they have been fit. FIG. 9 shows a plot of phase shifts of the reference spectra required to fit the individual spectra in the sequential series of spectra making up the primal array. In this figure, phase shifts of the reference spectra are plotted in units of number of channels or channel offset, 900, by which the spectrum has drifted versus etch cycle number, 904. The phase-shift profile for the $SiO_2$ layer, 908, shows significant variation in the regions where the original spectra showed significant drift, i.e. at the surface of the $SiO_2$ layer, and in the vicinity of the interface between the $SiO_2$ layer and the Si substrate. FIG. 9 also shows the phase-shift profile corresponding to the Si substrate, 916. The phase shifts for the $SiO_2$ target factor are continuous throughout the $SiO_2$ layer, which is expected for drift associated with charging of this layer, and the phase shifts for the Si target factor are uniform throughout the Si layer, which is conversely the result of negligible charging of the Si. However, there are substantial variations in phase shift associated with the interface, as well as the beginning and end of the profiles. This is due to the fitting program shifting the $SiO_2$ reference spectrum in an attempt to optimize the fit in these regions to compensate for the effects of additional constituents for which reference spectra have not been provided. The same effect appears in the phase shifts for the Si reference spectra but it is confined largely to the top surface, i.e. the first 16 cycles, of the profile. Using the heuristic procedure suggested above, it is likely that these anomalies can be reduced.

Utility of the Invention Illustrated by the Examples

The preceding examples illustrate the value of applying the methods of the invention to the problem of producing accurate compositional depth profiles from structures containing charging layers, which has been widely recognized to those skilled in the art as, heretofore, intractable. As demonstrated by these examples, there are considerable advantages to be obtained when the invention is applied to the analysis of Auger depth profile spectra obtained from structures containing charging constituents. First, the effects of drift due to charging are removed from target factors associated with charging constituents. If procedures described subsequently that use nonlinear-least-squares fitting are employed, actual spectra with the effects of charging removed are reconstructed. In addition, when further quantification based on drift-compensated target factors is performed, drift-compensated depth profiles, i.e. scaled drift-compensated target-factor profiles, exhibiting the relative distribution of charging and non-charging constituents within a structure, are obtained. When supplementary quantification procedures using sensitivity factors for the various constituents, which are also described subsequently, are applied to these depth profiles, true drift-compensated compositional profiles of the distribution of constituents with depth within a sample are obtained.

These procedures have been found useful, not only for structures such as $SiO_2$ on Si, ubiquitous in Si semiconductor technology used for modern integrated circuits, exemplified by FIGS. 5 through 9 discussed above, but also will be useful in the failure analysis of metallization contact structures containing buried layers of charging oxides, and has been found useful in the analysis of magnetic recording head structures that employ oxide exchange bias layers in metallic stacks for giant magnetoresistive sensors. These are but a few examples of where this procedure and an apparatus incorporating this procedure would be useful in microelectronic technology, and magnetic recording technology.

DETAILED DESCRIPTION OF FURTHER EMBODIMENTS OF THE INVENTION

The following description details various further embodiments of the invention.

Dephasing Procedure Based on the Fourier Transform

Figure 10:
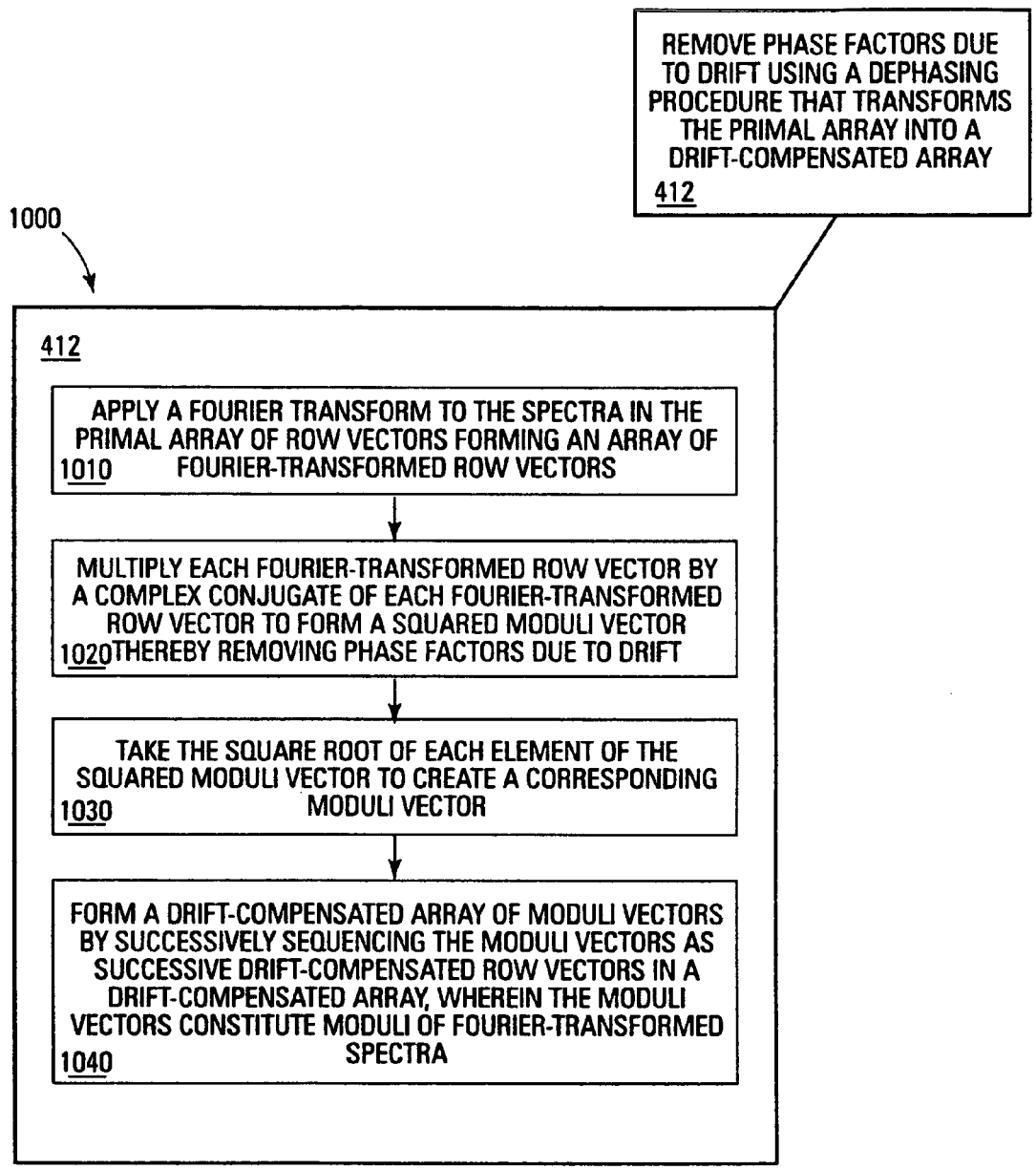
FIG. 10 is a flow chart of a method used in various embodiments of the invention, a method for applying a dephasing procedure based on the Fourier transform that transforms the primal array of spectra, or waveforms, into an array of moduli of Fourier-transformed spectra, or waveforms, wherein phase factors due to drift have been removed.

With reference to FIG. 4, describing in greater detail specific aspects thereof, an embodiment of the invention is illustrated in FIG. 10 that incorporates a dephasing procedure for removing phase factors due to drift from the individual row vectors, 412; the row vectors are transformed by the dephasing procedure from the primal array into an array of drift-compensated row vectors, i.e. a drift-compensated array. In FIG. 10, a Fourier transform (FT), preferably a Fast Fourier transform (FFT), is applied to the spectra in the primal array of row vectors forming an array of Fourier-transformed row vectors, 1010. Then, each Fourier-transformed row vector is multiplied by a complex conjugate of each Fourier-transformed row vector to form a squared moduli vector thereby removing phase factors due to drift, 1020. Next, the square root of the individual elements in the squared moduli vector is taken to obtain the moduli of each element of the original FTs of the array of row vectors, 1030. Finally, a drift-compensated array of moduli vectors is formed by successively sequencing the moduli vectors as successive drift-compensated row vectors in a drift-compensated array, 1040. The moduli vectors constitute moduli of Fourier-transformed spectra and define the array of drift-compensated row vectors, i.e. a drift-compensated array.

This operation of removing the phase factors is best understood by reference to the Shift Theorem of Fourier transform theory, which states that the FT of a waveform that is phase shifted is just the product of the FT of the unshifted waveform with an exponential term in the phase factor. The complex conjugate of the FT of the shifted waveform is just the product of the complex conjugate of the FT of the unshifted waveform with an inverse of the same exponential term in the phase factor; when the modulus of the FT of the shifted waveform is then obtained, the exponential term containing the phase factor cancels its inverse and leaves the modulus of the unshifted waveform only. Fourier transforms are described in "The Fourier Transform and Its Applications," Ronald N. Bracewell, McGraw-Hill Book Co., second revised edition, 1986, New York; the Shift Theorem of Fourier transform theory is discussed on pg. 104 of this reference.

If the sequential series of spectra comprises a series of shifted spectra from a single constituent, followed by unshifted spectra from another constituent, as in FIG. 2, which will be referred to as the homogeneous-drift case, the above method of dephasing by means of FTs works well. However, there may be uncertainties at the interface as to how much of each constituent may be present, or how much of other constituents may be present.

The general case where the sequential series of spectra is composed of linear combinations of individual shifted spectra from multiple constituents will be referred to as the inhomogeneous-drift case. In the inhomogeneous-drift case, the dephasing by means of FTs can lead to false results. In particular, additional constituents associated with the mixing of terms from the individual constituents contributing to primal spectra can appear suggesting the presence of additional constituents that are not actually present. This effect may also occur to some degree at interfaces in the homogeneous case.

Dephasing Procedure Based on
Nonlinear-Least-Squares Fitting

Figure 11:
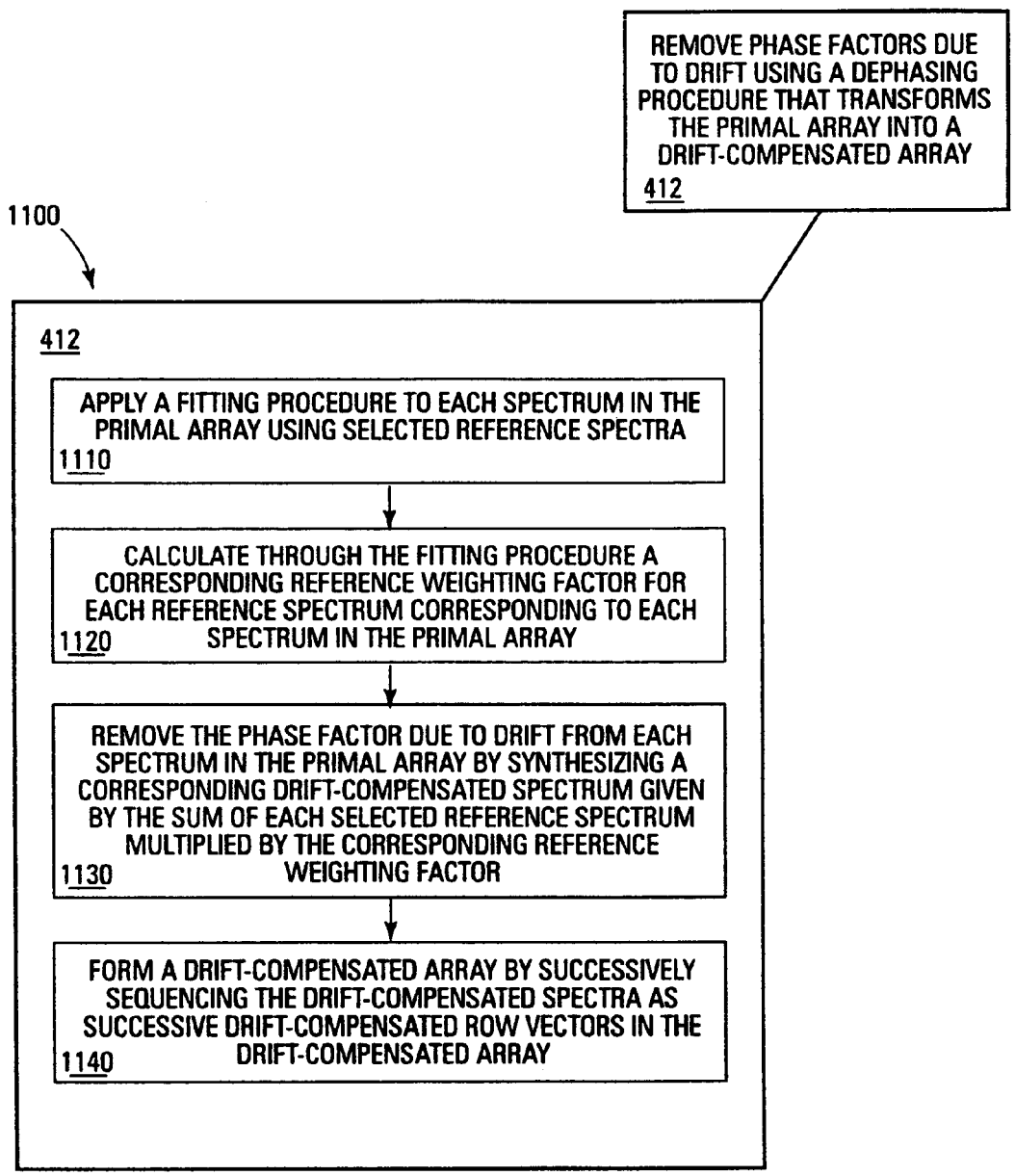
FIG. 11 is a flow chart of a method used in various embodiments of the invention, a method for applying a dephasing procedure based on nonlinear-least-squares fitting that transforms the primal array of spectra, or waveforms, into an array of drift-compensated spectra, or waveforms.

With reference to FIG. 4, describing in greater detail specific aspects thereof, an embodiment of the invention that is addressed to the inhomogeneous-drift case is illustrated in FIG. 11. This embodiment comprises an alternative dephasing procedure for removing phase factors due to drift from the individual row vectors, 412; the object of the alternative dephasing procedure is, likewise, to transform the row vectors from the primal array into an array of drift-compensated row vectors, i.e. a drift-compensated array. In FIG. 11, a fitting procedure is applied to each spectrum in the primal array using selected reference spectra, 1110. Then, a corresponding reference weighting factor for each reference spectrum corresponding to each spectrum in the primal array is calculated through the fitting procedure, 1120. Then, the phase factor due to drift is removed from each spectrum in the primal array by synthesizing a corresponding drift-compensated spectrum given by the sum of each selected reference spectrum multiplied by the corresponding reference weighting factor, 1130. Finally, an array of drift-compensated spectra is formed by successively sequencing the drift-compensated spectra as successive drift-compensated row vectors in a drift-compensated array, 1140. The array of drift-compensated spectra define an array of drift-compensated row vectors, i.e. a drift-compensated array.

An important aspect of the alternative dephasing procedure is the selection of suitable reference spectra from the original sequential series of spectra. Phase shift and relative intensity, i.e. reference weighting factor, are used as fitting parameters to fit the reference spectra to each individual spectrum of the primal array by the method of nonlinear-least-squares (NLS) fitting. The suitability of reference spectra is based on knowledge that the analyst has of the sample. In particular, if the analyst is aware from the processing history of the sample that it consists of a laminate of various layers composed of known constituents, a suitable choice of reference spectra would consist of spectra selected from the primal array identified from within each of the layers of the composite structure. If on the other hand the sample is a complete unknown, a suitable set of reference spectra can be chosen by selecting spectra from the primal array of spectra each corresponding to a region having characteristically similarly shaped spectra.

Before the fitting procedure can be performed, however, the primal spectra must be truncated, i.e. leading or trailing channels, data points, in a background region remote from the peak structure are removed so that the number of channels in the primal spectra matches that of the reference spectra, which allows for the phase shifts between the reference and primal spectra to be more readily determined. The calculation of a relative weighting and a phase factor, i.e. a lead or a lag, for each of the reference spectra is performed by the method of nonlinear-least-squares (NLS) fitting to find the optimum fit. The method of nonlinear-least-squares fitting is described in "Data Reduction and Error Analysis for the Physical Sciences," P. R. Bevington, McGraw-Hill Book Co., 1969, New York, in particular, pps. 164–254.

Based on the relative weighting obtained from the fit, a transformed spectrum for each of the primal spectra is synthesized by summing the products of the reference weighting factors with their corresponding reference spectra; in this way, new spectra are synthesized for each spectrum in the primal array for which phase factors associated with drift have been removed. An array of these newly drift-compensated, synthesized spectra is then defined as an array of drift-compensated row vectors, i.e. another embodiment of a drift-compensated array. By choosing suitably large spectral windows for the primal spectra during spectral acquisitions taken at the spectrometer, truncation of the spectra can be usually assured in background regions devoid of significant spectral structure, which improves the fitting procedure. Care must also be taken to assure that the spectra which are being fit to the spectra of the primal array have the same number of channels or data points as those in the primal array to avoid problems with routinely used nonlinear-least-squares fitting algorithms known in the art.

A problem with the preceding approach based on fitting of spectra is that the baseline levels of the individual spectra can produce inaccuracies in the resulting fit. Another embodiment of the invention incorporating a dephasing procedure for removing phase factors from the individual row vectors which compensates for the effects of variable baselines on the fit is given by the following example, which is based on a technique discussed by F. H. Schamber found in "A Modification of the Linear Least-Squares Fitting Method which Provides Continuum Suppression." Instead of fitting the reference spectra to the individual primal spectra, the first derivatives of the reference spectra are fitted to the first derivative of the primal spectra. This removes the effects of a variable baseline from the fit, because the derivative of a constant becomes zero. However, the location of a spectral peak maximum is preserved in the derivative of a spectrum, i.e. a derivative spectrum, appearing as a positive-to-negative-going zero crossing on the abscissa, i.e. channel location of the energy axis, and the amplitude of a peak maximum is preserved in the peak-to-peak value of the derivative spectrum associated with the original peak. It is possible, therefore, to fit the derivative reference spectra to the derivative of primal spectra and obtain the relative contribution of the reference spectra to a primal spectrum, as well as a measure of the phase shift due to drift of individual reference spectra that compose a given primal spectrum.

Details of spectral fitting procedures as applied in the prior art are found in "A Modification of the Linear Least-Squares Fitting Method which Provides Continuum Suppression," F. H. Schamber, presented at an EPA symposium "X-ray Fluorescence Analysis of Environmental Samples," 1976, Ann Arbor Science Publications, ed. T. Dzubay; "Deconvolution Method for Identification of Peaks in Digitized Spectra," G. Brouwer and J. A. J. Jansen, Analytical Chemistry, Vol. 45, No.13, pps. 2239–2247,1973; and also "Data Reduction and Error Analysis for the Physical Sciences," P. R. Bevington, McGraw-Hill Book Co., 1969, New York, in particular, pps. 164–254.

Another advantage of this method is that it simplifies the process of truncation of spectra. As discussed in the preceding embodiment, it is useful for the primal spectrum and the reference spectra to which it is fit to have the same number of channels. For example, the fitting procedure is performed with a given derivative reference spectrum that is shifted one channel at a time with the other reference spectra fixed in their location along the abscissa, until the lowest Chi squared value is obtained; the number of channels is maintained constant during the shifting operation by adding a channel of zero intensity, known in the art as "padding with zeroes," to the left and removing one channel, of arbitrary intensity, from the right of the spectrum for a rightward shift, and the reverse for a leftward shift of the derivative reference spectrum. The derivative spectra are each shifted one at a time until the best Chi square value is obtained for the fit to the primal spectrum. The shifts in the derivative reference spectra corresponding to the least Chi square value then provide a best estimate of the spectral shift of the primal spectrum relative to the reference spectra. The other fitting parameters are given by scaling factors for each of the derivatives of the reference spectra relative to the derivative of a given primal spectrum. Also, to insure an adequate resolution in the fitting procedure, the spectra should be collected with a sufficient density of channels. Finally, although unit channel shifts, as described above, can be used in the fitting procedure, fractional channel shifts generally yield a better fit as measured by Chi square. Fitting using fractional channel shifting requires interpolation of data values between those of adjacent channels in either the primal spectrum, being fit, or the reference spectra.

Under some circumstances, e.g. when the background is not of uniform intensity, the preceding procedure based on padding with zeroes can result in higher values of Chi square than might be obtained otherwise. Another method that avoids this problem fits the undifferentiated primal spectrum to reference spectra using an optimization routine that tests minimization of Chi square on variation of the parameters of the fit. The position, i.e. channel offset or phase shift, and the amplitude of each reference spectrum are varied, and the resulting Chi square is calculated. This process is performed iteratively until Chi square is minimized. Such optimization procedures are well known in the art, and there are a variety of algorithms available for minimization of Chi square.

Finally, it is desirable to output various analytical results determined in the course of applying the nonlinear-least-squares dephasing procedure to spectra in the primal array. The subprogram embodying the nonlinear-least-squares dephasing procedure stores such analytical results in various arrays during the course of analysis that are subsequently output by issuing commands for their output to a variety of peripheral devices. Provision is made in the subprogram for the analyst to issue commands to output such analytical results selected from the group consisting of the selected reference spectra used in the fitting procedure, the drift-compensated row vectors of the drift-compensated array as a sequential series of drift-compensated spectra, reference weighting factors for each reference spectrum corresponding to each spectrum in the primal array as a set of drift-compensated reference-spectrum profiles, and phase factors due to drift for each reference spectrum corresponding to each spectrum in the primal array as a set of phase-factor profiles.

Principal-Factor Determination Based on Linear-Least-Squares Analysis

Figure 12:
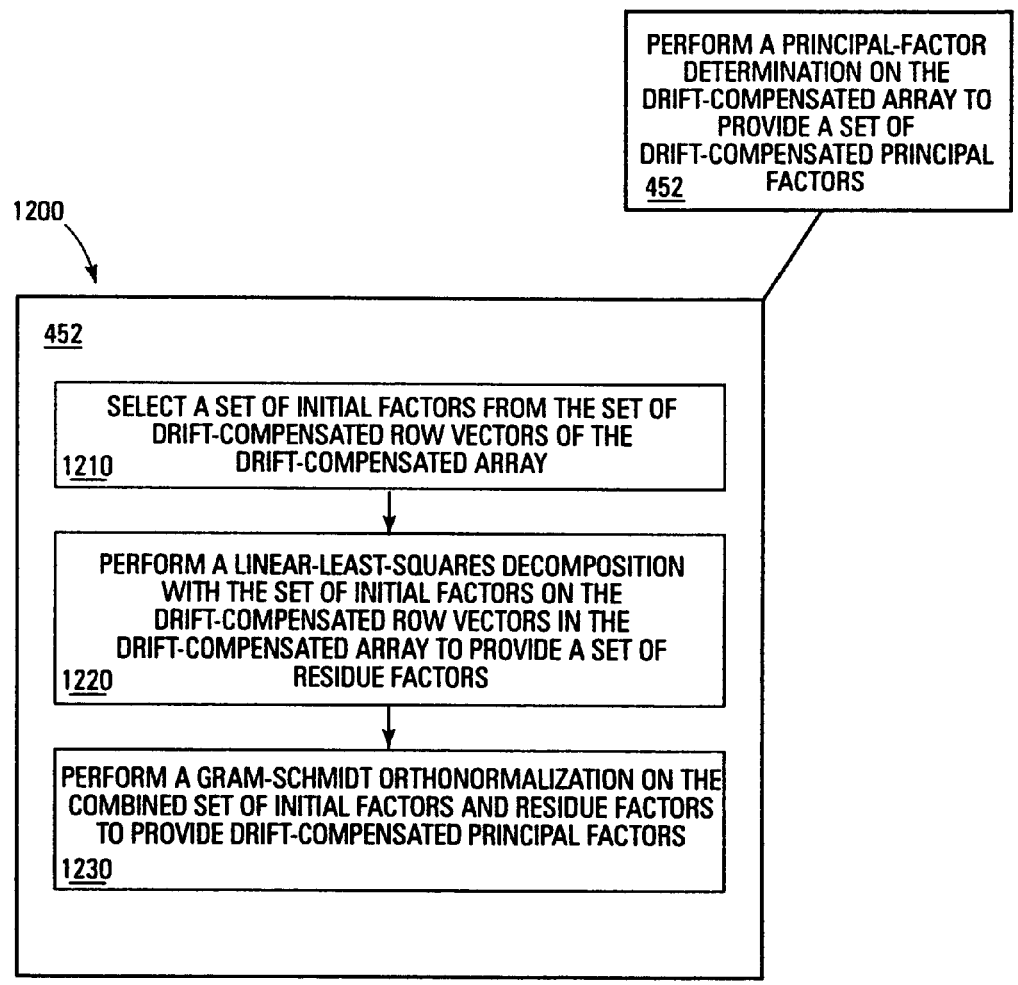
FIG. 12 is a flow chart of a method used in various embodiments of the invention, a method for performing a principal-factor determination based on linear-least-squares analysis.

With reference to FIG. 4, describing in greater detail specific aspects thereof, an embodiment of the invention providing an alternative method for the principal-factor determination, 452, is linear-least-squares analysis. A linear-least-squares (LLS) analysis can be used to determine drift-compensated principal factors, as an alternative to the factor analysis. In FIG. 12, a linear-least-squares analysis, 1200, is performed by selecting a set of initial factors from the set of drift-compensated row vectors of the drift-compensated array, 1210; performing a linear-least-squares decomposition with the set of initial factors on the drift-compensated row vectors in the drift-compensated array to provide a set of residue factors, 1220; and, performing a Gram-Schmidt orthonormalization on the combined set of initial factors and residue factors to provide drift-compensated principal factors, 1230.

A set of initial factors from the set of drift-compensated row vectors is selected, 1210, through an interactive procedure with the analyst. For example, the analyst inspects the set of drift-compensated row vectors in the form of a waterfall plot. Those row vectors, i.e. drift-compensated spectra, or drift-compensated moduli of Fourier-transformed spectra, that exhibit similar form are summed channel by channel and divided by the number of row vectors in the sum to obtain an average row vector that is an initial factor. This procedure of inspecting, summing, and averaging is repeated until no more row vectors with similar form are left in the drift-compensated array. This is essentially a method of signal averaging the drift-compensated spectra, or drift-compensated moduli that comprise the drift-compensated row vectors in the drift-compensated array. The criteria through which the analyst determines that this procedure is complete is based on the reduction of the set of initial factors to a minimal set which essentially epitomizes the general characteristics of the drift-compensated array. For example, referring to FIG. 5 drift-compensated moduli for cycles 26 through 61, 512, have similar shape and can be averaged to provide an initial factor identified with the $SiO_2$ layer; similarly, drift-compensated moduli for cycles 66 through 122, 520, have similar shape and can be averaged to provide an initial factor identified with the Si layer. The selecting of such initial factors is a procedure that is obvious to the analyst skilled in the art, and is well known from best practices known to those skilled in the art.

Next, a linear-least-squares decomposition is performed with the set of initial factors on the drift-compensated array of drift-compensated row vectors to provide a set of residues, 1220, through an interactive procedure with the analyst. The linear-least-squares decomposition comprises subtracting each of the initial factors from each of the row vectors of the drift-compensated array by the method of linear-least-squares; inspecting the remainders of the row vectors, i.e. residues, for any having similar shapes using the method described above for finding initial factors; summing the similar residues, and averaging the residues using the method described above for finding initial factors, to provide residue factors; and, successively and iteratively, repeating the preceding operations of subtracting, inspecting, and summing, but with substitution of the residue factors determined in a preceding iteration for the initial factors, and the remainders of the row vectors determined in a preceding iteration for the row vectors, until the subsequent remainders of the row vectors for the given iteration are exhausted. The criterion by which the analyst judges that the remainders are exhausted is lack of any intensity in a subsequent remainder of the row vector consistent with a discernible pattern or shape; exhaustion is manifested as noise, i.e. a random statistical fluctuation of the intensity, in the subsequent remainder of the row vector, i.e. residue.

Finally, a Gram-Schmidt orthonormalization is performed on the combined set of initial factors and residue factors to provide drift-compensated principal factors, 1230. Since the residue factors and initial factors will not in general be orthogonal to one another, it is necessary to orthonormalize them into drift-compensated principal factors that must be by definition orthogonal. The orthonormalization is performed by the method of Gram-Schmidt which is well known to those skilled in the art. "Applied Matrix and Tensor Analysis," by J. A. Eisele, and R. M. Mason, Wiley-Interscience, 1970, New York, pps. 16–22 describes in great detail the Gram-Schmidt orthonormalization. Also, the method of linear-least-squares is described in great detail in "Data Reduction and Error Analysis for the Physical Sciences," P. R. Bevington, McGraw-Hill Book Co., 1969, New York, in particular, pps. 204–254.

Procedure for Constructing a Set of Drift-Compensated Target Factors

Figure 13:
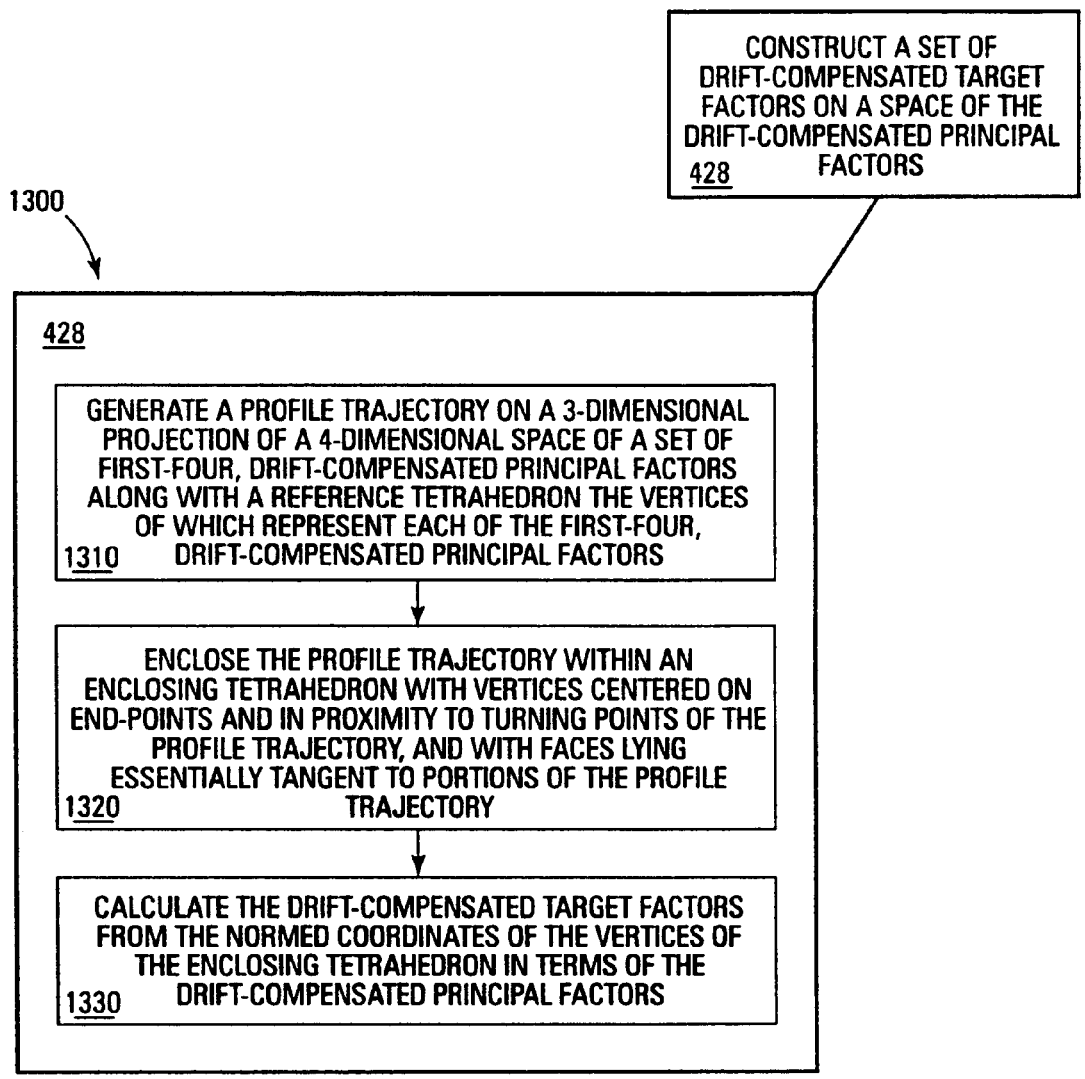
FIG. 13 is a flow chart of a method used in various embodiments of the invention, a procedure for constructing a set of drift-compensated target factors which works well for systems with a set of first-four, drift-compensated principal factors.

With reference to FIG. 4, describing in greater detail specific aspects thereof, an embodiment of the invention incorporating a procedure constructing a set of drift-compensated target factors by a shear transformation on a space of the drift-compensated principal factors, 428, is illustrated with reference to FIG. 13. This procedure is tantamount to constructing a set of drift-compensated target factors by selecting a suitable linear combination of the drift-compensated principal factors. FIG. 13 illustrates an embodiment of the invention that works well for systems with four drift-compensated principal factors, 1300. First, a profile trajectory for the row vectors of the drift-compensated array is generated on a 3-dimensional projection of a 4-dimensional space of a set of first-four, drift-compensated principal factors along with a reference tetrahedron the vertices of which represent each of the first-four, drift-compensated principal factors, 1310. The profile trajectory is obtained by determining the coordinates of each drift-compensated row vector, which are the projections of the row vectors of the drift-compensated array on each of the four drift-compensated principal factors, norming the coordinates of each drift-compensated row vector by dividing each by the sum of all four, and plotting these normed coordinates of each drift-compensated row vector along with the tetrahedron by locating the values of the normed coordinates of each drift-compensated row vector along the edges of the tetrahedron for each of the drift-compensated principal factors. Next, the profile trajectory is enclosed within an enclosing tetrahedron with vertices centered on end-points and in proximity to turning points of the profile trajectory, and with faces lying essentially tangent to portions of the profile trajectory, 1320. The enclosing tetrahedron is transformed from a duplicate of the reference tetrahedron by a translation of its vertices to enclose the profile trajectory so that portions of the profile trajectory lie adjacent to vertices, edges, and faces of the enclosing tetrahedron corresponding with a physically meaningful interpretation. Finally, the drift-compensated target factors are calculated from the normed coordinates of the vertices of the enclosing tetrahedron in terms of the drift-compensated principal factors, 1330.

A few details of this procedure using the tetrahedron methodology are found in "Trajectory Projection Factor Analysis," Abstract No. AS-ThM7, D. J. Pocker and B. R. York, in "Abstracts of the 45th International Symposium of the American Vacuum Society: Vacuum, Thin Films, Surfaces/Interfaces, and Processing," pg. 131,1998.

More specifically, the transformation of the enclosing tetrahedron is by a general shear transformation of its corresponding 4-space coordinates. In 3-space, this appears as a translation of its vertices which determine the normed coordinates of its faces and edges. The definition of a simple shear transformation, i.e. a shear transformation on one coordinate, is given on pg. 370 of "Mathematics Dictionary", James and James, Van Nostrand Reinhold Co., 1968, 3rd ed. A general shear transformation is a shear transformation on all the coordinates.

Physically meaningful interpretations corresponding to the faces, edges, or vertices of the enclosing tetrahedron are those which associate the vertices with essentially pure constituents, i.e. chemically distinct species within the sample's structure; the edges, with regions of mixed composition of two such constituents, or species; and, the faces, with regions of three constituents, or species.

In the case of three drift-compensated principal factors, the space collapses into a triangle on which analogous operations are performed to find the drift-compensated target factors. The cases of two and a single drift-compensated principal factor will be seen as trivial to those skilled in the art. However, the tetrahedron can even be employed to find three or fewer drift-compensated target factors, as is demonstrated in the subsequent discussion of the classic problem of a charging $SiO_2$ layer on Si, in which only three drift-compensated target factors are required. In this case, extra target factors associated with noise eigenvalues are carried along as dummy variables. However, the analyst must take care so that the transformation of the normed coordinates corresponding to the vertices of these dummy target factors minimizes the contributions from such target factors to any resulting target-factor profile, i.e. the target-factor weighting factors associated with these dummy target factors must fluctuate with negligible magnitude about a zero value. Graphically, this is accomplished by moving the vertices associated with such dummy target-factors perpendicularly an adequate distance away from the profile trajectory sufficient to produce negligibly small target-factor weighting factors for these dummy target-factors.

Procedure for Generating a Profile Trajectory

With reference to FIG. 13, describing in greater detail specific aspects thereof, an embodiment of the invention incorporating a procedure for generating the profile trajectory, 1310, is illustrated with reference to FIG. 14. This figure illustrates a method for constructing the profile trajectory of drift-compensated scaled target-factor profiles and representing the profile trajectory in terms of the first-four, drift-compensated principal factors, 1400. The profile trajectory is a representation of the composition of the individual drift-compensated row vectors in terms of the first-four, drift-compensated principal factors. The drift-compensated principal factors are mathematical constructs that facilitate the reduction of this representation to a physically meaningful representation in terms of the drift-compensated target factors. In this case, some of the drift-compensated target factors would represent basic drift-compensated row vectors associated with specific chemical species in the sequential series of spectra; and other drift-compensated target factors would represent other distinct chemical species which are generally linear combinations of drift-compensated row vectors of the drift-compensated array. In one embodiment of the invention, the drift-compensated target factors would be drift-compensated moduli of the FFTs of spectra from chemically distinct layers within the depth-profiled structure. In another embodiment, the drift-compensated target factors would be drift-compensated spectra from chemically distinct layers within the depth-profiled structure.

To generate a profile trajectory, it is first necessary to calculate 4-space coordinates of a profile trajectory of drift-compensated target-factor profiles on a 4-dimensional space to produce four coordinates for each point in the profile trajectory, one coordinate for each of the first-four, drift-compensated principal factors, 1410. There are embodiments of the invention for calculating coordinates of the profile trajectory used in conjunction with factor analysis and linear-least-squares analysis that are particularly advantageous in their economic use of computational resources which will be subsequently described. However, an embodiment of the invention for calculating these coordinates, that is rather elegant in its simplicity, is described next.

The coordinates, i.e. 4-space coordinates, of the profile trajectory of drift-compensated target-factor profiles on a 4-dimensional space are calculated by taking a dot product of each row vector of the drift-compensated array with the first-four, drift-compensated principal factors to produce four coordinates for each point in the profile trajectory given by each of the dot products, one coordinate for each of the first-four, drift-compensated principal factors. This gives a set of four numbers, i.e. 4-tuple, corresponding to the 4-space coordinates of a point representing the row vector on the four-space of the first-four, drift-compensated principal factors. Note that it is not necessary to normalize the principal factors, i.e. the eigenvectors with the four largest eigenvalues, because they are provided as normalized eigenvectors by most eigenanalysis programs.

Another way to calculate the coordinates of the profile trajectory is to obtain them from the results of the eigenanalysis. The advantage of this approach is that it is less computationally intensive than the preceding procedure, because most of the data required for the computation is immediately available upon the completion of the eigenanalysis. Practically, it involves adding a single line of code in most higher level mathematical computation programs to obtain the matrix product of the drift-compensated array with an array of the eigenvectors, both of which arrays are readily available after the eigenanalysis. The manner and order of multiplication of these arrays is important; for an array of drift-compensated row vectors constituting the drift compensated-array, the eigenvectors are arranged in an array of column vectors, each eigenvector constituting a given column vector; and, the matrix multiplication carried out so the drift-compensated array is the first matrix and the array of eigenvectors, the second matrix of the multiplication. In most eigenanalysis programs, the eigenvectors corresponding to the largest eigenvalues fill the last columns of the array. The arrangement is such that the eigenvector corresponding to the smallest eigenvalue appears in the first column and subsequent eigenvectors fill the columns of the array so that the eigenvector of each successive column corresponds to an eigenvalue larger than the eigenvalue corresponding to the previous eigenvector, but smaller than the eigenvalue of the eigenvector in the next successive column. Thus, as a result of this linear ordering by eigenvalue, the eigenvector having the largest eigenvalue fills the last column of the array.

Note that matrix multiplication in general is non-commutative; and, for non-square arrays, which is generally the case for this analysis, because typically the number of spectral channels does not equal the number of cycles, i.e. number of spectra in the sequence, multiplying in the opposite order is precluded because the number of elements of the individual vectors in the arrays must match to multiply the two matrices, or arrays. The product matrix thus obtained consists of column vectors, called eigenprofiles; the number of elements in the column vector, eigenprofile, equals the number of cycles, i.e. number of spectra in the sequential series. The 4-space coordinates of the profile trajectory are given by 4-tuples that are corresponding elements of each of the last-four column vectors in the product matrix for each index number, i.e. cycle number in the sequence of spectra. Thus, the 4-space coordinates of the profile trajectory consist of a sequence of 4-tuples, one 4-tuple corresponding to each spectrum in the spectral array for each cycle number in the sequential series of spectra.

If instead of eigenanalysis the analyst has chosen to perform a principal factor determination by a linear-least-squares analysis, as described earlier, it is useful to employ another alternative embodiment for determining the 4-space coordinates of the profile trajectory. After the complete set of initial factors and residue factors has been defined, comprising a total of four such factors, linear-least-squares weighting factors are calculated that give the contributions from each of these factors for an optimum fit to each row vector in the drift-compensated array, i.e. each drift-compensated spectrum, or alternatively each moduli vector of a Fourier-transformed spectrum, that are associated with a primal spectrum in the sequential series of spectra. These linear-least-squares weighting factors are obtained by standard procedures of linear-least-squares fitting known from the art. This provides a set of four linear-least-squares weighting factors for each drift-compensated row vector in the series indexed by its position in the series through an associated cycle number. It is the object of this embodiment to convert these serial sets of four linear-least-squares weighting factors to a sequence of 4-tuples that give the 4-space coordinates of the profile trajectory.

A computationally economic procedure for obtaining the 4-space coordinates of the profile trajectory from the linear-least squares weighting factors is first to normalize the complete set of initial factors and residue factors. This is done by dividing each of these factors by the its vector magnitude, which is given by the square root of the dot product of each of these factors with itself. Next, the direction cosines between each of the factors in the set of normalized initial and normalized residue factors and principal factors is computed. This consists of a set of sixteen direction cosines obtained from the dot product of each member of the set of normalized initial and normalized residue factors with each principal factor determined in the LLS procedure, as described earlier. To obtain the 4-tuples that give the 4-space coordinates of the profile trajectory, first, each set of four direction cosines for a given member of the set of normalized initial and normalized residue factors must be converted to a set of projection factors by multiplying each one of the four direction cosines for a given factor of the set of normalized initial and normalized residue factors by the vector magnitude of its original unnormalized initial or residue factor, respectively. Thus, four sets of projection factors for each factor in the set of initial and residue factors are obtained. Second, each member of a given set of projection factors is multiplied by the linear-least squares weighting factor of the drift-compensated row vector to which the member of the set of initial and residue factors has been fit. This procedure provides a set of scaled projection factors, four scaled projection factors for each principal factor for a corresponding drift-compensated row vector. The sum of all four of these scaled projection factors for a given principal factor then gives a 4-space coordinate in the profile trajectory for the corresponding principal factor. Performing this summation for each of the principal factors for the linear-least squares weighting factors of a given drift-compensated row vector then provides a 4-tuple or all four 4-space coordinates of the point corresponding to the drift-compensated row vector in the profile trajectory. Repeating this procedure for each set of four linear-least-squares weighting factors corresponding to each drift compensated row vector, then provides a full set of 4-tuples constituting the 4-space coordinates of the profile trajectory.

It will be recognized by those skilled in the art of vector analysis that this procedure is just variation of a straightforward method for converting the coordinates of a space-curve from one basis set of vectors to another. The variation on the procedure comprising the computation of all sixteen direction cosines and the corresponding projection factors prior to computation of the individual coordinates of the profile trajectory adds a particular element of computational economy or efficiency to the procedure. It should also be mentioned that the coordinates obtained by this method for the profile trajectory are likely to be different from those obtained through an eigenanalysis, because the set of principal factors obtained by LLS analysis are in general not the same as the set obtained by eigenanalysis. In general, the principal factors obtained by LLS analysis will constitute an alternative orthonormal basis set of vectors that spans the same space spanned by the orthonormal basis set of vectors obtained as principal factors by an eigenanalysis. However, the trajectory described with either set of coordinates is the same. When the normed coordinates of the profile trajectory are later plotted along with a reference tetrahedron corresponding to either set of principal factors, the profile trajectory will be seen to be the same, but the reference tetrahedra will have different orientations in the spatial representation depending upon which set of principal factors that is used.

It is worth mentioning an anomaly at this point that sometimes enters the analysis. Occasionally, when the eigenanalysis procedure is employed, an eigenvector that is subsequently chosen as a principal factor appears with inverted sign. This results in coordinates corresponding to this principal factor which are also negative. This places significant portions of the trajectory outside the reference tetrahedron. This can make attempts to enclose the trajectory initially awkward. Although this situation does not alter the final result, the analyst may prefer to multiply the eigenprofile and its corresponding eigenvector, i.e. principal factor, by "minus one" before further operations directed at plotting the trajectory in a 3-dimensional representation. This condition can usually be ascertained by direct inspection of the principal factors prior to any calculation of profile trajectory coordinates. An inverted spectrum serving as a principal factor is easily spotted by those skilled in the art.

Once the 4-space profile-trajectory coordinates have been obtained by one of the preceding procedures, the profile trajectory of drift-compensated scaled target-factor profiles is plotted onto a representation of the four-space that can be viewed on a computer terminal. To do so, the dimensionality of the 4-space coordinates of the profile trajectory are reduced by dividing each coordinate by a sum of all four 4-space coordinates to produce normed coordinates for the profile trajectory, 1420. The coordinates of the row vectors and first-four, drift-compensated principal factors are normed based on the condition that the sum of the normed coordinates must equal unity. In other words, the normed coordinates are given by dividing each of the coordinates of the point in the unnormalized four-space corresponding to each row vector by the sum of all four of the coordinates of the point, i.e. by dividing each coordinate by the sum of all four 4-space coordinates. This allows the coordinates to be plotted within a representation of the four-space given by a 3-dimensional reference tetrahedron. Finally, the normed coordinates for the profile trajectory are plotted in a 3-dimensional space the coordinate axes of which are edges of a reference tetrahedron, the vertices of which correspond to unit values for each of the first-four, drift-compensated principal factors in a manner analogous to plotting of coordinates on a quaternary phase diagram, 1430.

However, it should be noted that some of the normed coordinates of the profile trajectory can have negative values or values greater than unity that would not plot within a tetrahedron as ordinarily employed for the plotting of compositions on a quaternary phase diagram. Values greater than unity and less than zero are a possible artifact of the factor analysis, an artifact that is essentially removed in the subsequent target factor analysis. These negative values and values greater than unity can still be plotted in a manner analogous to plotting of coordinates on a quaternary phase diagram by use of a natural extension of the quaternary-phase-diagram coordinate system of a tetrahedron, which is described next. The plotting of values less than zero or greater than unity involves a simple extension of the coordinate system of the tetrahedron beyond the basic tetrahedron that spans the values from zero to unity for the first-four, drift-compensated principal factors. Planes parallel to the faces of the tetrahedron but outside of it then represent surfaces for constant values of the normed coordinates of the profile trajectory in terms of first-four, drift-compensated principal factor values greater than unity or less than zero. Planes that are parallel to a face but lying on the exterior side of the face relative to the tetrahedron correspond to negative values for the normed coordinates, i.e. negative planes; and, planes that are parallel to a face but lying on the interior side of the face relative to the tetrahedron correspond to positive values for the normed coordinates, as in ordinary quaternary phase diagram usage, i.e. positive planes; but, positive planes that extend beyond a vertex corresponding to the unity value of a first-four, drift-compensated principal factor correspond to positive values for the normed coordinates greater than unity, i.e. greater-than-unity planes. The intersections of these four sets of planes outside of the tetrahedron then give the location of normed coordinates for the profile trajectory that have values lying outside of the range of zero to unity for any given normed coordinate.

These normed coordinates then give the location of the point corresponding to the row vector in the 3-dimensional tetrahedral representation of the four-space. These normed coordinates are plotted in the fashion of alloy compositions on a quaternary phase diagram where the vertices correspond to unit values of the pure components, as is known in the art, in this case 100% of the normalized first-four, drift-compensated principal factors. Projections of this 3-dimensional space, including the tetrahedron and profile trajectory of the row vectors, i.e. the profile trajectory of drift-compensated scaled target-factor profiles, as seen from various points of view can then be displayed on the screen of a computer monitor as is known in the art for displaying images of 3-dimensional computer generated objects.

Finally, note that the term phase in phase diagram is to be distinguished from the earlier use of phase in conjunction with drift-compensating spectra by means of a dephasing procedure. The term phase in phase diagram refers to a distinct chemical constituent in a diagram of the constituent's thermodynamic equilibrium behavior, and not to a phase-shift associated with spectral drift. The quaternary-phase-diagram plotting methodology is adopted here, because it is a convenient way to represent the behavior of four variables that are constrained by the requirement that the total of all four not exceed 100%, or in relative constituent fractions not exceed unity. Therefore, it is natural to apply the quaternary-phase-diagram methodology when representing the behavior of four constituents in a profile trajectory lying in a space of a set of first-four, drift-compensated principal factors, because the total amount of the four constituents can not exceed unity. However, precise quantification of exact amounts is accomplished by converting drift-compensated scaled target-factor profiles to drift-compensated compositional profiles which is subsequently described in detail.

Procedure for Enclosing the Profile Trajectory and Calculating Drift-Compensated Target Factors Therefrom With reference to FIG. 13, describing in greater detail specific aspects thereof, an embodiment of the invention incorporating procedures for enclosing the profile trajectory within an enclosing tetrahedron, 1320, and calculating the drift-compensated target factors from the normed coordinates of the enclosing tetrahedron, 1330, is illustrated with reference to FIG. 15. This figure illustrates details of elements, 1320, and 1330, of a method for constructing the set of drift-compensated target factors, 1500.

A profile trajectory of the drift-compensated row vectors appears as a curve composed of segments which run along essentially straight lines from loci of heavy point concentration, which are joined by curved segments. The loci of heavy point concentrations correspond to regions consisting of a nominally pure single constituent within a sample, for example, a layer composed of a single compound or pure constituent. The essentially straight-line segments correspond to portions of the depth profile from regions of transition or the interfacial regions, between regions occupied by pure constituents. The curved regions or turning points correspond to portions of the depth profile from regions of transition amongst three constituents having two regions of transition, from one pure constituent to a second, and from a second to a third, represented by essentially straight-line segments, for example, a constituent of a very thin layer sandwiched in between and lying at the interface between two layers composed of two other constituents. The object of finding the drift-compensated target factors is to obtain representations of the row vectors in terms of a minimal number of constituents, which for a chemical system have chemically interesting significance for the analyst.

Such a minimal representation can be obtained by placing vertices of an enclosing tetrahedron at loci of heavy point concentrations of a profile trajectory, 1510, adjusting the edges of an enclosing tetrahedron to lie along essentially straight line segments, 1520, placing remaining vertices of an enclosing tetrahedron so as to lie near the turning points of the profile trajectory, 1530, and adjusting the faces of the enclosing tetrahedron to lie along curved segments joining a turning point and essentially straight line segments of the profile trajectory, 1540. The corners or vertices of the enclosing tetrahedron then correspond to the drift-compensated target factors. The normed coordinates of these vertices relative to the reference tetrahedron give the weighting of normalized first-four, drift-compensated principal factors, i.e. enclosing-vertex weighting factors, that compose the drift-compensated target factors. The target factors are then calculated by summing the products of each enclosing-vertex weighting factor with its respective principal factor for a vertex associated with a given target factor.

A concrete example serves to clarify this rather abstract description. Suppose one has corrected a sequential series of spectra for drift and the structure under analysis consists of a layer of $SiO_2$ on Si with a thin layer of $SiO_x$ lying at the interface. The profile trajectory of these drift-corrected spectra would consist of a locus with a heavy concentration of points corresponding to the pure $SiO_2$ connected by a nominally straight line segment with a turning point near the vertex corresponding to $SiO_x$ connected by another nominally straight line segment terminating at a second locus with a heavy concentration of points corresponding to the pure Si. The loci and the turning points need not lie on or in the vicinity of the vertices of the tetrahedron corresponding to the normalized first-four, drift-compensated principal factors. But, the normed coordinates of the loci and the turning point in terms of the vertices of the normalized first-four, drift-compensated principal factors would give the weightings of these first-four, drift-compensated principal factors, i.e. enclosing-vertex weighting factors, required to obtain a spectrum corresponding to the drift-compensated target factors for these pure constituents.

Figure 16:
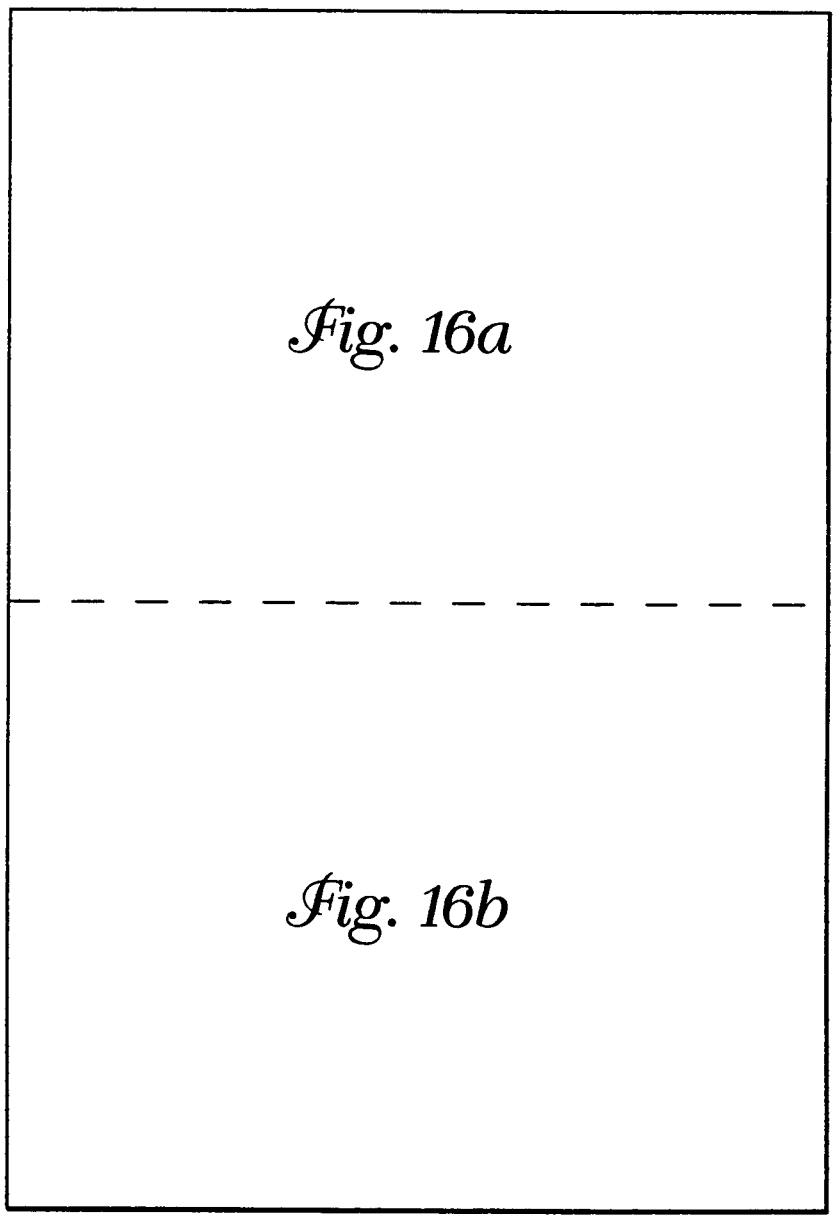
FIG. 16 is a flow chart of a method used in various embodiments of the invention, a method for interactively finding the drift-compensated target factors on a digital computer using a graphical display interface.
Figure 16A:
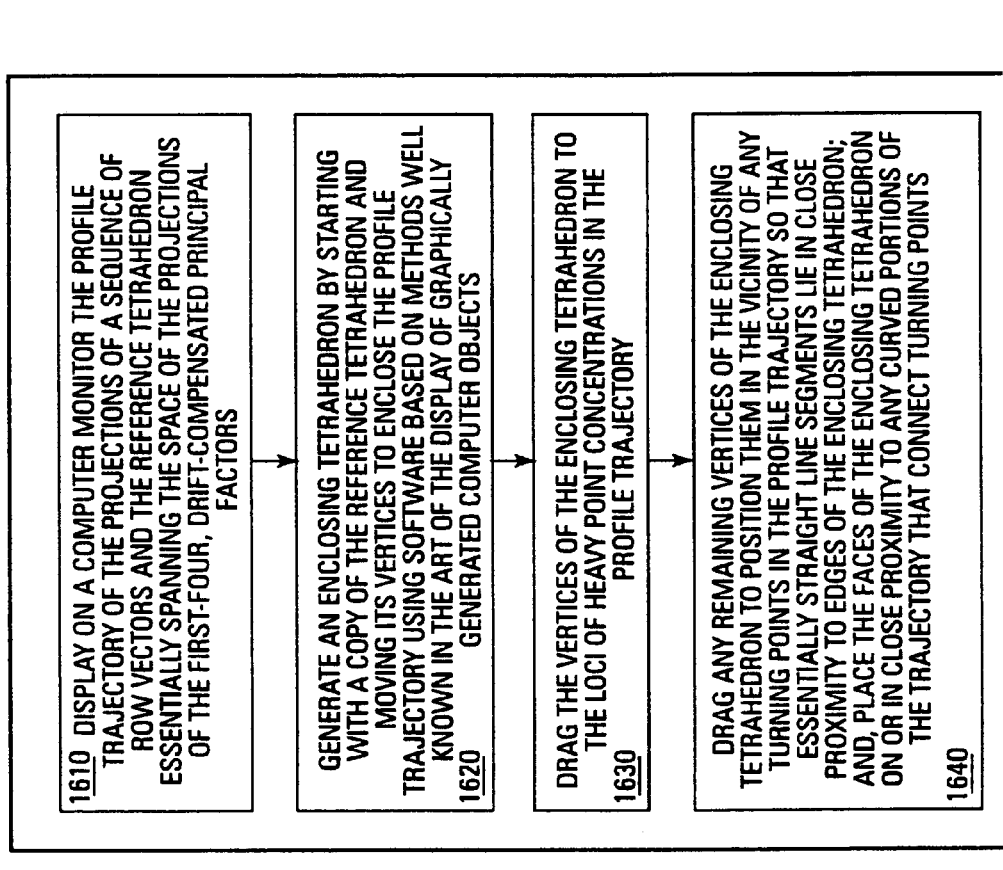
Figure 16B:
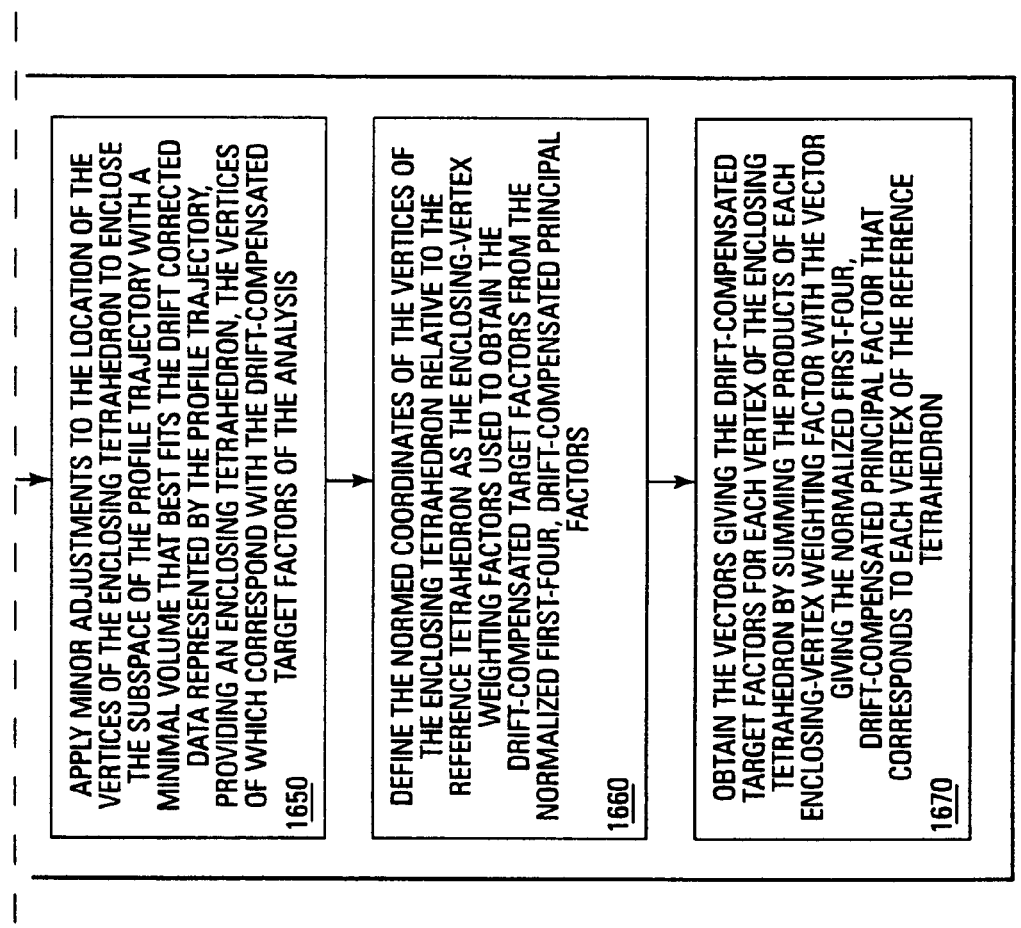

FIG. 16 illustrates a method, 1600, for interactively finding the drift-compensated target factors with a digital computer using a graphical display interface. The profile trajectory of the projections of a sequence of row vectors and the reference tetrahedron spanning the space of the projections of the first-four, drift-compensated principal factors is displayed on a computer monitor as described above, 1610. The analyst then generates an enclosing tetrahedron by starting with a copy of the reference tetrahedron and moving its vertices to enclose the profile trajectory using software based on methods well known in the art of the display of graphically generated computer objects, 1620. This enclosing tetrahedron will serve as an initial template from which the final enclosing tetrahedron will be formed. The vertices of the enclosing tetrahedron are dragged to the loci of heavy point concentrations in the profile trajectory, 1630. This normally requires some trial and error, as well as rotating the projected views of the profile trajectory with the reference tetrahedron and the enclosing tetrahedron on the computer monitor. Next, any remaining vertices of the enclosing tetrahedron are dragged to position them in the vicinity of any turning points in the profile trajectory so that essentially straight line segments lie in close proximity to edges of the enclosing tetrahedron; and, the faces of the enclosing tetrahedron are placed on or in close proximity to any curved portions of the trajectory that connect turning points, 1640. Next, minor adjustments are applied to the location of the vertices of the enclosing tetrahedron to enclose the subspace of the profile trajectory with a minimal volume that best fits the drift-corrected data represented by the profile trajectory, providing an enclosing tetrahedron, the vertices of which correspond with the drift-compensated target factors of the analysis, 1650. The normed coordinates of the vertices of the enclosing tetrahedron relative to the reference tetrahedron are defined as the enclosing-vertex weighting factors used to obtain the drift-compensated target factors from the normalized first-four, drift-compensated principal factors, 1660. The normed coordinates of the vertices which give the enclosing-vertex weighting factors can be readily obtained from methods known in the art for the graphic display of computer generated objects. Vectors giving the drift-compensated target factors for each vertex of the enclosing tetrahedron can then be obtained by the sum of the products of each enclosing-vertex weighting factor with the vector giving the normalized first-four, drift-compensated principal factor that corresponds to each vertex of the reference tetrahedron, 1670.

Procedure for Calculating Target-Factor Weighting Factors

With reference to FIG. 4, describing in greater detail specific aspects thereof, an embodiment of the invention incorporating a procedure for applying the set of drift-compensated target factors to a profile trajectory to obtain a sequential set of target-factor weighting factors, 432, is described next. After constructing the set of drift-compensated target factors by a shear transformation on a space of the drift-compensated principal factors, 428, the set of drift-compensated target factors are applied to a profile trajectory lying within the space of drift-compensated principal factors to obtain a sequential set of target-factor weighting factors, 432.

The target-factor weighting factors are obtained by finding the normed coordinates of the points on the profile trajectory within the enclosing tetrahedron, i.e. the enclosed-profile-trajectory coordinates. Each of the four normed coordinates is given by the relative location of a point in the profile trajectory lying above the face that lies opposite the vertex of a corresponding drift-compensated target factor; this coordinate value is determined by the ratio of a length of a perpendicular line segment dropped from the point on the profile trajectory to the length of a perpendicular line segment dropped from the vertex, where both are dropped onto the one face opposite the vertex. This is analogous to the method for determining the fractional composition of a given constituent at a fixed location in a quaternary phase diagram, which is well known in the metallurgical arts. However, it is to be noted that the enclosing tetrahedron is a sheared version of the regular tetrahedron ordinarily used in the metallurgical arts; nevertheless, the procedure described above for determining the enclosed-profile-trajectory coordinates, i.e. the target-factor weighting factors, is unaffected by this distortion.

Procedure for Outputting Drift-Compensated Scaled Target-Factor Profiles

Figure 17A:
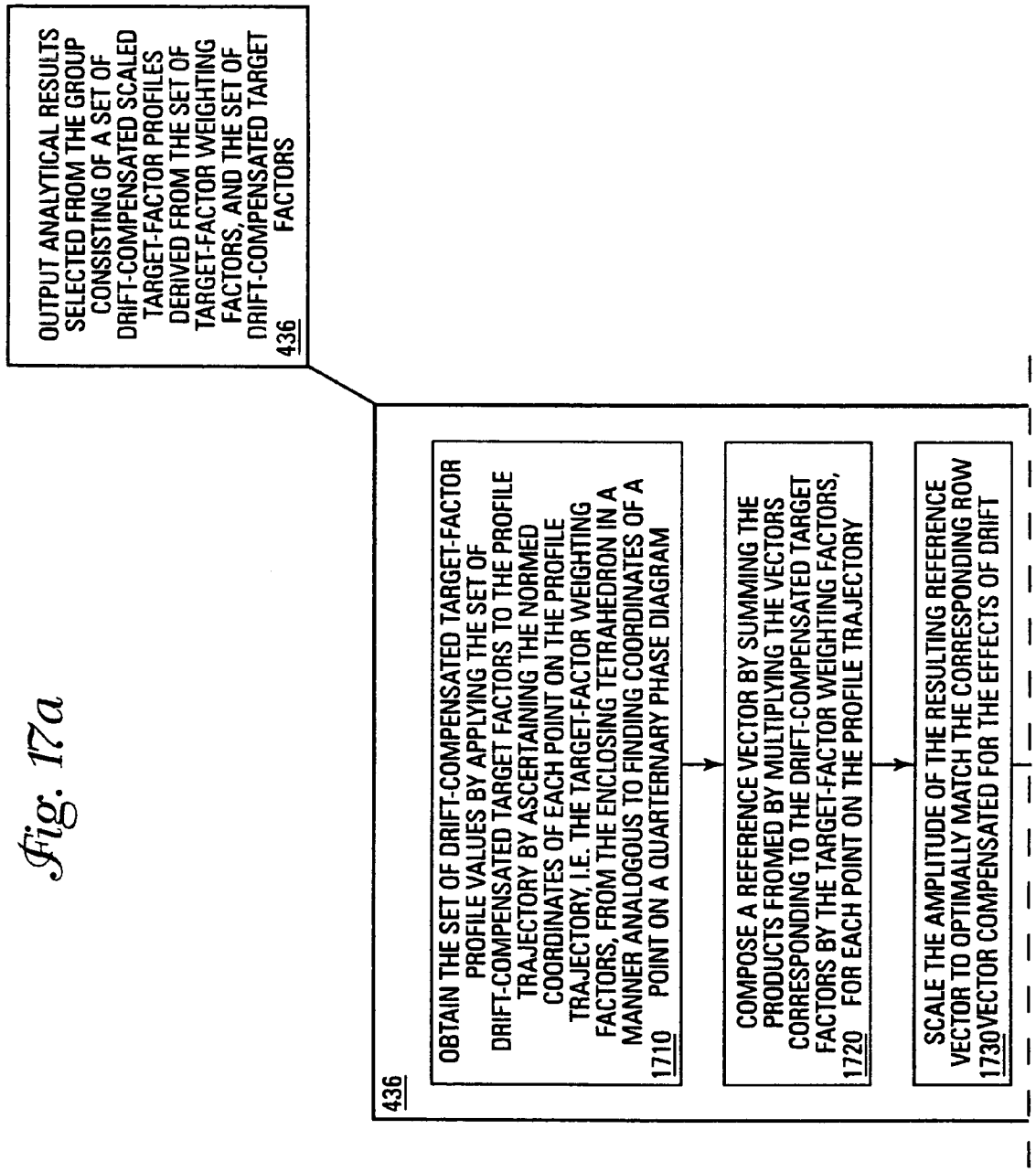
FIG. 17 is a flow chart of a method used in various embodiments of the invention, a procedure for calculating target-factor weighting factors for each drift-compensated row vector.
Figure 17B:
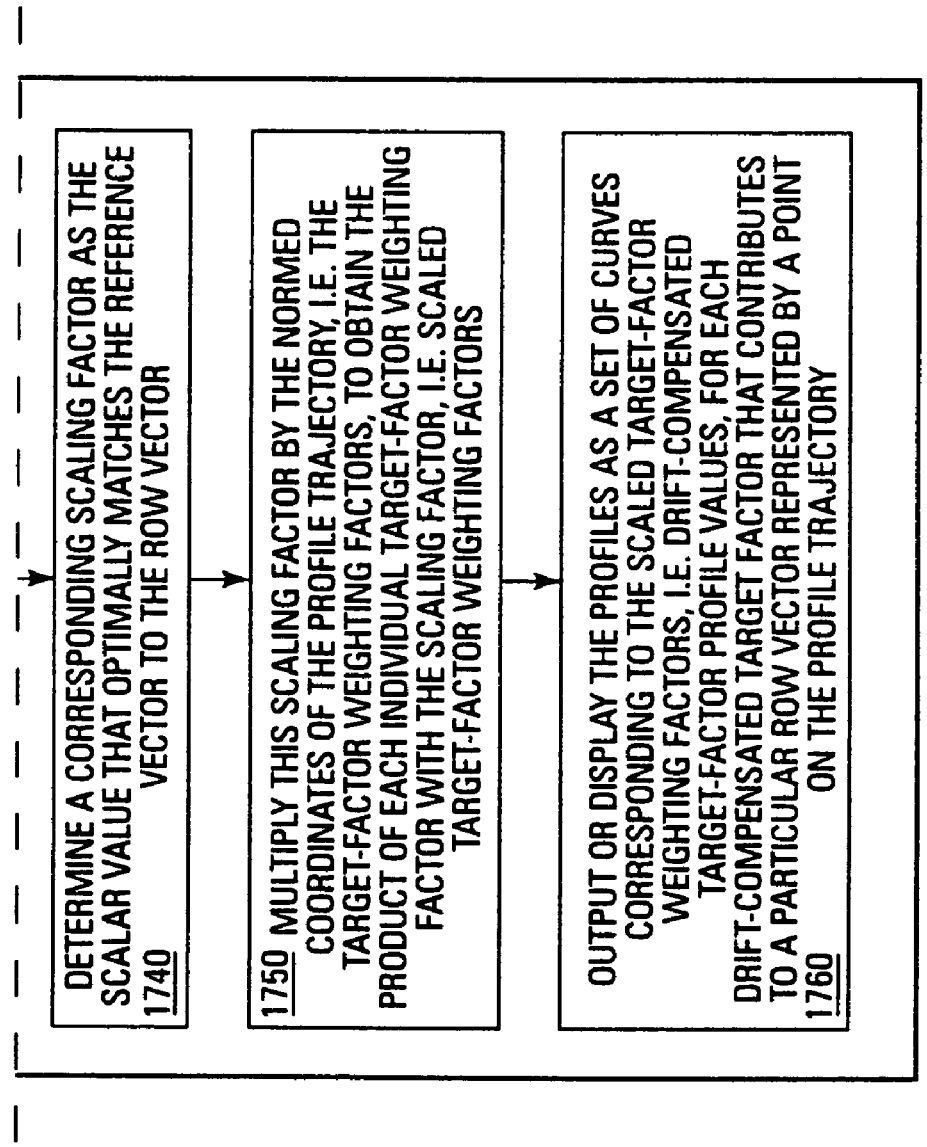

With reference to FIG. 4, describing in greater detail specific aspects thereof, an embodiment of the invention incorporating a procedure for outputting a set of drift-compensated scaled target-factor profiles derived from a set of target-factor weighting factors, 436, is described next. FIG. 17 illustrates a method, 1700, for outputting drift-compensated scaled target-factor profiles derived from the set of target-factor weighting factors for each drift-compensated row vector, 436.

The set of drift-compensated target-factor profile values is obtained by applying the set of drift-compensated target factors to the profile trajectory by ascertaining the normed coordinates of each point on the profile trajectory, i.e. the target-factor weighting factors, from the enclosing tetrahedron in a manner analogous to finding coordinates of a point on a quaternary phase diagram, 1710; composing a reference vector by summing the products formed by multiplying the vectors corresponding to the drift-compensated target factors by the target-factor weighting factors, for each point on the profile trajectory, 1720; scaling the amplitude of the resulting reference vector to optimally match the corresponding row vector compensated for the effects of drift, 1730; determining a corresponding scaling factor as the scalar value that optimally matches the reference vector to the row vector, 1740; and, multiplying this scaling factor by the normed coordinates of the profile trajectory, i.e. the target-factor weighting factors, to obtain the product of each individual target-factor weighting factor with the scaling factor, i.e. scaled target-factor weighting factors, 1750. The profiles may then be output or displayed as a set of curves corresponding to the scaled target-factor weighting factor, i.e. drift-compensated target-factor profile value, for each drift-compensated target factor that contributes to a particular row vector represented by a point on the profile trajectory, 1760. The abscissa of each point of a curve in the drift-compensated target-factor profile, i.e. the cycle number of each point, is given by the location of its corresponding spectrum in the initial sequential series of spectra from which it was derived. The ordinate of each point of a curve in the drift-compensated target-factor profile, i.e. the drift-compensated target-factor profile value, is the scaled target-factor weighting factor of a corresponding drift-compensated target factor.

Alternatively, the drift-compensated scaled target-factor profiles can also be determined by solving analytically the following equation in the four-space of the first-four, drift-compensated principal factors for the scaled target-factor weighting factors, $C_1$, $C_2$, $C_3$, $C_4$:

$$c_1 PF_1 + c_2 PF_2 + c_3 PF_3 + c_4 PF_4 = C_1 TF_1 + C_2 TF_2 + C_3 TF_3 + C_4 TF_4$$

where $PF_1$, $PF_2$, $PF_3$, and $PF_4$ are the first-four, drift-compensated principal factors; $c_1$, $c_2$, $c_3$, and $c_4$ are principal-factor weighting factors giving the 4-space coordinates of a point on a corresponding profile trajectory on the first-four, drift-compensated principal factor basis set of vectors, i.e. $PF_1$, $PF_2$, $PF_3$, and $PF_4$; $TF_1$, $TF_2$, $TF_3$, and $TF_4$ are the drift-compensated target factors; and, $C_1$, $C_2$, $C_3$, and $C_4$ are the scaled target-factor weighting factors given by the 4-space coordinates of a point representing the row vector on a corresponding profile trajectory on the drift-compensated target factor basis set of vectors, i.e. $TF_1$, $TF_2$, $TF_3$, and $TF_4$. Note that this is a vector equation in four dimensions, and that the first-four, drift-compensated principal factors and drift-compensated target factors are vector quantities. The principal-factor weighting factors and scaled target-factor weighting factors are scalar quantities. The profile trajectory, as a representation of the path of the drift-compensated row vectors in the 4-dimensional space of the first-four, drift-compensated principal factors, can be represented as the path of these row vectors projected into the 3-dimensional projection space of a 4-dimensional space of a set of first-four, drift-compensated principal factors, so that it appears as a space curve within this 3-dimensional space.

This equation is solved by expressing the drift-compensated target factors in terms of the first-four, drift-compensated principal factors, substituting these values in the above equation, separating the variables for each first-four, drift-compensated principal factor into separate scalar equations, and solving for the unknown scaled target-factor weighting factors. The expression for each of the drift-compensated target factors in terms of the first-four, drift-compensated principal factors can be found by taking the dot product of each drift-compensated target factor with each first-four, drift-compensated principal factor and forming the sum of the products formed by multiplying each of these dot products by each first-four, drift-compensated principal factor; since the first-four, drift-compensated principal factors form an orthonormal set of vectors, this amounts to simply finding the vector equivalent of each vector, a given drift-compensated target factor, on a set of orthonormal basis vectors, the first-four, drift-compensated principal factors, which is a well known procedure in vector analysis. Alternatively, the normed coordinates of the drift-compensated target factors can be ascertained from their location with respect to the reference tetrahedron in a manner analogous to finding coordinates of a point on a quaternary phase diagram to give these dot products. Upon substitution of the values of the drift-compensated target factors in terms of the first-four, drift-compensated principal factors, terms with like first-four, drift-compensated principal factors are grouped together. The scalar factors on each side of the equation in the individual first-four, drift-compensated principal factors then provides four equations for each of the principal-factor weighting factors, $c_1$, $c_2$, $c_3$, and $c_4$, in terms of the unknown scaled target-factor weighting factors, $C_1$, $C_2$, $C_3$, and $C_4$, and the dot products of the drift-compensated target factors with each first-four, drift-compensated principal factor. These are then solved for the scaled target-factor weighting factors, $C_1$, $C_2$, $C_3$, and $C_4$. The scaled target-factor weighting factors can then be output as a set of drift-compensated scaled target-factor profiles.

Alternatively, the drift-compensated scaled target-factor profiles can be generated more directly by a linear-least-squares (LLS) fit of the drift-compensated row vectors of the drift-compensated array with the drift-compensated target factors. The scaled target-factor weighting factors from the LLS fit of the individual drift-compensated target factors to each drift-compensated row vector give the values of the points on the drift-compensated target-factor profile for each constituent corresponding to the drift-compensated target factor at the index number or cycle number of a particular drift-compensated row vector in the drift-compensated array.

Finally, it is often desirable to output the set of drift-compensated target factors from which the drift-compensated scaled target-factor profiles are derived. These drift-compensated target factors have already been calculated earlier in the course of the procedure. The program embodying these procedures provides the analyst with the capability of outputting analytical results selected from the group consisting of a set of drift-compensated scaled target-factor profiles derived from the set of target-factor weighting factors, and the set of drift-compensated target factors.

Procedure for Generating Drift-Compensated Compositional Profiles

If the analyst is dealing with spectra, it is often desirable to generate drift-compensated compositional profiles from the drift-compensated scaled target-factor profiles. Since in normal analytical practice, spectral intensities often vary depending upon the constituent, it is desirable to normalize intensities by applying sensitivity factors to the spectral intensities to provide a true measure of the amount of the constituent that is present relative to other constituents that may also be present. Therefore, it is desirable to make provision for an analogous procedure for converting drift-compensated scaled target-factor profiles to drift-compensated compositional profiles.

Figure 18:
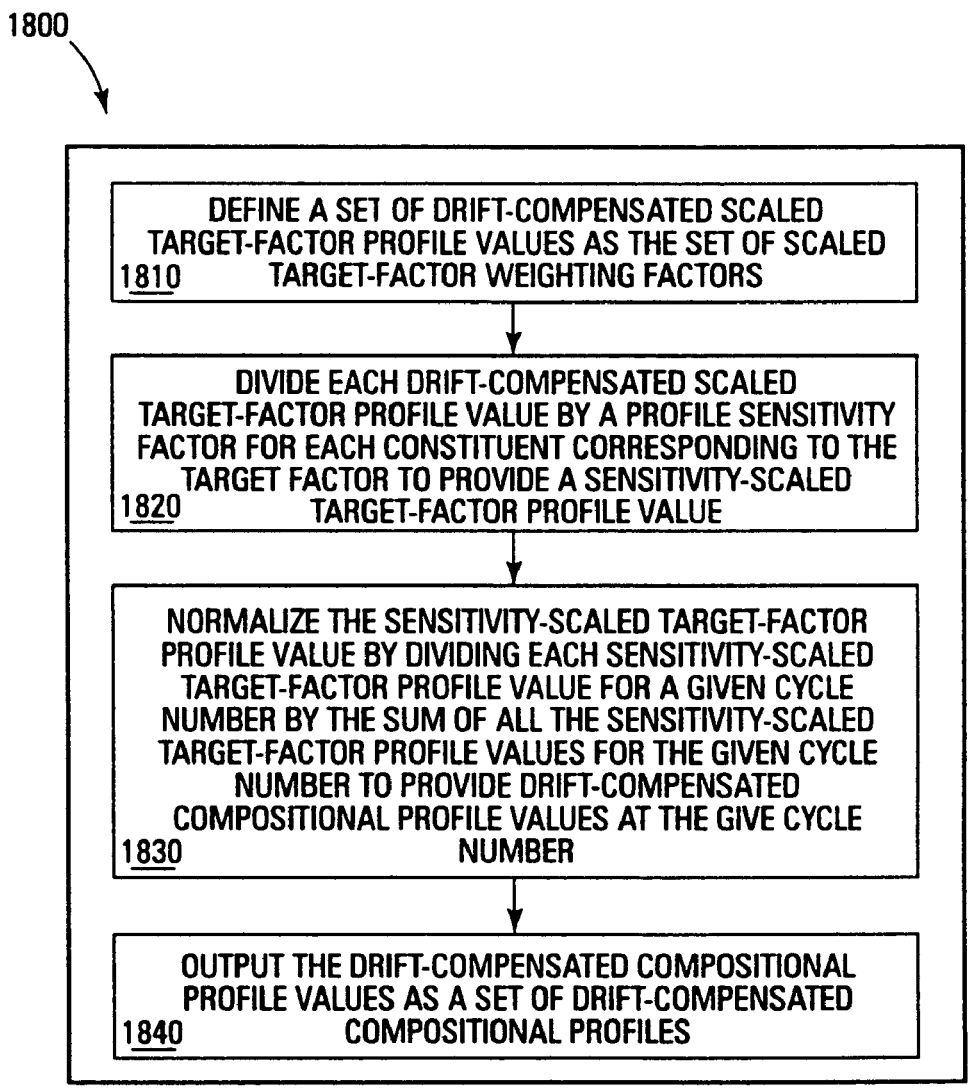
FIG. 18 is a flow chart of a method used in various embodiments of the invention, a procedure for generating and outputting drift-compensated compositional profiles.

The procedure for generating drift-compensated compositional profiles from the drift-compensated scaled target-factor profiles is illustrated in FIG. 18. Assuming that the drift-compensated scaled target-factor profiles contain contributions from all the constituents present within the analysis sample, drift-compensated compositional profiles can be obtained from the drift-compensated scaled target-factor profiles by: defining a set of drift-compensated scaled target-factor profile values as the set of scaled target-factor weighting factors, 1810; dividing each drift-compensated scaled target-factor profile value by a profile sensitivity factor for each constituent corresponding to the target factor to provide a sensitivity-scaled target-factor profile value, 1820; normalizing the sensitivity-scaled target-factor profile by dividing each sensitivity-scaled target-factor profile value for a given cycle number by the sum of all the sensitivity-scaled target-factor profile values for the given cycle number to provide drift-compensated compositional profile values at the given cycle number, 1830; and outputting the drift-compensated compositional profile values as a set of drift-compensated compositional profiles, 1840.

Sensitivity factors generally known in the art, e.g. from handbooks of Auger spectra, are unlikely to provide good quantitative results, because of the extensive data processing applied to spectra by the procedures for compensating spectra and profiles derived therefrom for effects of drift. Sensitivity factors based on handbook spectra are very sensitive to spectral shape and other characteristics which can be lost during the aforementioned drift-compensation procedures. In particular, profiles based on moduli of Fourier-transformed spectra are not expected to be quantifiable using handbook values for sensitivity factors. To overcome these difficulties, sensitivity factors should be obtained from measurements on standards of known composition. To distinguish sensitivity factors used to quantify drift-compensated scaled target-factor profiles from those normally used in the art, the term profile sensitivity factor will be used. The procedure for determining profile sensitivity factors applicable to drift-compensated scaled target-factor profiles is as follows: prepare standards of known composition, preferably multilayers consisting of layers, e.g. with thicknesses exceeding several mean-free-paths of the electrons associated with the constituents in the spectra, of pure constituents identified, e.g. in the sputter-depth-profile analysis; acquire a sequential series of spectra from the standards, e.g. by a sputter-depth-profile analysis; obtain drift-compensated scaled target-factor profiles by the identical procedure applied to the analysis sample for which quantification in the form of a drift-compensated compositional profile is desired; and, obtain profile sensitivity factors corresponding to various pure constituents in the standard that are defined as the number value of the drift-compensated target-factor profile for a cycle number corresponding to the pure constituent. This procedure will be recognized by those skilled in the art to be analogous to procedures used to determine sensitivity factors of spectra from standards, but in this case extended to drift-compensated scaled target-factor profiles.

When the drift-compensated compositional profiles of an analysis sample are generated from the drift-compensated scaled target-factor profiles using standard profile sensitivity factors, the units of the number values at given points on the profile will be units of relative constituent fraction. It will be recognized that this is not the same as atomic fraction, unless the constituents are pure elements, because these constituents, in general, will be amongst a set of both pure compounds and pure elements. It will also be recognized that with suitable further scaling factors, e.g. based on the stoichiometry of compound constituents, it should be possible to further express the compositional profiles in units of atomic fractions of pure elements.

Apparatus Embodying the Invention

Figure 19:
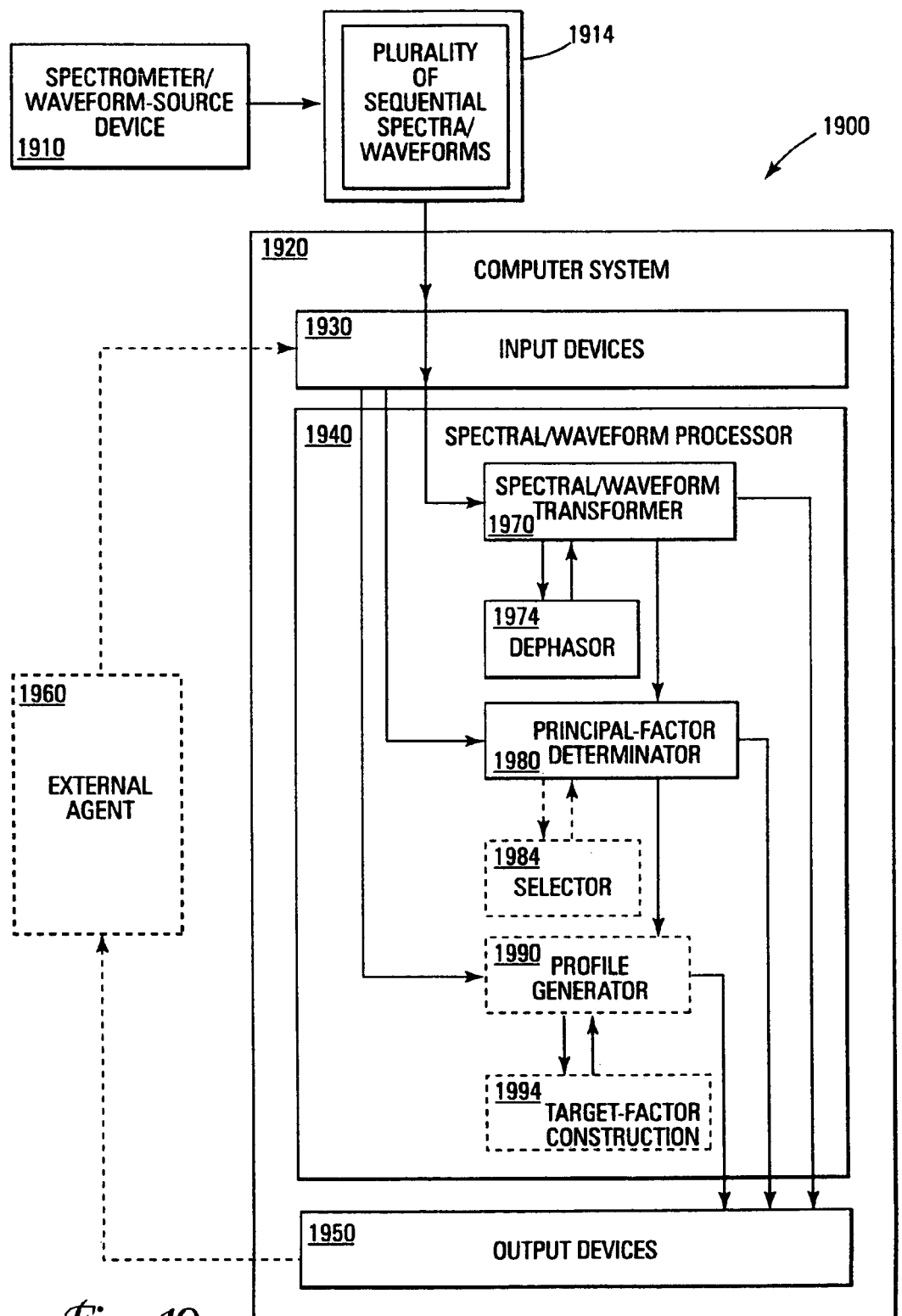
FIG. 19 is a block diagram embodying features of a version of the invention, an apparatus for compensating waveforms, spectra, and profiles derived therefrom for effects of drift.

FIG. 19 shows a preferred embodiment of the invention, an apparatus for compensating waveforms, spectra, and profiles derived therefrom for effects of drift, 1900. It comprises a spectroscopic analysis system having a spectrometer, 1910, coupled to a computer system, 1920, by a spectral input device that inputs a series of spectra, 1914, from the spectrometer into the computer system, 1920. The computer system, 1920, contains a spectral processor for drift compensation, 1940, which in the preferred embodiment comprises a resident computer program incorporating a spectral processing method for compensating spectra and profiles derived therefrom for effects of drift, 400, which was described in detail earlier. However, it will be readily seen that even though the preferred embodiment of the invention is a computer program running on a digital computer, preferably a personal computer (PC), or computer workstation, the invention may be implemented just as effectively in a variety of other circuits, e.g. analog computer circuits, well known to those skilled in the art, although in probably a somewhat more costly fashion.

It will be seen that the spectrometer may be a generic spectrometer the spectra of which are subject to drift. However, the invention finds great utility when practiced on electron spectrometers, such as an Auger spectrometer, an x-ray photoelectron spectrometer, or an electron energy loss spectrometer.

Furthermore, it will be seen that such a system may be applied to the analysis of waveforms in which case it becomes a waveform analysis system. It, then, comprises a waveform-source device coupled to a computer system by a waveform input device that inputs a series of waveforms from the waveform-source device into the computer system. The computer system contains a waveform processor for drift compensation which in the preferred embodiment comprises a resident computer program incorporating a waveform processing method for compensating waveforms and profiles derived therefrom for effects of drift, 400, which was described in detail earlier.

The computer system, 1920, also contains input devices, 1930, such as a keyboard, mouse, floppy-disk drive, compact-disk (CD) read-only-memory (ROM) drive, or other input devices known in the art, through which an external agent, an analyst, 1960, interacts with the computer and spectral/waveform processor embodying one aspect of the invention. In addition, the computer system, 1920, also contains output devices, 1950, such as a computer display, e.g. cathode ray tube (CRT) or flat-panel display, printer, plotter, or other output devices known in the art, through which the external agent, the analyst, 1960, visualizes the data manipulations of the spectral/waveform processor, and monitors the progress of the spectral/waveform processor so as to direct the course of analysis by interaction through commands, i.e. computer instructions issued, to various computer-program modules that the spectral/waveform processor comprises. The transfer of such information to the analyst from the output devices, 1950, is indicated by the dashed arrow between the output devices, 1950, and the external agent, 1960; and, the transfer of information from the analyst to the input devices, 1930, is indicated by the dashed arrow between the external agent, 1960, and input devices, 1930.

The transfer of information between various components of the computer system and the spectral/waveform transformer, 1970, as well as between various computer-program modules within the spectral/waveform processor are indicated by the arrows connecting these components within FIG. 19. Information transferred to and from these various components includes: spectra, or waveforms, that are input into the computer system, 1920, via input devices, 1930; drift-compensated arrays in the form of drift-compensated spectra, or moduli of Fourier-transformed spectra; drift-compensated scaled target-factor profiles; drift-compensated compositional profiles based on spectra; various commands of the analyst transferred via input devices to individual computer-program modules; and, processed data conveyed to the analyst via output devices from individual computer-program modules that the spectral-waveform processor, 1940, comprises. The details of such information transfer between various components of the computer system and between various computer-program modules of the spectral/waveform processor, 1940, are subsequently described in greater detail.

A preferred embodiment of the spectral/waveform processor, 1940, comprising a resident computer program incorporating a spectral/waveform processing method for compensating waveforms, spectra, and profiles derived therefrom for effects of drift incorporates a spectral/waveform transformer, 1970, that operates on a plurality of sequential spectra obtained from the spectrometer or waveforms obtained from a waveform-source device, resp., 1910, and provides an array of drift-compensated row vectors, i.e. a drift-compensated array, derived from the plurality of sequential spectra, or waveforms. This drift-compensated array can then be displayed or output at a peripheral output device, 1950, which may be a printer, plotter, CRT, or other equivalent device. A principal-factor determinator, 1980, operates on the drift-compensated array provided by the spectral/waveform transformer, 1970, and provides a set of drift-compensated principal factors derived from the drift-compensated array. A profile generator, 1990, operates on a profile trajectory of the drift-compensated row vectors, comprising the plurality of sequential drift-compensated spectra, or waveforms, lying within a space of drift-compensated principal factors and provides a set of drift-compensated scaled target-factor profiles These drift-compensated scaled target-factor profiles are then displayed or output at the peripheral output device, 1950.

A preferred embodiment of the spectral/waveform transformer, 1970, principal-factor determinator, 1980, and profile generator, 1990, is to implement them in the form of computer-program modules, subroutines, or subprograms that run on a digital computer. The preferred embodiment of the computer-program modules comprises a variety of computer-program modules with which the analyst may interact with the processing of the above data, viz. a plurality of sequential spectra, or waveforms, a drift-compensated array, and a set of drift-compensated principal factors. Such computer-program modules comprise spreadsheets, eigenanalysis programs, mathematical and numerical-data manipulation programs that are implemented in interpreter and compiler languages known to those skilled in the art.

Data on the drift-compensated array and information regarding the progress of computations performed by the spectral/waveform transformer, 1970, on the input spectra, or waveforms, is transferred to the output devices, 1950, for inspection by the analyst, which is indicated by the arrow between the spectral/waveform transformer, 1970, and the output devices, 1950; data on the principal factors and information regarding the progress, by the principal-factor determinator, 1980, on drift-compensated array is transferred to the output devices, 1950, for inspection, indicated by the arrow between the principal-factor determinator, 1980, and the output devices, 1950; and, data on the target factors, profile trajectory, drift-compensated scaled target-factor profiles, and, in the case of spectra, drift-compensated compositional profiles, and information regarding the progress of the analysis by the profile generator, 1990, on the drift-compensated array and principal factors is transferred to the output devices, 1950, for inspection, indicated by the arrow between the profile generator, 1990, and the output devices, 1950. The analyst can then interact with these various computer-program modules by inputting commands via the computer system input devices, 1930, indicated by the arrow between the external agent, the analyst, 1960, and the input devices, 1930, and by the arrows between the input devices, 1930, and the spectral/waveform transformer, 1970, principal-factor determinator, 1980, and profile generator, 1990.

Typically, the principal-factor determinator, 1980, comprises a factor analyzer; alternatively, the principal-factor determinator, 1980, comprises a linear-least-squares analyzer. The analyst can select either type of principal-factor determinator, 1980, by selection of a corresponding computer-program module through a command, i.e. computer instruction, issued by the analyst. The selection of which type of principal-factor determinator, 1980, to employ depends on the nature of the sample and the behavior of the spectra/waveforms; the selection criteria have been described in great detail earlier in the discussion of the choice of linear-least-squares analysis vis-à-vis factor analysis. The analyst can also have the profile generator, 1990, generate a set of drift-compensated compositional profiles through operation on the set of drift-compensated scaled target-factor profiles. The generation of drift-compensated compositional profiles is performed when spectra are analyzed for which further quantification of profiles is often desirable, as discussed previously.

A preferred embodiment of the spectral/waveform transformer, 1970, accepts as input into the computer system the plurality of sequential spectra, or waveforms, through a spectral/waveform input device that inputs the series of spectra, or waveforms, 1914, obtained from the spectrometer or waveform-source device, resp., 1910; in one embodiment, this is accomplished by reading a computer disk containing such spectra, or waveforms, in the form of, for example, a series of ASCII files of intensity readings per energy channel of each spectrum, or waveform. The spectral/waveform transformer, 1970, further orders the inputted spectra, or waveforms, in a primal array wherein each sequential spectrum, or waveform, constitutes a successive row vector of the primal array.

An example of such a primal array is a data structure consisting of a 2-dimensional array wherein each element of the array is indexed by a column and a row index and the elements of the array would include the ASCII value for intensity readings from each of the input spectra, or waveforms, ordered so that the row index corresponds to the cycle number, or index number, of the spectrum, or waveform, designating its position in the sequential series of spectra, or waveforms, and the column index corresponds to the channel number of the ASCII value for the intensity readings of an individual spectrum, or waveform, ordered at a corresponding row index. Another way to view such an array is as an array of vectors wherein the number of elements within an individual vector is determined by the number of channels in an input spectrum, or waveform, each vector consisting of the ASCII values of intensity readings of a spectrum, or waveform, indexed by a corresponding channel number; the row index of the array would then correspond to an index for each individual row vector of a corresponding spectrum, or waveform, and the column index to the channel number within an individual row vector.

The next operation of the spectral/waveform transformer, 1970, removes phase factors due to drift using a dephasor, 1974, that transforms the primal array into a drift-compensated array. By issuing a command through the input devices, 1930, to the spectral/waveform transformer, 1970, the analyst can elect to use one of two different dephasors embodied as computer-program modules executing dephasing procedures based on the Fourier transform or nonlinear-least-squares fitting of the spectra, or waveforms. The dephasor accepts data in the form of spectra, i.e. row vectors, in a primal array from the spectral/waveform transformer, 1970, and returns a drift-compensated array, i.e. an array of drift-compensated spectra, or waveforms, or moduli of Fourier-transformed spectra, or waveforms, to the spectral/waveform transformer, 1970. This data exchange, as well as any others, between the dephasor, 1974, and the spectral/waveform transformer, 1970, is indicated by the reciprocal arrows connecting the these two components in FIG. 19. In addition, the analyst can inspect the data as it is being processed by the dephasor, 1974, by requesting that it be sent from the dephasor, 1974, through the spectral/waveform transformer, 1970, to one of the output devices, 1950, such as a CRT. Then, the analyst can input a command to the spectral/waveform transformer, 1970, through the one of input devices, 1930, such as a keyboard to plot or print a drift-compensated array at one of these respective output devices, 1950.

The earlier discussion of FIG. 10 and discussions immediately subsequent thereto describe an embodiment of the dephasor, 1974, as a computer-program module executing a dephasing procedure based on the Fourier transform. This embodiment of the dephasor, 1974, that transforms the primal array into the drift-compensated array applies a Fourier transform to the spectra in the primal array of row vectors to form an array of Fourier-transformed row vectors, multiplies each Fourier-transformed row vector by a complex conjugate of each Fourier-transformed row vector to form a squared moduli vector thereby removing phase factors due to drift, takes the square root of each element of the squared moduli vector to create a corresponding moduli vector, and forms a drift-compensated array of moduli vectors by successively sequencing the moduli vectors as successive drift-compensated row vectors in a drift-compensated array. The moduli vectors constitute moduli of Fourier-transformed spectra. The analyst can elect at this point to have the spectral transformer output the drift-compensated row vectors of the drift-compensated array as a sequential series of moduli of Fourier-transformed spectra. The transfer of this data, i.e. the sequential series of moduli of Fourier-transformed spectra, is indicated by the arrow between the dephasor, 1974, and the spectral/waveform transformer, 1970, which transfers the data to the output devices, 1950, which is indicated by a subsequent arrow between the spectral/waveform transformer, 1970, and the output devices, 1950.

The earlier discussion of FIG. 11 and discussions immediately subsequent thereto describe an embodiment of the dephasor, 1974, as a computer-program module executing a dephasing procedure based on nonlinear-least-squares fitting. This embodiment of the dephasor, 1974, fits each spectrum in the primal array using selected reference spectra, or waveforms, calculates a corresponding reference weighting factor for each reference spectrum, or waveform, corresponding to each spectrum in the primal array, synthesizes a corresponding drift-compensated spectrum given by the sum of each selected reference spectrum, or waveform, multiplied by the corresponding reference weighting factor thereby removing phase factors due to drift, and forms a drift-compensated array by successively sequencing the drift-compensated spectra, or waveforms, as successive drift-compensated row vectors in the drift-compensated array. Once again, the analyst can elect to have the spectral/waveform transformer output the drift-compensated row vectors of the drift-compensated array, but, in this case, as a sequential series of drift-compensated spectra, or waveforms. The transfer of this data, i.e. the sequential series of drift-compensated spectra, or waveforms, is indicated by the arrow between the dephasor, 1974, and the spectral/waveform transformer, 1970, which transfers the data to the output devices, 1950, which is indicated by a subsequent arrow between the spectral/waveform transformer, 1970, and the output devices, 1950.

Furthermore, it should be mentioned that the selection of reference spectra, or waveforms, is an operation that requires considerable interaction with the analyst. This implies that commands to inspect the spectra, or waveforms, and to select and form reference spectra, or waveforms, are issued by the analyst through the input devices, 1930, and the spectral/waveform transformer, 1970, to the dephasor, 1974. In addition, analytical results selected from the group consisting of the selected reference spectra, or waveforms, used in the fitting procedure, the drift-compensated row vectors of the drift-compensated array as a sequential series of drift-compensated spectra, or waveforms, reference weighting factors for each reference spectrum, or waveform, corresponding to each spectrum, or waveform, in the primal array as a set of drift-compensated reference-spectrum/waveform profiles, and phase factors due to drift for each reference spectrum, or waveform, corresponding to each spectrum, or waveform, in the primal array as a set of phase-factor profiles, can be output for inspection from the dephasor, 1974, through the spectral/waveform transformer, 1970, to one of the output devices, 1950. The details of reference spectra, or waveform, construction was described in detail in the earlier discussion of FIG. 7 and discussions immediately subsequent thereto.

The dephasor, 1974, returns the drift-compensated array to the spectral/waveform transformer, 1970, which transfers the drift-compensated array to the principal-factor determinator, 1980, which is indicated by the arrow between the dephasor, 1974, and the spectral/waveform transformer, 1970, and a subsequent arrow between spectral/waveform transformer, 1970, and the principal-factor determinator, 1980. One embodiment of the principal-factor determinator, 1980, which can be selected by the analyst, is a factor analyzer; the other embodiment of the principal-factor determinator, 1980, which can be selected by the analyst, is a linear-least-squares analyzer. Which of these two is chosen depends on a command issued by the analyst. The criteria for selection of one or the other was discussed earlier and depends on the appearance of the row vectors in the drift-compensated array, i.e. drift-compensated spectra, or waveforms, or moduli of Fourier-transformed spectra, or waveforms, which can be ascertained from the output of this data described in the earlier discussion of FIG. 4. Once a determination has been made upon inspection of the data by the analyst, the analyst issues a command to the principal-factor determinator, 1980, through one of the input devices, 1930, to select the factor analyzer or the linear-least-squares analyzer indicated by the arrow between the input devices, 1930, and the principal-factor determinator, 1980.

An embodiment of the invention, a factor analyzer, is a computer-program module that executes a principal-factor determination based on factor analysis described in the earlier discussion of FIG. 4. The factor analyzer, 1980, forms a covariance array from the drift-compensated array by multiplying the array by its transpose. The factor analyzer, 1980, then applies an eigenanalysis to the covariance array to define a complete set of eigenvectors and eigenvalues. Finally, the factor analyzer, 1980, defines a set of drift-compensated principal factors as a subset of the eigenvectors determined by a selector, 1984, operating on the complete set of eigenvectors. The selector, 1984, is shown by dashed lines in FIG. 19 and with dashed arrows connecting it to the principal-factor determinator, 1980, indicating that it is only used with the factor analyzer embodiment of the principal-factor determinator.

The selector accepts data in the form of eigenvalues and eigenvectors from the factor analyzer, i.e. principal-factor determinator, 1980, and returns a set of principal factors to the principal-factor determinator, 1980. This data exchange, as well as any others, between the selector, 1984, and the principal-factor determinator, 1980, is indicated by the reciprocal arrows connecting the these two components in FIG. 19. In addition, the analyst can inspect the complete set of eigenvalues, 1984, by requesting that it be sent from the selector, 1984, through the principal-factor determinator, 1980, to one of the output devices, 1950. At this point, the analyst can input a command to the selector, 1984, through the principal-factor determinator, 1980, and one of input devices, 1930, to select particular eigenvectors. Also, the analyst can input a command to the principal-factor determinator, 1980, through one of the input devices, 1930, to plot or print an eigenvalue profile showing the eigenvalues selected from amongst the complete set of eigenvalues; the principal-factor determinator, 1980, then, transfers the data to one of the output devices, 1950, which is indicated by an arrow between the principal-factor determinator, 1980, and the output devices, 1950.

The selector, 1984, defines the drift-compensated principal factors as a first few eigenvectors corresponding to eigenvalues above a certain limiting value significantly higher than remaining eigenvalues associated with noise. The eigenvalues associated with noise are readily identified by small values nearly equal to zero. For example, an analyst may directly inspect the output of the eigenanalysis and assign the drift-compensated principal factors to eigenvectors the eigenvalues of which are much greater than zero. However, it is equally possible to automate the process by implementing a short subroutine that would sort eigenvalues above a cutoff value, chosen by the analyst for its suitability in capturing the essential features of the experimental data, i.e. the sequential series of spectra, or waveforms, and would assign the drift-compensated principal factors to the corresponding eigenvectors.

An alternative embodiment of the principal-factor determinator, 1980, which, also, can be selected by the analyst, is a linear-least-squares analyzer. An embodiment of the invention, a linear-least-squares analyzer, is a computer program module that executes a principal-factor determination based on linear-least-squares analysis described in the earlier discussion of FIG. 12 and discussions immediately subsequent thereto. The linear-least-squares analyzer selects a set of initial factors from the set of drift-compensated row vectors of the drift-compensated array, performs a linear-least-squares decomposition with the set of initial factors on the drift-compensated row vectors in the drift-compensated array to provide a set of residue factors, and performs a Gram-Schmidt orthonormalization on the combined set of initial factors and residue factors to provide drift-compensated principal factors.

The linear-least-squares analyzer requires considerable interaction between the analyst and this computer-program module. Initially, the analyst must inspect the data input from the spectral/waveform transformer, 1970, i.e. the drift-compensated spectra, or waveforms, or moduli of Fourier-transformed spectra, or waveforms, to select initial factors. In particular, the linear-least-squares decomposition is a procedure that is iterative and requires frequent inspection of initial factors, convergence of the fit on the row vectors, residues, and residue factors. These procedures all require output of this data from the principal-factor determinator, 1980, to one of the output devices, 1950, and input from the analyst via one of the input devices, 1930, to the principal-factor determinator, 1980, as indicated by the respective arrows between these components of the computer system.

The principal-factor determinator, 1980, provides the drift-compensated principal factors, as well as the row vectors of the drift-compensated array, to the profile generator, 1990, indicated by the arrow in FIG. 19 showing a path for data transfer between these two components. The profile generator, 1990, defines a set of drift-compensated target factors on a space of the drift-compensated principal factors determined by a target-factor constructor, 1994, operating on the drift-compensated principal factors. The transfer of information between these two computer-program modules is indicated by the reciprocal arrows between them in FIG. 19. Such information also includes instructions sent by the analyst via the input devices, 1930, to the target-factor constructor, 1994, through the profile generator, 1990, as well as information sent by the target-factor constructor, 1994, to the analyst through the profile generator, 1990, to one of the output devices, 1950. Next, the profile generator, 1990, applies the set of drift-compensated target factors to a profile trajectory lying within a space of drift-compensated principal factors to obtain a sequential set of target-factor weighting factors corresponding to the drift-compensated target factors for the profile trajectory. Finally, the profile generator, 1990, outputs a set of drift-compensated scaled target-factor profiles derived from the set of target-factor weighting factors. Embodiments of the invention, i.e. these various operations of the profile generator, have been implemented as the procedures of various computer-program modules described with particularity in previous sections.

In particular, definition of a set of drift-compensated target factors on a space of the drift-compensated principal factors determined by the target-factor constructor, 1994, is described earlier in the discussion of FIG. 13. In effect, the profile generator defines a set of drift-compensated target factors by selecting through the target-factor constructor, 1994, a suitable linear combination of the first-four, drift-compensated principal factors as a basis for representation of each row vector in the drift-compensated array. In selecting a suitable linear combination of the first-four, drift-compensated principal factors, the target-factor constructor, 1994, first, generates a profile trajectory on a 3-dimensional projection of a 4-dimensional space of a set of first-four, drift-compensated principal factors along with a reference tetrahedron the vertices of which represent each of the first-four, drift-compensated principal factors. Next, the target-factor constructor, 1994, encloses the profile trajectory within an enclosing tetrahedron with vertices centered on end-points and in proximity to turning points of the profile trajectory, and with faces lying essentially tangent to portions of the profile trajectory. Finally, the target-factor generator calculates the drift-compensated target factors from the normed coordinates of the vertices of the enclosing tetrahedron in terms of the drift-compensated principal factors.

Figure 14:
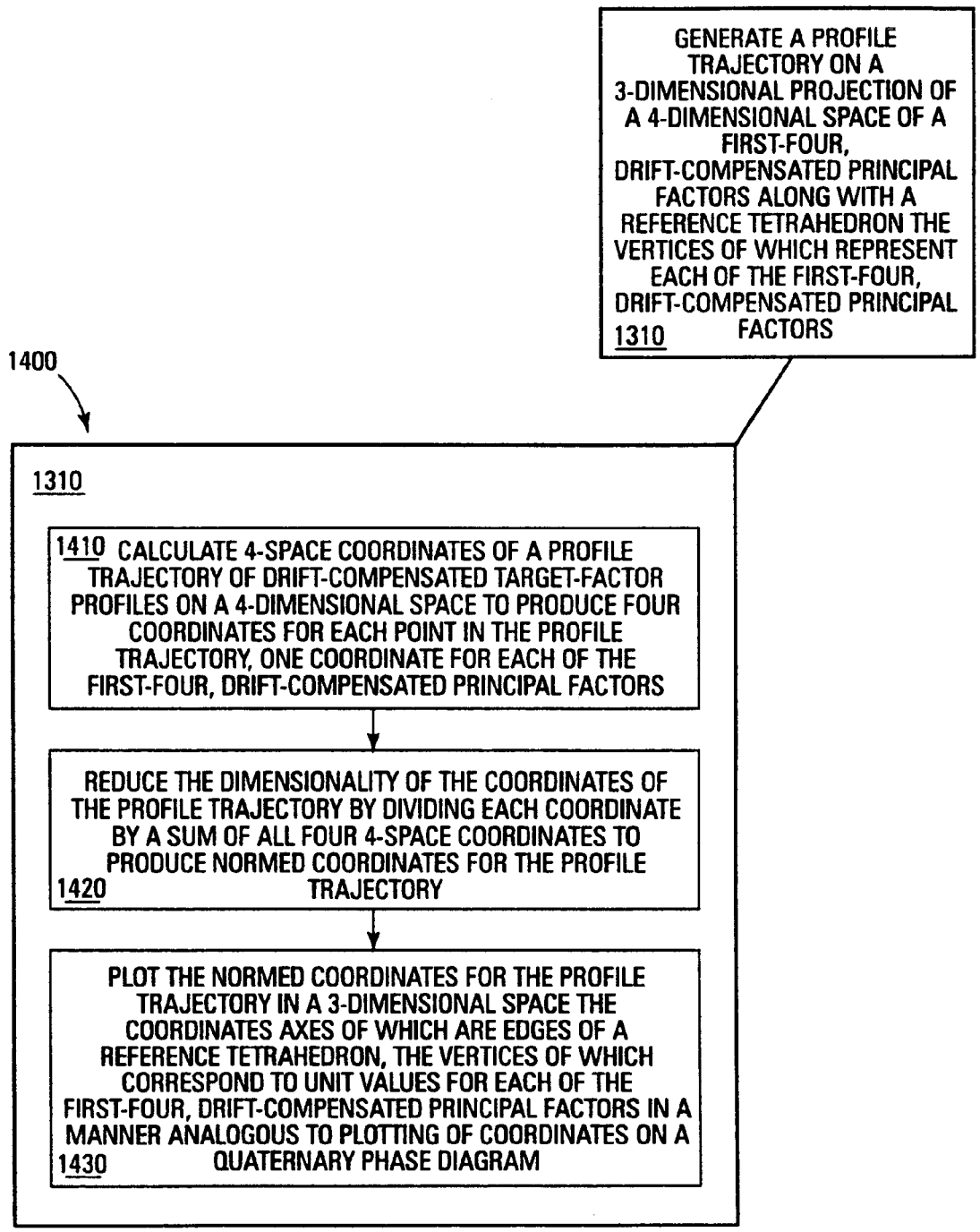
FIG. 14 is a flow chart of a method used in various embodiments of the invention, a procedure for generating the profile trajectory and representing the profile trajectory in terms of the drift-compensated principal factors.

The complex procedure of the computer-program module by which the target-factor constructor generates a profile trajectory is described in the discussion of FIG. 14. First, the target-factor constructor normalizes each of the row vectors of the drift-compensated array by dividing each element of the row vector by the row vector's magnitude, producing a normalized row vector of the drift-compensated array. Second, the target-factor constructor normalizes the first-four, drift-compensated principal factors by dividing each element of the vector corresponding to a drift-compensated principal factor by the vector's magnitude, producing normalized, first-four, drift-compensated principal factors. Third, the target-factor constructor calculates coordinates of a profile trajectory of drift-compensated target-factor profiles on a 4-dimensional space by taking a dot product of each normalized row vector of the drift-compensated array with the normalized, first-four, drift-compensated principal factors to produce four coordinates for each point in the profile trajectory given by each of the dot products, one coordinate for each of the first-four, drift-compensated principal factors. Fourth, the target-factor constructor reduces the dimensionality of the coordinates of the profile trajectory by dividing each coordinate by a sum of all four 4-space coordinates to produce normed coordinates for the profile trajectory. Finally, the target-factor constructor plots the normed coordinates for the profile trajectory in a 3-dimensional space the coordinate axes of which are edges of a reference tetrahedron the vertices of which correspond to unit values for each of the first-four, drift-compensated principal factors in a manner analogous to plotting of coordinates on a quaternary phase diagram.

Figure 15:
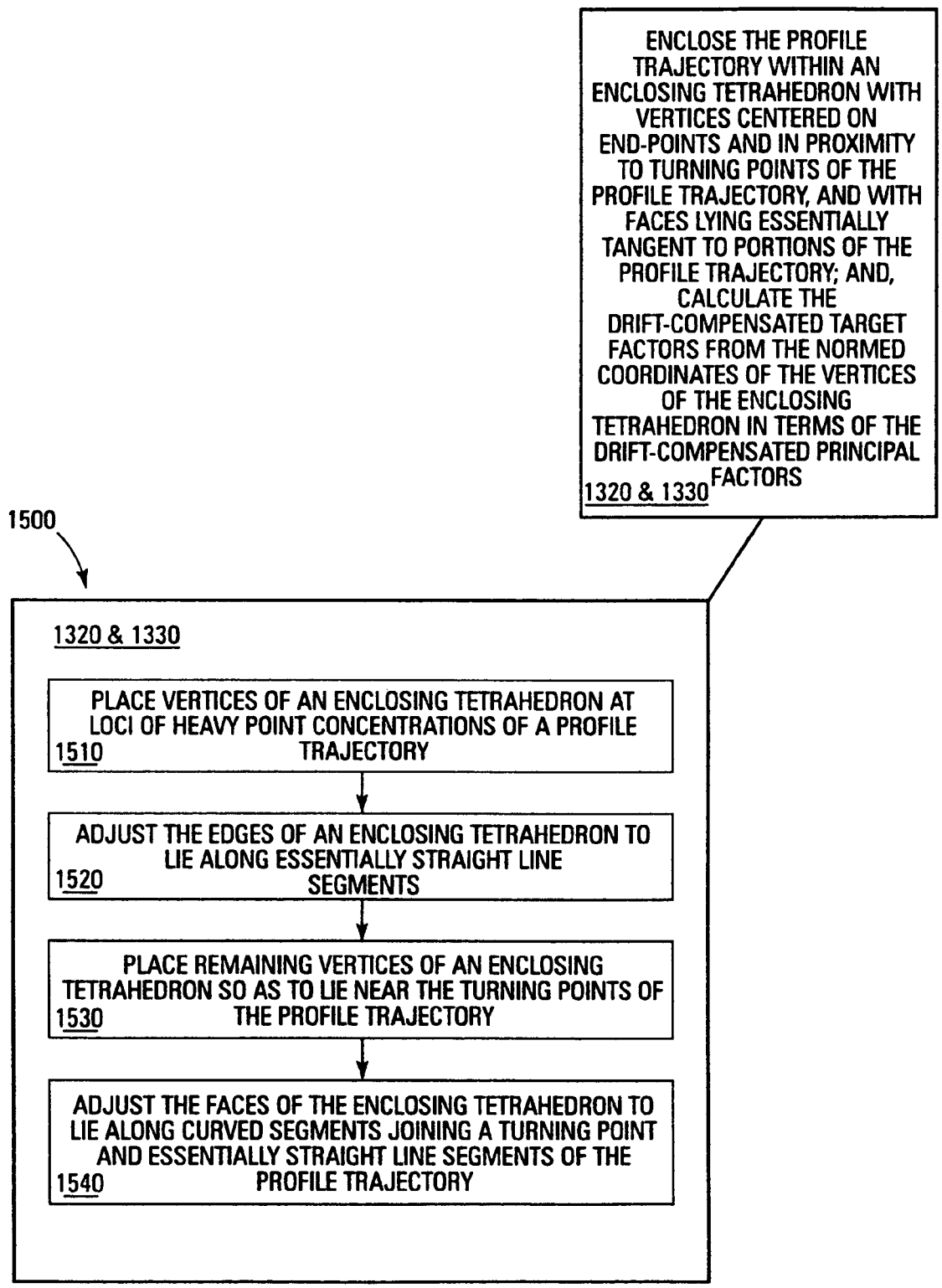
FIG. 15 is a flow chart of a method used in various embodiments of the invention, a procedure for enclosing the profile trajectory and calculating the drift-compensated target factors therefrom.

Two other procedures of computer-program modules employed by the target-factor constructor, 1994, are illustrated in FIG. 13, i.e. enclosing the profile trajectory in an enclosing tetrahedron, 1320, and calculating the drift-compensated target factors from the normed coordinates of the enclosing tetrahedron, 1330, are illustrated in FIG. 15, and, with greater particularity, in FIG. 16.

With reference to FIG. 15, to enclose the profile trajectory optimally within the enclosing tetrahedron, the analyst working interactively with the target-factor constructor, 1994, first, places vertices of an enclosing tetrahedron at loci of heavy point concentrations of a profile trajectory. Second, the target-factor constructor, 1994, adjusts the edges of an enclosing tetrahedron to lie along essentially straight line segments. Third, the target-factor constructor, 1994, places remaining vertices of an enclosing tetrahedron so as to lie near the turning points of the profile trajectory. Finally, the target-factor constructor, 1994, adjusts the faces of the enclosing tetrahedron to lie along curved segments joining a turning point and essentially straight line segments of the profile trajectory.

FIG. 16 describes with greater particularity an interactive procedure implemented on a digital computer using a graphical display interface to enclose the profile trajectory, and to calculate the drift-compensated target factors. First, the target-factor constructor, 1994, displays the profile trajectory of the projections of a sequence of row vectors and the reference tetrahedron spanning the space of the projections of the first-four, drift-compensated principal factors on a computer monitor. Second, the target-factor constructor, 1994, generates an enclosing tetrahedron by starting with a copy of the reference tetrahedron, and moves its vertices to enclose the profile trajectory using computer-program modules for the display of graphically generated computer objects. Third, the target-factor constructor, 1994, drags the vertices of the enclosing tetrahedron to the loci of heavy point concentrations in the profile trajectory. Fourth, the target-factor constructor, 1994, drags any remaining vertices of the enclosing tetrahedron to position them in the vicinity of any turning points in the profile trajectory so that essentially straight line segments lie in close proximity to edges of the enclosing tetrahedron; and, places the faces of the enclosing tetrahedron on or in close proximity to any curved portions of the trajectory that connect turning points. Fifth, the target-factor constructor, 1994, applies minor adjustments to the location of the vertices of the enclosing tetrahedron to enclose the subspace of the profile trajectory with an optimal volume that best fits the drift-corrected data represented by the profile trajectory, and to provide an enclosing tetrahedron, the vertices of which correspond with the drift-compensated target factors of the analysis. Sixth, the target-factor constructor, 1994, establishes the normed coordinates of the vertices of the enclosing tetrahedron relative to the reference tetrahedron as the enclosing-vertex weighting factors used to obtain the drift-compensated target factors from the normalized first-four, drift-compensated principal factors. Finally, the target-factor constructor, 1994, obtains the vectors giving the drift-compensated target factors for each vertex of the enclosing tetrahedron by summing the products of each enclosing-vertex weighting factor with the vector giving the normalized first-four, drift-compensated principal factor that corresponds to each vertex of the reference tetrahedron.

Next, having found by operation of the target-factor constructor, 1994, the set of drift-compensated target factors, the profile generator, 1990, obtains a sequential set of target-factor weighting factors corresponding to the profile trajectory of the row vectors in terms of the drift-compensated target factors. With reference to FIG. 4, the profile generator applies the set of drift-compensated target factors to the profile trajectory to obtain a sequential set of target-factor weighting factors, 432. The profile generator obtains the target-factor weighting factors by finding the normed coordinates of the points on the profile trajectory within the enclosing tetrahedron, i.e. the enclosed-profile-trajectory coordinates. Each of the four normed coordinates is given by the relative location of a point in the profile trajectory lying above the face that lies opposite the vertex of a corresponding drift-compensated target factor; this coordinate value is determined by the ratio of a length of a perpendicular line segment dropped from the point on the profile trajectory to the length of a perpendicular line segment dropped from the vertex, where both are dropped onto the one face opposite the vertex. Other details of this procedure are given with greater particularity in the section that describes a procedure for calculating target-factor weighting factors.

Next, the profile generator, 1990, obtains a set of scaled target-factor weighting factors for each drift-compensated row vector and displays the scaled target-factor weighting factors as drift-compensated scaled target-factor profiles. With reference to FIG. 4, the profile generator outputs a set of drift-compensated target-factor profiles derived from a set of target-factor weighting factors, 436. FIG. 17 illustrates with greater particularity a procedure employed by the profile generator in a computer-program module to output the drift-compensated target-factor profiles, which is described next.

First, the profile generator obtains the set of drift-compensated target-factor profile values by applying the set of drift-compensated target factors to the profile trajectory ascertaining the normed coordinates of each point on the profile trajectory, i.e. the target-factor weighting factors, from the enclosing tetrahedron in a manner analogous to finding coordinates of a point on a quaternary phase diagram. Second, the profile generator composes a reference vector by summing the products formed by multiplying the vectors corresponding to the drift-compensated target factors by the target-factor weighting factors, for each point on the profile. Third, the profile generator scales the amplitude of the resulting reference vector to optimally match the corresponding row vector compensated for the effects of drift. Fourth, the profile generator determines a corresponding scaling factor as the scalar value that optimally matches the reference vector to the row vector. Fifth, the profile generator multiplies this scaling factor by the normed coordinates of the profile trajectory, i.e. the target-factor weighting factors, to obtain the product of each individual target-factor weighting factor with the scaling factor, i.e. scaled target-factor weighting factors. Finally, the profile generator outputs the drift-compensated scaled target-factor weighting factors by displaying a set of curves corresponding to the scaled target-factor weighting factors, i.e. drift-compensated target-factor profile values, of each drift-compensated target factor that contributes to a particular row vector represented by a point on the profile trajectory. Other details of this procedure are given with greater particularity in the section that describes the procedure for outputting drift-compensated scaled target-factor profiles.

In the case of spectral analysis, it is useful to have a procedure for further quantifying the drift-compensated scaled target-factor profiles that converts them to drift-compensated compositional profiles. The details of this procedure which is implemented in a computer-program module employed by the profile generator are described in the discussion of FIG. 18. Essentially, the profile generator, 1990, defines a set of drift-compensated scaled target-factor profile values as the set of scaled target-factor weighting factors, divides each drift-compensated scaled target-factor profile value by a profile sensitivity factor for each constituent corresponding to the target factor to provide a sensitivity-scaled target-factor profile value, divides each sensitivity-scaled target-factor profile value for a given cycle number by the sum of all the sensitivity-scaled target-factor profile values for the given cycle number to provide drift-compensated compositional profile values at the given cycle number, and outputs the drift-compensated compositional profile values as a set of drift-compensated compositional profiles.

Embodiment of the Invention in a
Computer-Readable Medium

Figure 20:
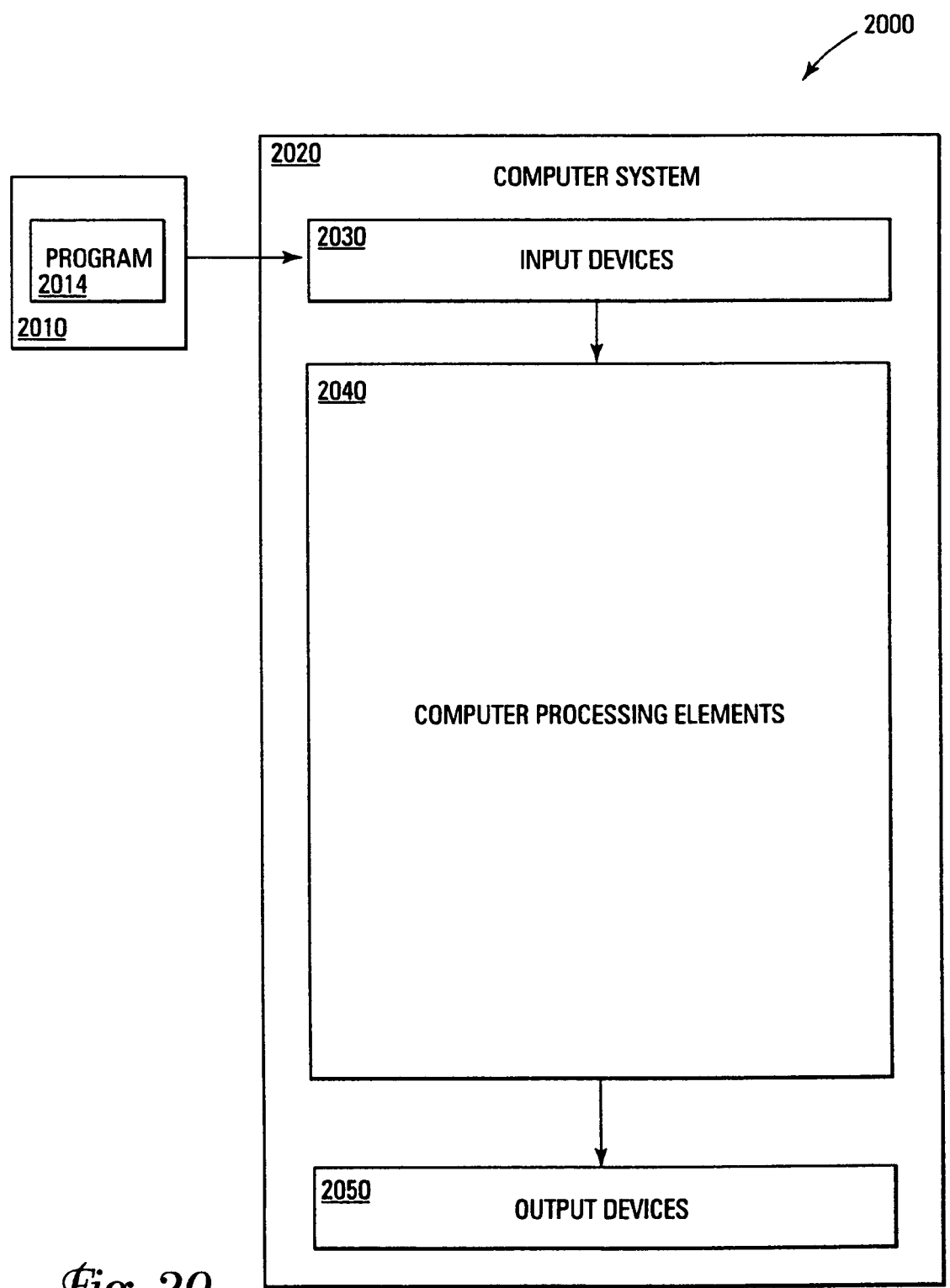
FIG. 20 is a block diagram embodying features of a version of the invention, a computer-readable medium tangibly embodying one or more programs of instructions executable by the computer to perform a method for compensating waveforms, spectra, and profiles derived therefrom for effects of drift.

The process, as described above with reference to FIGS. 4-19 and described now with reference to FIG. 20, may be tangibly embodied in a computer-readable medium or carrier, 2010, e.g. one or more fixed and/or removable data storage devices, or other data storage or data communications devices, e.g. a floppy disk, or CD ROM. The computer program, 2014, of the storage device, 2010, may be loaded via one of the input devices, 2030, of the computer system, 2020, into a memory, one of the processing elements, 2040, of the computer system, 2020, to configure the computer system, 2020, for execution of the program, 2014. The computer program, 2014, comprises instructions which, when read from the memory and executed by the computer system, 2020, causes the computer processing elements, 2040, to perform the operations necessary to execute the computer-program modules or elements of the present invention, and to subsequently output the results of processing a plurality of sequential spectra, or waveforms, as useful information through the output devices, 2050.

After the computer program is loaded into the memory and its execution is initiated, the computer program configures the computer-processing elements, 2040, so that they essentially become a spectral/waveform processor. The computer-processing elements comprise components such as a central processing unit (CPU), random access memory (RAM), hard disk drive (HDD), amongst others well known in the arts of computer system architecture and computer data processing that store and process the instructions of the computer-program modules of a computer program that embodies various aspects of the invention. As described above with specific reference to FIG. 19, the computer-program modules embodied in the spectral/waveform processor, of which the computer program is comprised, operate upon the inputs of a plurality of sequential spectra, or waveforms, in interaction with instructions issued by the analyst acting as an agent external to the computer system. However, although the embodiment of the invention shown in FIG. 19 shows one embodiment of a spectral/waveform processor, simultaneously embodying all the elements of the procedure discussed in FIG. 4, these elements may only be configured momentarily within the computer-processing elements of the computer on an as-needed basis during the course of the complete analysis of the data. In fact, it is unnecessary and possibly an inefficient use of both the computer's and the analyst's resources to configure all of these elements simultaneously within the computer-processing elements of the computer system. A more logical and efficient method of implementing the spectral/waveform processor is as a sequential series of singly executed blocks of code, i.e. computer-program modules, configured within the computer-processing elements of the computer system as required at particular stages in the course of analysis.

An embodiment of the invention that efficiently implements the spectral/waveform processor as sequentially executed blocks of code, i.e. computer-program modules, comprises configuring the computer-processing elements of the computer system first as a spectral transformer operating on a plurality of sequential spectra obtained from the spectrometer to provide an array of drift-compensated row vectors, wherein the array of drift-compensated row vectors constitutes a drift-compensated array; second, as a principal-factor determinator operating on the drift-compensated array to provide a set of drift-compensated principal factors; and third, as a profile generator operating on a profile trajectory of the drift-compensated row vectors lying within a space of drift-compensated principal factors to provide a set of drift-compensated scaled target-factor profiles. In addition, it is seen that these specific computer-processing entities, i.e. the spectral transformer, the principal-factor determinator, and the profile generator, are also separable into sub-blocks of executable code, i.e. other computer-program modules, that are also possibly more efficiently executed as discrete blocks of executed code corresponding with specific functional operations performed on the data during the analysis. The embodiment of the invention in the form of such sequentially executed discrete blocks of code is essentially equivalent to, and not to be precluded by preceding descriptions of the invention, but should be recognized as falling essentially within the spirit of the invention. In one embodiment of the invention, after the computer program is loaded into memory, these specific computer-program modules can be executed sequentially. An alternative embodiment is to load sequentially specific computer-program modules singly into the memory, and to then execute them, wherein each specific computer-program module is tangibly embodied singly or severally in a computer-readable medium or carrier, e.g. one or more fixed and/or removable data storage devices, or other data storage or data communications devices, such as a floppy disk, or CD ROM. Therefore, an embodiment of the invention comprises the entire set of such storage devices, e.g. floppy disks, used to execute the process, as described above with reference to FIGS. 4-19, i.e. a method and apparatus for compensating waveforms, spectra, and profiles derived therefrom for effects of drift.

In light of the above discussion, it is seen, therefore, that one embodiment of the invention is an article of manufacture comprising a program storage medium readable by a computer, the medium tangibly embodying one or more programs of instructions executable by the computer to perform a method for compensating a plurality of sequential spectra and profiles derived therefrom for effects of drift, wherein the method comprises transforming a plurality of sequential spectra obtained from a spectrometer to provide an array of drift-compensated row vectors, wherein the array of drift-compensated row vectors constitutes a drift-compensated array; performing a principal-factor determination on the drift-compensated array to provide a set of drift-compensated principal factors; and, generating drift-compensated scaled target-factor profiles from a profile trajectory of the drift-compensated row vectors lying within a space of drift-compensated principal factors. Another embodiment of the invention is the article of manufacture comprising a program storage medium readable by a computer, the medium tangibly embodying one or more programs of instructions executable by the computer to perform a method for compensating a plurality of sequential spectra and profiles derived therefrom for effects of drift, wherein the method further comprises generating drift-compensated compositional profiles from the set of drift-compensated scaled target-factor profiles.

In like fashion to spectra, the invention can also be applied to waveforms. Thus, another embodiment of the invention is an article of manufacture comprising a program storage medium readable by a computer, the medium tangibly embodying one or more programs of instructions executable by the computer to perform a method for compensating a plurality of sequential waveforms and profiles derived therefrom for effects of drift, wherein the method comprises transforming a plurality of sequential waveforms obtained from a waveform-source device to provide an array of drift-compensated row vectors, wherein the array of drift-compensated row vectors constitutes a drift-compensated array; performing a principal-factor determination on the drift-compensated array to provide a set of drift-compensated principal factors; and, generating drift-compensated scaled target-factor profiles from a profile trajectory of the drift-compensated row vectors lying within a space of drift-compensated principal factors.

Embodiments within the Spirit and Scope of the Invention

In the preceding discussion, the present invention has been described in considerable detail with reference to certain preferred embodiments thereof. It should be apparent to those skilled in the art that other embodiments of the invention are possible. For example, it should be apparent, that the procedures and analysis systems described above in the field of spectroscopy would find application, as well, to electronic waveforms, and time series. An example of an embodiment directed to waveform processing is a waveform analysis system comprising a computer system, a waveform input device that inputs a series of waveforms from a waveform-source device into the computer system; the computer system having resident a computer program incorporating a waveform processing procedure for drift compensation. In like spirit, it should be apparent to those skilled in the art that in addition to outputting a set of scaled target-factor weighting factors as drift-compensated scaled target-factor profiles, it is equally possible, as has been described, to output a set of drift-compensated spectra or moduli of Fourier-transformed spectra as a sequential series, as well as drift-compensated compositional profiles; and, therefore, it may be anticipated that it is equally possible to output a variety of other parameters or derived spectral entities that might be calculated in the course of the spectral processing procedure.

Furthermore, the foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the spirit and scope of the invention be limited not with this detailed description, but rather by the claims appended hereto.

What is claimed is:

1. A spectral processing method for compensating a plurality of sequential spectra and profiles derived therefrom for effects of drift of data along an independent variable axis, comprising:

transforming a plurality of sequential spectra obtained from a spectrometer to provide an array of row vectors compensated for effects of drift of data along an independent variable axis, wherein the array of row vectors compensated for effects of drift of data along the independent variable axis constitutes a drift-compensated array;

performing a principal-factor determination on the drift-compensated array to provide a set of principal factors compensated for effects of drift of data along the independent variable axis; and generating, from a profile trajectory of the row vectors compensated for effects of drift of data along the independent variable axis lying within a space of principal factors compensated for effects of drift of data along the independent variable axis, scaled target-factor profiles compensated for effects of drift of data along the independent variable axis.

2. The spectral processing method of claim 1, wherein the independent variable axis comprises an abscissa of the electron spectrum.

3. The spectral processing method of claim 2, wherein the drift comprises drift of data along the independent variable axis in a positive or negative direction.

4. The spectral processing method of claim 1, wherein the independent variable axis comprises a axis representing temporal displacement of the data.

5. The spectral processing method of claim 1 further comprising outputting the transformed array of row vectors compensated for drift of data along the independent variable axis as a sequential series of moduli wherein phase factors due to drift are nullified.

6. The spectral processing method of claim 1 further comprising generating drift-compensated compositional profiles from the drift-compensated scaled target-factor profiles.

7. The spectral processing method of claim 1, wherein the transforming the plurality of sequential spectra further comprises:

inputting a plurality of sequential spectra from a spectrometer into a computer system;

ordering the spectra in a primal array of row vectors, wherein each sequential spectrum constitutes a successive row vector of the primal array; and removing phase factors due to drift using a dephasing procedure that transforms the primal array into a drift-compensated array.

8. The spectral processing method of claim 7, wherein the dephasing procedure for transforming the primal array into the drift-compensated array further comprises applying a Fourier transform to the spectra in the primal array of row vectors forming an array of Fourier-transformed row vectors, multiplying each Fourier-transformed row vector by a complex conjugate of each Fourier-transformed row vector to form a squared moduli vector thereby removing phase factors due to drift, taking the square root of each element of the squared moduli vector to create a corresponding moduli vector, and forming a drift-compensated array of moduli vectors by successively sequencing the moduli vectors as successive drift-compensated row vectors in a drift-compensated array, wherein the moduli vectors constitute moduli of Fourier-transformed spectra.

9. The spectral processing method of claim 7, wherein the dephasing procedure for transforming the primal array into the drift-compensated array further comprises applying a fining procedure to each spectrum in the primal array using selected reference spectra, calculating through the fitting procedure a corresponding reference weighting factor for each reference spectrum corresponding to each spectrum in the primal array, removing the phase factor due to drift from each spectrum in the primal array by synthesizing a corresponding drift-compensated spectrum given by the sum of each selected reference spectrum multiplied by the corresponding reference weighting factor, and forming a drift-compensated array by successively sequencing the drift-compensated spectra as successive drift-compensated row vectors in the drift-compensated array.

10. The spectral processing method of claim 9 further comprising outputting analytical results selected from the group consisting of the selected reference spectra used in the fining procedure, the drift-compensated row vectors of the drift-compensated array as a sequential series of drift-compensated spectra, reference weighting factors for each reference spectrum corresponding to each spectrum in the primal array as a set of drift-compensated reference-spectrum profiles, and phase factors due to drift for each reference spectrum corresponding to each spectrum in the primal array as a set of phase-factor profiles.

11. The spectral processing method of claim 1, wherein the performing the principal-factor determination comprises performing a factor analysis.

12. The spectral processing method of claim 11, wherein the performing the factor analysis further comprises:

forming a covariance array from the drift-compensated array;

applying an eigenanalysis to the covariance array to define a complete set of eigenvectors and cigenvalues; and defining a set of drift-compensated principal factors by selecting a subset of eigenvectors from the complete set of eigenvectors.

13. The spectral processing method of claim 12, wherein the defining the set of drift-compensated principal factors further comprises selecting the drift-compensated principal factors as a first few eigenvectors corresponding to eigenvalues above a certain limiting value.

14. The spectral processing method of claim 1, wherein the performing the principal-factor determination comprises performing a linear-least-squares analysis.

15. The spectral processing method of claim 14, wherein the performing a linear-least-squares analysis further comprises:
   selecting a set of initial factors from the set of drift-compensated row vectors of the drift-compensated array;
   performing a linear-least-squares decomposition with the set of initial factors on the drift-compensated row vectors in the drift-compensated array to provide a set of residue factors; and
   performing a Gram-Schmidt orthonormalization on the combined set of initial factors and residue factors to provide drift-compensated principal factors.

16. The spectral processing method of claim 1, wherein the generating drift-compensated scaled target-factor profiles further comprises:
   constructing a set of drift-compensated target factors on a space of the drift-compensated principal factors;
   applying the set of drift-compensated target factors to a profile trajectory lying within a space of drift-compensated principal factors to obtain a sequential set of target-factor weighting factors corresponding to the drift-compensated target factors for the profile trajectory; and
   outputting analytical results selected from the group consisting of a set of drift-compensated scaled target-factor profiles derived from the set of target-factor weighting factors, and the set of drift-compensated target factors.

17. The spectral processing method of claim 16, wherein the constructing the set of drift-compensated target factors further comprises:
   generating a profile trajectory on a 3-dimensional projection of a 4-dimensional space of a set of first-four, drift-compensated principal factors along with a reference tetrahedron the vertices of which represent each of the first-four, drift-compensated principal factors;
   enclosing the profile trajectory within an enclosing tetrahedron with vertices centered on end-points and in proximity to turning points of the profile trajectory, and with faces lying essentially tangent to portions of the profile trajectory; and
   calculating the drift-compensated target factors from the normed coordinates of the vertices of the enclosing tetrahedron in terms of the drift-compensated principal factors.

18. The spectral processing method of claim 17, wherein the generating the profile trajectory further comprises:
   calculating 4-space coordinates of a profile trajectory of drift-compensated target-factor profiles on a 4-dimensional space to produce four coordinates for each point in the profile trajectory, one coordinate for each of the first-four, drift-compensated principal factors;
   reducing the dimensionality of the coordinates of the profile trajectory by dividing each coordinate by a sum of all four 4-space coordinates to produce normed coordinates for the profile trajectory; and,
   plotting the normed coordinates for the profile trajectory in a 3-dimensional space the coordinate axes of which are edges of a reference tetrahedron, the vertices of which correspond to unit values for each of the first-four, drift-compensated principal factors in a manner analogous to plotting of coordinates on a quaternary phase diagram.

19. The spectral processing method of claim 16, wherein generating drift-compensated compositional profiles comprises:
   defining a set of drift-compensated scaled target-factor profile values as the set of scaled target-factor weighting factors;
   dividing each drift-compensated scaled target-factor profile value by a profile sensitivity factor for each constituent corresponding to the target factor to provide a sensitivity-scaled target-factor profile value;
   normalizing the sensitivity-scaled target-factor profile value by dividing each sensitivity-scaled target-factor profile value for a given cycle number by the sum of all the sensitivity-scaled target-factor profile values for the given cycle number to provide drift-compensated compositional profile values at the given cycle number; and
   outputting the drift-compensated compositional profile values as a set of drift-compensated compositional profiles.

20. A waveform processing method for compensating a plurality of sequential waveforms and profiles derived therefrom for effects of drift comprising:
   transforming a plurality of sequential waveforms obtained from a waveform-source device to provide an array of row vectors compensated for effects of drift of data along an independent variable axis, wherein the array of row vectors compensated for effects of drift of data along an independent variable axis constitutes a drift-compensated array;
   performing a principal-factor determination on the drift-compensated array to provide a set of principal factors compensated for effects of drift of data along an independent variable axis; and
   generating, from a profile trajectory of the row vectors lying compensated for effects of drift of data along the independent variable axis within a space of principal factors compensated for effects of drift of data along the independent variable axis, scaled target-factor profiles compensated for effects of drift of data along the independent variable axis.

21. The waveform processing method of claim 20, wherein the independent variable axis comprises a time-axis of a waveform.

22. The waveform processing method of claim 21, wherein the drift comprises a phase lag or lead of data representing a waveform.

23. The waveform processing method of claim 20 further comprising outputting the drift-compensated row vectors of the drift-compensated array as a sequential series of moduli of Fourier-transformed waveforms.

24. The waveform processing method of claim 20, wherein the transforming the plurality of sequential waveforms further comprises:
   inputting a plurality of sequential waveforms from a waveform-source device into a computer system;
   ordering the waveforms in a primal array of row vectors, wherein each sequential waveform constitutes a successive row vector of the primal array; and
   removing phase factors due to drift using a dephasing procedure that transforms the primal array into a drift-compensated array.

25. The waveform processing method of claim 24 wherein the dephasing procedure for transforming the primal array into the drift-compensated array further comprises applying a Fourier transform to the waveforms in the primal array of row vectors forming an array of Fourier-transformed row vectors, multiplying each Fourier-transformed row vector by a complex conjugate of each Fourier-transformed row vector to form a squared moduli vector thereby removing phase factors due to drift, taking the square root of each element of the squared moduli vector to create a corresponding moduli vector, and forming a drift-compensated array of moduli vectors by successively sequencing the moduli vectors as successive drift-compensated row vectors in a drift-compensated array, wherein the moduli vectors constitute moduli of Fourier-transformed waveforms.

26. The waveform processing method of claim 24, wherein the dephasing procedure for transforming the primal array into the drift-compensated array further comprises applying a fitting procedure to each sequential waveform in the primal array using selected reference waveforms, calculating through the fitting procedure a corresponding reference weighting factor for each reference waveform corresponding to each waveform in the primal array, removing the phase factor due to drift from each waveform in the primal array by synthesizing a corresponding drift-compensated waveform given by the sum of each selected reference waveform multiplied by the corresponding reference weighting factor, and forming a drift-compensated array by successively sequencing the drift-compensated waveforms as successive drift-compensated row vectors in the drift-compensated array.

27. The waveform processing method of claim 26 further comprising outputting analytical results selected from the group consisting of the selected reference waveforms used in the fitting procedure, the drift-compensated row vectors of the drift-compensated array as a sequential series of drift-compensated waveforms, reference weighting factors for each reference waveform corresponding to each waveform in the primal array as a set of drift-compensated reference-waveform profiles, and phase factors due to drift for each reference waveform corresponding to each waveform in the primal array as a set of phase-factor profiles.

28. The waveform processing method of claim 20, wherein the performing the principal-factor determination comprises performing a factor analysis.

29. The waveform processing method of claim 28, wherein the performing the factor analysis further comprises:
    forming a covariance array from the drift-compensated array;
    applying an eigenanalysis to the covariance array to define a complete set of eigenvectors and eigenvalues; and
    defining a set of drift-compensated principal factors by selecting a subset of eigenvectors from the complete set of eigenvectors.

30. The waveform processing method of claim 29, wherein the defining the set of drift-compensated principal factors further comprises selecting the drift-compensated principal factors as a first few eigenvectors corresponding to eigenvalues above a certain limiting value.

31. The waveform processing method of claim 20, wherein the performing the principal-factor determination comprises performing a linear-least-squares analysis.

32. The waveform processing method of claim 31, wherein the performing a linear-least-squares analysis further comprises:
    selecting a set of initial factors from the set of drift-compensated row vectors of the drift-compensated array;
    performing a linear-least-squares decomposition with the set of initial factors on the drift-compensated row vectors in the drift-compensated array to provide a set of residue factors; and
    performing a Gram-Schmidt orthonormalization on the combined set of initial factors and residue factors to provide drift-compensated principal factors.

33. The waveform processing method of claim 20, wherein the generating drift-compensated scaled target-factor profiles further comprises:
    constructing a set of drift-compensated target factors on a space of the drift-compensated principal factors;
    applying the set of drift-compensated target factors to a profile trajectory lying within a space of drift-compensated principal factors to obtain a sequential set of target-factor weighting factors corresponding to the drift-compensated target factors for the profile trajectory; and
    outputting analytical results selected from the group consisting of a set of drift-compensated scaled target-factor profiles derived from the set of target-factor weighting factors, and the set of drift-compensated target factors.

34. The waveform processing method of claim 33, wherein the constructing the set of drift-compensated target factors further comprises:
    generating a profile trajectory on a 3-dimensional projection of a 4-dimensional space of a set of first-four, drift-compensated principal factors along with a reference tetrahedron the vertices of which represent each of the first-four, drift-compensated principal factors;
    enclosing the profile trajectory within an enclosing tetrahedron with vertices centered on end-points and in proximity to turning points of the profile trajectory, and with faces lying essentially tangent to portions of the profile trajectory; and
    calculating the drift-compensated target factors from the normed coordinates of the vertices of the enclosing tetrahedron in terms of the drift-compensated principal factors.

35. The waveform processing method of claim 34, wherein the generating the profile trajectory further comprises:
    calculating 4-space coordinates of a profile trajectory of drift-compensated target-factor profiles on a 4-dimensional space to produce four coordinates for each point in the profile trajectory, one coordinate for each of the first-four, drift-compensated principal factors;
    reducing the dimensionality of the coordinates of the profile trajectory by dividing each coordinate by a sum of all four 4-space coordinates to produce normed coordinates for the profile trajectory; and,
    plotting the normed coordinates for the profile trajectory in a 3-dimensional space the coordinate axes of which are edges of a reference tetrahedron, the vertices of which correspond to unit values for each of the first-four, drift-compensated principal factors in a manner analogous to plotting of coordinates on a quaternary phase diagram.

36. An apparatus for compensating a plurality of sequential spectra and profiles derived therefrom for effects of drift comprising a spectroscopic analysis system, wherein the spectroscopic analysis system comprises:
    a spectrometer; and
    a computer system, coupled to the spectrometer, for analyzing spectra input from the spectrometer, the computer system further comprising a spectral processor for compensating a plurality of sequential spectra and profiles derived therefrom for effects of drift of data along an independent variable axis;

wherein the spectral processor further comprises:

a spectral transformer operating on a plurality of sequential spectra obtained from the spectrometer to provide an array of row vectors compensated for effects of drift of data along the independent variable axis, wherein the array of row vectors compensated for effects of drift of data along an independent variable axis constitutes a drift-compensated array;

a principal-factor determinator operating on the drift-compensated array to provide a set of principal factors compensated for effects of drift of data along the independent variable axis; and a profile generator operating on a profile trajectory of the row vectors compensated for effects of drift of data along the independent variable axis lying within a space of principal factors compensated for effects of drift of data along the independent variable axis to provide a set of scaled target-factor profiles compensated for effects of drift of data along the independent variable axis.

37. The apparatus of claim 36, wherein the spectrometer comprises an electron spectrometer.

38. The apparatus of claim 37, wherein the electron spectrometer comprises an Auger spectrometer.

39. The apparatus of claim 37, wherein the electron spectrometer comprises an x-ray photoelectron spectrometer.

40. The apparatus of claim 37, wherein the electron spectrometer comprises an electron energy loss spectrometer.

41. The apparatus of claim 36, wherein the independent variable axis comprises an abscissa of the electron spectrum.

42. The apparatus of claim 41, wherein the drift comprise drift of data along the independent variable axis in a positive or negative direction.

43. The apparatus of claim 36, wherein the spectral transformer outputs to an output device the drift-compensated row vectors of the drift-compensated array as a sequential series of moduli of Fourier-transformed spectra.

44. The apparatus of claim 36, wherein the profile generator operating on the set drift-compensated scaled target-factor profiles generates a set of drift-compensated compositional profiles.

45. The apparatus of claim 36, wherein the spectral transformer accepts as input the plurality of sequential spectra obtained from the spectrometer into the computer system, orders the spectra in a primal array, wherein each sequential spectrum constitutes a successive row vector of the primal array, and removes phase factors due to drift using a dephasor that transforms the primal array into a drift-compensated array.

46. The apparatus of claim 45, wherein the dephasor that transforms the primal array into the drift-compensated array applies a Fourier transform to the spectra in the primal array of row vectors to form an array of Fourier-transformed row vectors, multiplies each Fourier-transformed row vector by a complex conjugate of each Fourier-transformed row vector to form a squared moduli vector thereby removing phase factors due to drift, takes the square root of each element of the squared moduli vector to create a corresponding moduli vector, and forms a drift-compensated array of moduli vectors by successively sequencing the moduli vectors as successive drift-compensated row vectors in a drift-compensated array, wherein the moduli vectors constitute moduli of Fourier-transformed spectra.

47. The apparatus of claim 46, wherein the dephasor that transforms the primal array into the drift-compensated array fits each spectrum in the primal array using selected reference spectra, calculates a corresponding reference weighting factor for each reference spectrum corresponding to each spectrum in the primal array, synthesizes a corresponding drift-compensated spectrum given by the sum of each selected reference spectrum multiplied by the corresponding reference weighting factor thereby removing phase factors due to drift, and forms a drift-compensated array by successively sequencing the drift-compensated spectra as successive drift-compensated row vectors in the drift-compensated array.

48. The apparatus of claim 47, wherein the spectral transformer outputs to an output device analytical results selected from the group consisting of the selected reference spectra used in the fitting procedure, the drift-compensated row vectors of the drift-compensated array as a sequential series of drift-compensated spectra, reference weighting factors for each reference spectrum corresponding to each spectrum in the primal array as a set of drift-compensated reference-spectrum profiles, and phase factors due to drift for each reference spectrum corresponding to each spectrum in the primal array as a set of phase-factor profiles.

49. The apparatus of claim 36, wherein the principal-factor determinator comprises a factor analyzer.

50. The apparatus of claim 49, wherein the factor analyzer forms a covariance array from the drift-compensated array, applies an eigenanalysis to the covariance array to define a complete set of eigenvectors and cigenvalues, and defines a set of drift-compensated principal factors as a subset of eigenvectors determined by a selector operating on the complete set of eigenvectors.

51. The apparatus of claim 50, wherein the selector operates on the complete set of eigenvectors to define the set of drift-compensated principal factors as a first few eigenvectors corresponding to eigenvalues above a certain limiting value.

52. The apparatus of claim 36, wherein the principal-factor determinator comprises a linear-least-squares analyzer.

53. The apparatus of claim 52, wherein the linear-least-squares analyzer selects a set of initial factors from the set of drift-compensated row vectors of the drift-compensated array, performs a linear-least-squares decomposition with the set of initial factors on the drift-compensated row vectors in the drift-compensated array to provide a set of residue factors, and performs a Gram-Schmidt orthonormalization on the combined set of initial factors and residue factors to provide drift-compensated principal factors.

54. The apparatus of claim 36, wherein the profile generator defines a set of drift-compensated target factors on a space of the drift-compensated principal factors determined by a target-factor constructor operating on the drift-compensated principal factors, applies the set of drift-compensated target factors to a profile trajectory lying within a space of drift-compensated principal factors to obtain a sequential set of target-factor weighting factors corresponding to the drift-compensated target factors for the profile trajectory, and outputs to an output device analytical results selected from the group consisting of a set of drift-compensated scaled target-factor profiles derived from the set of target-factor weighting factors, and the set of drift-compensated target factors.

55. The apparatus of claim 54, wherein the target-factor constructor generates a profile trajectory on a 3-dimensional projection of a 4-dimensional space of a set of first-four, drift-compensated principal factors along with a reference tetrahedron the vertices of which represent each of the first-four, drift-compensated principal factors; encloses the profile trajectory within an enclosing tetrahedron with vertices centered on end-points and in proximity to turning points of the profile trajectory, and with faces lying essentially tangent to portions of the profile trajectory; and calculates the drift-compensated target factors from the normed coordinates of the vertices of the enclosing tetrahedron in terms of the drift-compensated principal factors.

56. The apparatus of claim 55, wherein the target-factor constructor in generating the profile trajectory further calculates 4-space coordinates of a profile trajectory of drift-compensated target-factor profiles on a 4-dimensional space to produce four coordinates for each point in the profile trajectory, one coordinate for each of the first-four, drift-compensated principal factors; reduces the dimensionality of the coordinates of the profile trajectory by dividing each coordinate by a sum of all four 4-space coordinates to produce normed coordinates for the profile trajectory; and, plots the normed coordinates for the profile trajectory in a 3-dimensional space the coordinate axes of which are edges of a reference tetrahedron the vertices of which correspond to unit values for each of the first-four, drift-compensated principal factors in a manner analogous to plotting of coordinates on a quaternary phase diagram.

57. The apparatus of claim 54, wherein the profile generator further defines a set of drift-compensated scaled target-factor profile values as the set of scaled target-factor weighting factors, divides each drift-compensated scaled target-factor profile value by a profile sensitivity factor for each constituent corresponding to the target factor to provide a sensitivity-scaled target-factor profile value, divides each sensitivity-scaled target-factor profile value for a given cycle number by the sum of all the sensitivity-scaled target-factor profile values for the given cycle number to provide drift-compensated compositional profile values at the given cycle number, and outputs the drift-compensated compositional profile values as a set of drift-compensated compositional profiles.

58. An apparatus for compensating a plurality of seciuential waveforms and profiles derived therefrom for effects of drift, comprising a waveform analysis system, wherein the waveform analysis system comprises:
a waveform-source device; and
a computer system, coupled to the waveform-source device, for analyzing waveforms input from the waveform-source device, the computer system further comprising a waveform processor for compensating a plurality of sequential waveforms and profiles derived therefrom for effects of drift of data along an independent variable axis;
wherein the waveform processor further comprises:
a waveform transformer operating on a plurality of sequential waveforms obtained from a waveform-source device to provide an array of row vectors compensated for effects of drift of data along the independent variable axis, wherein the array of row vectors compensated for effects of drift of data along the independent variable axis constitutes a drift-compensated array;
a principal-factor determinator operating on the drift-compensated array to provide a set of principal factors compensated for effects of drift of data along the independent variable axis; and
a profile generator operating on a profile trajectory of the row vectors compensated for effects of drift of data along the independent variable axis lying within a space of principal factors compensated for effects of drift of data along the independent variable axis to provide a set of scaled target-factor profiles compensated for effects of drift of data along the independent variable axis.

59. The apparatus of claim 58, wherein the independent variable axis comprises a time-axis of a waveform.

60. The apparatus of claim 59, wherein the drift comprises a phase lag or lead of data representing a waveform.

61. The apparatus of claim 58, wherein the waveform transformer outputs the drift-compensated row vectors of the drift-compensated array as a sequential series of moduli of Fourier-transformed waveforms.

62. The apparatus of claim 58, wherein the waveform transformer accepts as input the plurality of sequential waveforms obtained from a waveform-source device into the computer system, orders the waveforms in a primal array, wherein each sequential waveform constitutes a successive row vector of the primal array, and removes phase factors due to drift using a dephasor that transforms the primal array into a drift-compensated array.

63. The apparatus of claim 62, wherein the dephasor that transforms the primal array into the drift-compensated array applies a Fourier transform to the primal array of row vectors to form an array of Fourier-transformed row vectors, multiplies each Fourier-transformed row vector by a complex conjugate of each Fourier-transformed row vector to form a squared moduli vector thereby removing phase factors due to drift, takes the square root of each element of the squared moduli vector to create a corresponding moduli vector, and forms a drift-compensated array of moduli vectors by successively sequencing the moduli vectors as successive drift-compensated row vectors in a drift-compensated array, wherein the moduli vectors constitute moduli of Fourier-transformed waveforms.

64. The apparatus of claim 62, wherein the dephasor that transforms the primal array into the drift-compensated array fits each waveform in the primal array using selected reference waveforms, calculates a corresponding reference weighting factor for each reference waveform corresponding to each waveform in the primal array, synthesizes a corresponding drift-compensated waveform given by the sum of each selected reference waveform multiplied by the corresponding reference weighting factor thereby removing phase factors due to drift, and forms a drift-compensated array by successively sequencing the drift-compensated waveforms as successive drift-compensated row vectors in the drift-compensated array.

65. The apparatus of claim 64, wherein the waveform transformer outputs to an output device analytical results selected from the group consisting of the selected reference waveforms used in the fitting procedure, the drift-compensated row vectors of the drift-compensated array as a sequential series of drift-compensated waveforms, reference weighting factors for each reference waveform corresponding to each waveform in the primal array as a set of drift-compensated reference-waveform profiles, and phase factors due to drift for each reference waveform corresponding to each waveform in the primal array as a set of phase-factor profiles.

66. The apparatus of claim 58, wherein the principal-factor determinator comprises a factor analyzer.

67. The apparatus of claim 66, wherein the factor analyzer forms a covariance array from the drift-compensated array, applies an eigenanalysis to the covariance array to define a complete set of eigenvectors and eigenvalues, and defines a set of drift-compensated principal factors as a subset of eigenvectors determined by a selector operating on the complete set of eigenvectors.

68. The apparatus of claim 67, wherein the selector operates on the complete set of eigenvectors to define the set of drift-compensated principal factors as a first few eigenvectors corresponding to eigenvalues above a certain limiting value.

69. The apparatus of claim 58, wherein the principal-factor determinator comprises a linear-least-squares analyzer.

70. The apparatus of claim 69, wherein the linear-least-squares analyzer selects a set of initial factors from the set of drift-compensated row vectors of the drift-compensated array, performs a linear-least-squares decomposition with the set of initial factors on the drift-compensated row vectors in the drift-compensated array to provide a set of residue factors, and performs a Gram-Schmidt orthonormalization on the combined set of initial factors and residue factors to provide drift-compensated principal factors.

71. The apparatus of claim 58, wherein the profile generator defines a set of drift-compensated target factors on a space of the drift-compensated principal factors determined by a target-factor constructor operating on the drift-compensated principal factors, applies the set of drift-compensated target factors to a profile trajectory lying within a space of drift-compensated principal factors to obtain a sequential set of target-factor weighting factors corresponding to the drift-compensated target factors for the profile trajectory, and outputs to an output device analytical results selected from the group consisting of a set of drift-compensated scaled target-factor profiles derived from the set of target-factor weighting factors, and the set of drift-compensated target factors.

72. The apparatus of claim 71, wherein the target-factor constructor generates a profile trajectory on a 3-dimensional projection of a 4-dimensional space of a set of first-four, drift-compensated principal factors along with a reference tetrahedron the vertices of which represent each of the first-four, drift-compensated principal factors; encloses the profile trajectory within an enclosing tetrahedron with vertices centered on end-points and in proximity to turning points of the profile trajectory, and with faces lying essentially tangent to portions of the profile trajectory; and calculates the drift-compensated target factors from the normed coordinates of the vertices of the enclosing tetrahedron in terms of the drift-compensated principal factors.

73. The apparatus of claim 72, wherein the target-factor constructor in generating the profile trajectory further calculates 4-space coordinates of a profile trajectory of drift-compensated target-factor profiles on a 4-dimensional space to produce four coordinates for each point in the profile trajectory, one coordinate for each of the first-four, drift-compensated principal factors; reduces the dimensionality of the coordinates of the profile trajectory by dividing each coordinate by a sum of all four 4-space coordinates to produce normed coordinates for the profile trajectory; and, plots the normed coordinates for the profile trajectory in a 3-dimensional space the coordinate axes of which are edges of a reference tetrahedron the vertices of which correspond to unit values for each of the first-four, drift-compensated principal factors in a manner analogous to plotting of coordinates on a quaternary phase diagram.

74. An article of manufacture comprising a program storage medium readable by a computer, the medium tangibly embodying one or more programs of instructions executable by the computer to perform a method for compensating a plurality of sequential spectra and profiles derived therefrom for effects of drift, the method comprising:

transforming a plurality of sequential spectra obtained from a spectrometer to provide an array of row vectors compensated for effects of drift of data along an independent variable axis, wherein the array of row vectors compensated for effects of drift of data along the independent variable axis constitutes a drift-compensated array;

performing a principal-factor determination on the drift-compensated array to provide a set of principal factors compensated for effects of drift of data along the independent variable axis; and, generating, from a profile trajectory of the row vectors compensated for effects of drift of data along the independent variable axis lying within a space of principal factors compensated for effects of drift of data along the independent variable axis, scaled target-factor profiles compensated for effects of drift of data along the independent variable axis.

75. The article of manufacture of claim 74 further comprising generating drift-compensated compositional profiles from the set of drift-compensated scaled target-factor profiles.

76. An article of manufacture comprising a program storage medium readable by a computer, the medium tangibly embodying one or more programs of instructions executable by the computer to perform a method for compensating a plurality of sequential waveforms and profiles derived therefrom for effects of drift of data along the independent variable axis, the method comprising:

transforming a plurality of sequential waveforms obtained from a waveform-source device to provide an array of row vectors compensated for effects of drift of data along an independent variable axis, wherein the array of row vectors compensated for effects of drift of data along the independent variable axis constitutes a drift-compensated array;

performing a principal-factor determination on the drift-compensated array to provide a set of principal factors compensated for effects of drift of data along the independent variable axis; and, generating, from a profile trajectory of the row vectors compensated for effects of drift of data along the independent variable axis lying within a space of principal factors compensated for effects of drift of data along the independent variable axis, scaled target-factor profiles compensated for effects of drift of data along the independent variable axis.

* * * * *

UNITED STATES PATENT AND TRADEMARK OFFICE
CERTIFICATE OF CORRECTION

PATENT NO. : 7,002,143 B2
DATED : February 21, 2006
INVENTOR(S) : Michael Andrew Parker et al.

It is certified that error appears in the above-identified patent and that said Letters Patent is hereby corrected as shown below:

<u>Title page,</u>
Item [57], ABSTRACT,
Line 19, "analyzes" should read -- analyses --.

<u>Column 56,</u>
Line 30, "fining" should read -- fitting --.

<u>Column 63,</u>
Line 41, "seciuential" should read -- sequential --.

Signed and Sealed this

Thirtieth Day of May, 2006

JON W. DUDAS
*Director of the United States Patent and Trademark Office*